US 8,416,680 B2

(12) United States Patent
Mitsumori

(10) Patent No.: US 8,416,680 B2
(45) Date of Patent: Apr. 9, 2013

(54) APPARATUS AND METHOD FOR CONTROLLING DATA COMMUNICATION

(75) Inventor: Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 316 days.

(21) Appl. No.: 12/801,105

(22) Filed: May 21, 2010

(65) Prior Publication Data

US 2011/0075552 A1    Mar. 31, 2011

(30) Foreign Application Priority Data

Sep. 30, 2009    (JP) ................... 2009-226331

(51) Int. Cl.
*G01R 31/08*    (2006.01)

(52) U.S. Cl.
USPC ............ 370/218; 370/219; 370/221; 370/217

(58) Field of Classification Search ......................... None
See application file for complete search history.

(56) References Cited

U.S. PATENT DOCUMENTS

| | | | |
|---|---|---|---|
| 2003/0126315 A1* | 7/2003 | Tan et al. ........................ | 710/1 |
| 2005/0111453 A1* | 5/2005 | Mizutani ...................... | 370/390 |
| 2007/0086333 A1 | 4/2007 | Doukai et al. | |
| 2007/0147231 A1 | 6/2007 | Yoshida et al. | |
| 2007/0223456 A1* | 9/2007 | Maruyama et al. ........... | 370/352 |
| 2008/0049611 A1 | 2/2008 | Higashitaniguchi et al. | |
| 2008/0059602 A1* | 3/2008 | Matsuda et al. .............. | 709/212 |
| 2010/0082897 A1* | 4/2010 | Amano et al. ................ | 711/112 |

FOREIGN PATENT DOCUMENTS

| | | |
|---|---|---|
| JP | 2006-67040 | 3/2006 |
| JP | 2007-116275 | 5/2007 |
| JP | 2007-181010 | 7/2007 |
| JP | 2008-54058 | 3/2008 |

* cited by examiner

*Primary Examiner* — Hassan Phillips
*Assistant Examiner* — Anez Ebrahim
(74) *Attorney, Agent, or Firm* — Staas & Halsey LLP

(57) ABSTRACT

In a communication apparatus, a receive data processor receives data and retrieves a group data record corresponding to the received data out of a group data memory. A forwarding processor forwards the received data according to the group data record retrieved by the receive data processor. The group data memory stores group data records which associate protection group identifiers with path selection data. The protection group identifiers each identify a protection group that provides logical paths constituting a redundant logical path for transporting a group of data, and their corresponding path selection data specifies which logical path to use to forward data in that protection group.

17 Claims, 47 Drawing Sheets

FIG. 7

| VID | VID VALIDITY FLAG | FIRST PATH ENABLE FLAG | FIRST PATH DATA (Output Interface Card, Port) | SECOND PATH ENABLE FLAG | SECOND PATH DATA (Output Interface Card, Port) | SENDING PGID |
|---|---|---|---|---|---|---|
| 100 | 1 | 1 | CARD c, PORT#1 | 1 | CARD d, PORT#2 | 1 |
| ... | ... | ... | ... | ... | ... | ... |

PATH TABLE 151a1

FIG. 8A

GROUP TABLE 152a1

| PGID | PATH SELECTION DATA |
|------|---------------------|
| 0    | FIRST PATH (FIXED)  |
| 1    | FIRST PATH          |
| ⋮    | ⋮                   |

FIG. 8B

GROUP TABLE 152a2

| PGID | PATH SELECTION DATA |
|------|---------------------|
| 0    | FIRST PATH (FIXED)  |
| 1    | SECOND PATH         |
| ⋮    | ⋮                   |

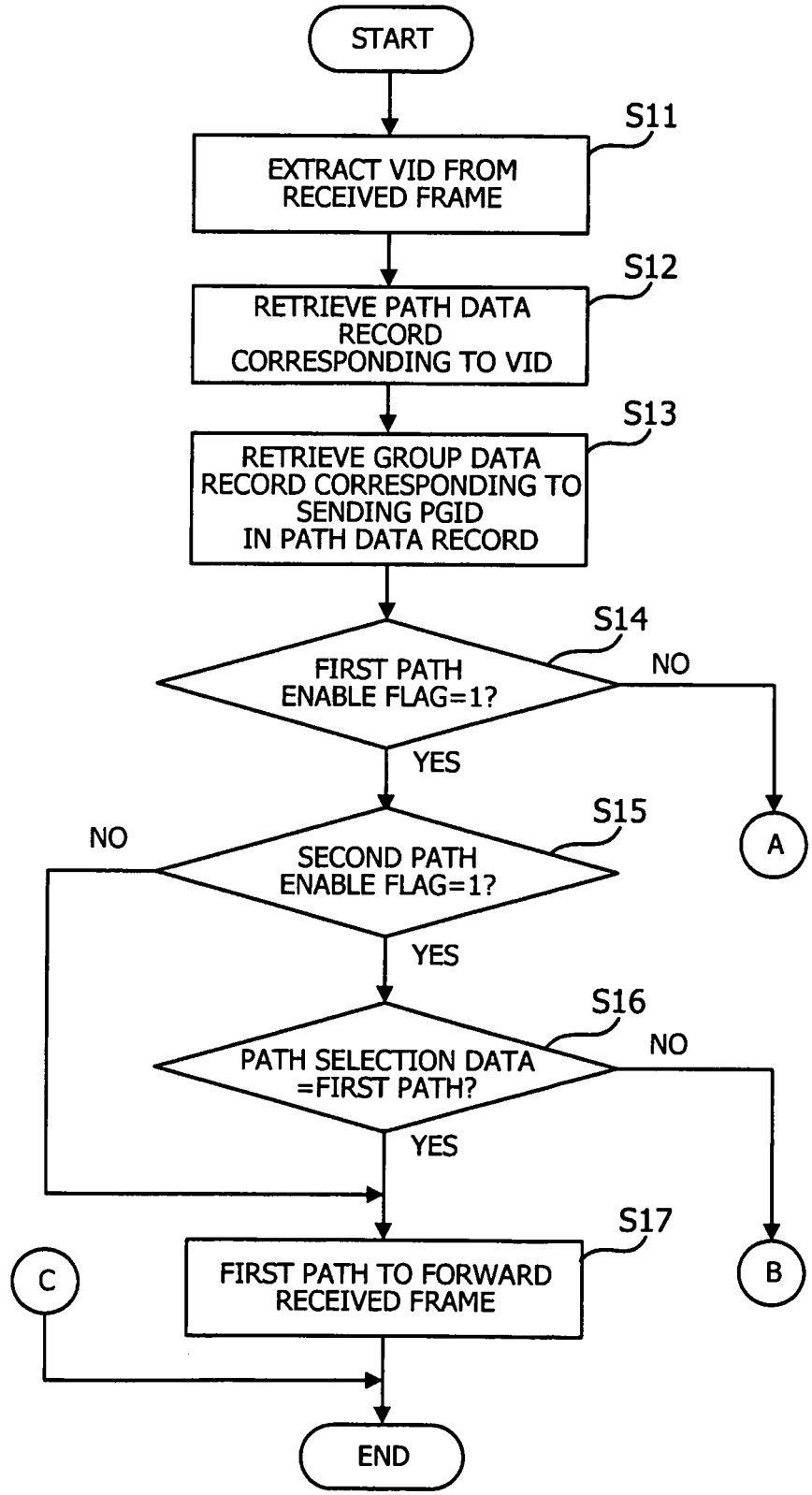

FIG. 12

| VID | VID VALIDITY FLAG | FIRST PATH ENABLE FLAG | FIRST PATH DATA | SECOND PATH ENABLE FLAG | SECOND PATH DATA | RECEIVING PGID | RECEIVING PG PATH |
|-----|------|------|------|------|------|------|------|
| 100 | 1 | 1 | CARD a, PORT#1 | 0 | — | 1 | FIRST PATH |
| ... | ... | ... | ... | ... | ... | ... | ... |

PATH TABLE 251c1

FIG. 13

PATH TABLE 251d1

| VID | VID VALIDITY FLAG | FIRST PATH ENABLE FLAG | FIRST PATH DATA | SECOND PATH ENABLE FLAG | SECOND PATH DATA | RECEIVING PGID | RECEIVING PG PATH |
|---|---|---|---|---|---|---|---|
| 100 | 1 | 1 | CARD a, PORT#1 | 0 | - | 1 | SECOND PATH |
| ... | ... | ... | ... | ... | ... | ... | ... |

FIG. 17

PATH TABLE 351a1

| VID | VID VALIDITY FLAG | FIRST PATH ENABLE FLAG | FIRST PATH DATA | SECOND PATH ENABLE FLAG | SECOND PATH DATA | SENDING PGID | RECEIVING PGID | RECEIVING PG PATH |
|---|---|---|---|---|---|---|---|---|
| 100 | 1 | 1 | CARD c, PORT#1 | 1 | CARD d, PORT#1 | 1 | 0 | FIRST PATH |
| ... | ... | ... | ... | ... | ... | ... | ... | ... |

FIG. 18

| VID | VID VALIDITY FLAG | FIRST PATH ENABLE FLAG | FIRST PATH DATA | SECOND PATH ENABLE FLAG | SECOND PATH DATA | SENDING PGID | RECEIVING PGID | RECEIVING PG PATH |
|---|---|---|---|---|---|---|---|---|
| 100 | 1 | 1 | CARD a, PORT#1 | 0 | - | 0 | 1 | FIRST PATH |
| ... | ... | ... | ... | ... | ... | ... | ... | ... |

PATH TABLE 351c1

FIG. 19

PATH TABLE 351d1

| VID | VID VALIDITY FLAG | FIRST PATH ENABLE FLAG | FIRST PATH DATA | SECOND PATH ENABLE FLAG | SECOND PATH DATA | SENDING PGID | RECEIVING PGID | RECEIVING PG PATH |
|---|---|---|---|---|---|---|---|---|
| 100 | 1 | 1 | CARD a, PORT#1 | 0 | - | 0 | 1 | SECOND PATH |
| ... | ... | ... | ... | ... | ... | ... | ... | ... |

FIG. 26

| VID | VID VALIDITY FLAG | FIRST PATH ENABLE FLAG | FIRST PATH DATA | SECOND PATH ENABLE FLAG | SECOND PATH DATA | SENDING PGID | RECEIVING PGID | RECEIVING PG PATH |
|---|---|---|---|---|---|---|---|---|
| 100 | 1 | 1 | CARD d, PORT#1 | 1 | CARD c, PORT#1 | 2 | 1 | FIRST PATH |
| ... | ... | ... | ... | ... | ... | ... | ... | ... |

PATH TABLE 451a1

FIG. 27

PATH TABLE 451b1

| VID | VID VALIDITY FLAG | FIRST PATH ENABLE FLAG | FIRST PATH DATA | SECOND PATH ENABLE FLAG | SECOND PATH DATA | SENDING PGID | RECEIVING PGID | RECEIVING PG PATH |
|---|---|---|---|---|---|---|---|---|
| 100 | 1 | 1 | CARD d, PORT#1 | 1 | CARD c, PORT#1 | 2 | 1 | SECOND PATH |
| ... | ... | ... | ... | ... | ... | ... | ... | ... |

FIG. 28

PATH TABLE 451c1

| VID | VID VALIDITY FLAG | FIRST PATH ENABLE FLAG | FIRST PATH DATA | SECOND PATH ENABLE FLAG | SECOND PATH DATA | SENDING PGID | RECEIVING PGID | RECEIVING PG PATH |
|---|---|---|---|---|---|---|---|---|
| 100 | 1 | 1 | CARD a, PORT#1 | 1 | CARD b, PORT#1 | 1 | 2 | SECOND PATH |
| ... | ... | ... | ... | ... | ... | ... | ... | ... |

FIG. 29

| VID | VID VALIDITY FLAG | FIRST PATH ENABLE FLAG | FIRST PATH DATA | SECOND PATH ENABLE FLAG | SECOND PATH DATA | SENDING PGID | RECEIVING PGID | RECEIVING PG PATH |
|---|---|---|---|---|---|---|---|---|
| 100 | 1 | 1 | CARD a, PORT#1 | 1 | CARD b, PORT#1 | 1 | 2 | FIRST PATH |
| ... | ... | ... | ... | ... | ... | ... | ... | ... |

PATH TABLE 451d1

FIG. 30A

GROUP TABLE 452a1

| PGID | PATH SELECTION DATA |
|------|---------------------|
| 0 | FIRST PATH (FIXED) |
| 1 | FIRST PATH |
| 2 | FIRST PATH |
| ⋮ | ⋮ |

FIG. 30B

GROUP TABLE 452a2

| PGID | PATH SELECTION DATA |
|------|---------------------|
| 0 | FIRST PATH (FIXED) |
| 1 | SECOND PATH |
| 2 | SECOND PATH |
| ⋮ | ⋮ |

FIG. 34

PATH TABLE 551a1

| VID | VID VALIDITY FLAG | FIRST PATH ENABLE FLAG | FIRST PATH DATA | SECOND PATH ENABLE FLAG | SECOND PATH DATA | SENDING PGID | RECEIVING PGID | RECEIVING PG PATH |
|---|---|---|---|---|---|---|---|---|
| 100 | 1 | 1 | CARD c, PORT#1 | 1 | CARD d, PORT#1 | 1 | 0 | FIRST PATH |
| ... | ... | ... | ... | ... | ... | ... | ... | ... |

FIG. 35

| VID | VID VALIDITY FLAG | FIRST PATH ENABLE FLAG | FIRST PATH DATA | SECOND PATH ENABLE FLAG | SECOND PATH DATA | SENDING PGID | RECEIVING PGID | RECEIVING PG PATH |
|---|---|---|---|---|---|---|---|---|
| 200 | 1 | 1 | CARD d, PORT#1 | 0 | - | 0 | 1 | FIRST PATH |
| ... | ... | ... | ... | ... | ... | ... | ... | ... |

PATH TABLE 551b1

FIG. 36

| VID | VID VALIDITY FLAG | FIRST PATH ENABLE FLAG | FIRST PATH DATA | SECOND PATH ENABLE FLAG | SECOND PATH DATA | SENDING PGID | RECEIVING PGID | RECEIVING PG PATH |
|---|---|---|---|---|---|---|---|---|
| 100 | 1 | 1 | CARD a, PORT#1 | 0 | - | 0 | 1 | FIRST PATH |
| ... | ... | ... | ... | ... | ... | ... | ... | ... |

PATH TABLE 551c1

FIG. 37

PATH TABLE 551d1

| VID | FIRST PATH ENABLE FLAG | FIRST PATH DATA | SECOND PATH ENABLE FLAG | SECOND PATH DATA | SENDING PGID | RECEIVING PGID | RECEIVING PG PATH |
|---|---|---|---|---|---|---|---|
| VID VALIDITY FLAG | | | | | | | |
| 1 | | | | | | | |
| 100 | 1 | CARD a, PORT#1 | 0 | - | 0 | 1 | SECOND PATH |
| 200 | 1 | CARD a, PORT#1 | 0 | - | 0 | 1 | FIRST PATH |
| ... | ... | ... | ... | ... | ... | ... | ... |

FIG. 39A

GROUP TABLE 652a1

| PGID | GROUP ENABLE FLAG | PATH SELECTION DATA |
|---|---|---|
| 0 | 1 | FIRST PATH (FIXED SETTING) |
| 1 | 1 | FIRST PATH |
| 2 | 0 | FIRST PATH |
| ⋮ | ⋮ | ⋮ |

FIG. 39B

GROUP TABLE 652a2

| PGID | GROUP ENABLE FLAG | PATH SELECTION DATA |
|---|---|---|
| 0 | 1 | FIRST PATH (FIXED SETTING) |
| 1 | 1 | SECOND PATH |
| 2 | 0 | SECOND PATH |
| ⋮ | ⋮ | ⋮ |

FIG. 44

| VID | VID VALIDITY FLAG | FIRST PATH ENABLE FLAG | FIRST PATH DATA | SECOND PATH ENABLE FLAG | SECOND PATH DATA | 1+1 ENABLE FLAG | SENDING PGID | RECEIVING PGID | RECEIVING PG PATH |
|---|---|---|---|---|---|---|---|---|---|
| 100 | 1 | 1 | CARD c, PORT#1 | 1 | CARD d, PORT#1 | 1 | 1 | 0 | FIRST PATH |
| ... | ... | ... | ... | ... | ... | ... | ... | ... | ... |

PATH TABLE 751a1

APPARATUS AND METHOD FOR CONTROLLING DATA COMMUNICATION

CROSS-REFERENCE TO RELATED APPLICATION(S)

This application is based upon and claims the benefit of priority of the prior Japanese Patent Application No. 2009-226331, filed on Sep. 30, 2009, the entire contents of which are incorporated herein by reference.

FIELD

The embodiments discussed herein relate to an apparatus and method for controlling data communication using a redundant logical path.

BACKGROUND

Recent years have seen a growing demand for path protection mechanisms for use in carrier networks operated by telecommunication service providers and the like. To offer more reliable, enhanced services in Ethernet™ transport networks, protection switching techniques are applied to logical paths carrying Ethernet frames. In this technical field, the International Telecommunication Union Telecommunication Standardization Sector provides the ITU-T G.8031 standard for Ethernet Protection Switching.

The path protection mechanism employs working and protection transport entities, or two logical paths with different routes on the network, to provide a redundant connection, unlike the link aggregation which combines physical paths between physical ports of two network devices. In normal situations, Ethernet frames and other traffic are exchanged over working entity. When the working entity fails, the traffic is switched to protection entity to maintain the ongoing communication over the network. For example, the following literature provides conventional path protection techniques:

Japanese Laid-open Patent Publication No. 2007-116275
Japanese Laid-open Patent Publication No. 2007-181010

A single protection domain may accommodate a plurality of protected logical paths to transport a large number of user data flows. In the event of failure, the above-noted conventional techniques execute a path switching operation on an individual flow basis. Accordingly, the more user data flows are accommodated, the more time it will take to complete path switching.

In the Ethernet protection switching, the path table entry for a specific user data flow has a Virtual LAN identifier (VLAN ID) validity flag, first path enable flag, and second path enable flag, whose values may be modified to switch the path for that flow. The network device executes path protection switching of each flow with its internal software module. When there are many flows, it will take a long time until the device can finish the switching of all those flows.

Suppose, for example, that two thousand user data flows are running over the same path protection domain. In the case of failure, those flows have to be switched one by one. For example, each single flow consumes 50 µs for switching, while given system requirements dictate a maximum switchover time of 50 ms. The total switchover time for two thousand user data flows amounts to 100 ms, meaning that the network fails to meet the maximum switchover time of 50 ms.

SUMMARY

According to an aspect of the invention, there is provided a communication apparatus for transporting data in a network section employing redundancy for logical path connection. This communication apparatus includes the following elements: a group data memory to store group data records which associate protection group identifiers with path selection data, the protection group identifiers each identifying a protection group that provides logical paths constituting a redundant logical path for transporting a group of data, the path selection data specifying which logical path to use to forward data in each protection group; a receive data processor to receive data and retrieves a group data record corresponding to the received data out of the group data memory; and a forwarding processor to forward the received data according to the group data record retrieved by the receive data processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 1 illustrates a first embodiment;
FIG. 2 is a block diagram giving an overview of a communications system according to a second embodiment;
FIG. 3 illustrates a hardware configuration of a switch according to the second embodiment;
FIG. 4 is a functional block diagram of a switch according to the second embodiment;
FIG. 5 illustrates a mechanism of forwarding frames according to the second embodiment;
FIG. 6 illustrates how the second embodiment modifies group data;
FIG. 7 illustrates an example data structure of path tables according to the second embodiment;
FIGS. 8A and 8B illustrate an example data structure of group tables according to the second embodiment;
FIGS. 9 and 10 are a method illustrating a process to make a forwarding decision according to the second embodiment;
FIG. 11 is a functional block diagram of a switch according to a third embodiment;
FIGS. 12 and 13 illustrate an example data structure of path tables according to the third embodiment;
FIGS. 14 and 15 are a method illustrating a process to make a forwarding decision according to the third embodiment;
FIG. 16 is a functional block diagram of a switch according to a fourth embodiment;
FIGS. 17 to 19 illustrate an example data structure of path tables according to the fourth embodiment;
FIGS. 20 to 22 are a method illustrating a process to make a forwarding decision according to the fourth embodiment;
FIG. 23 is a functional block diagram of a switch according to a fifth embodiment;
FIG. 24 illustrates how frames are transferred in normal situation according to the fifth embodiment;
FIG. 25 illustrates how frames are transferred in a failure situation according to the fifth embodiment;
FIGS. 26 to 29 illustrate an example data structure of path tables according to the fifth embodiment;
FIGS. 30A and 30B illustrate an example data structure of group tables according to the fifth embodiment;
FIG. 31 is a functional block diagram of a switch according to a sixth embodiment;
FIG. 32 illustrates how frames are transferred in normal situation according to the sixth embodiment;

FIGS. 34 to 37 illustrate an example data structure of path tables according to the sixth embodiment;

FIGS. 39A and 39B illustrate an example data structure of group tables according to the seventh embodiment;

FIG. 44 illustrates an example data structure of path tables according to the eighth embodiment.

DESCRIPTION OF EMBODIMENT(S)

Figure 1:
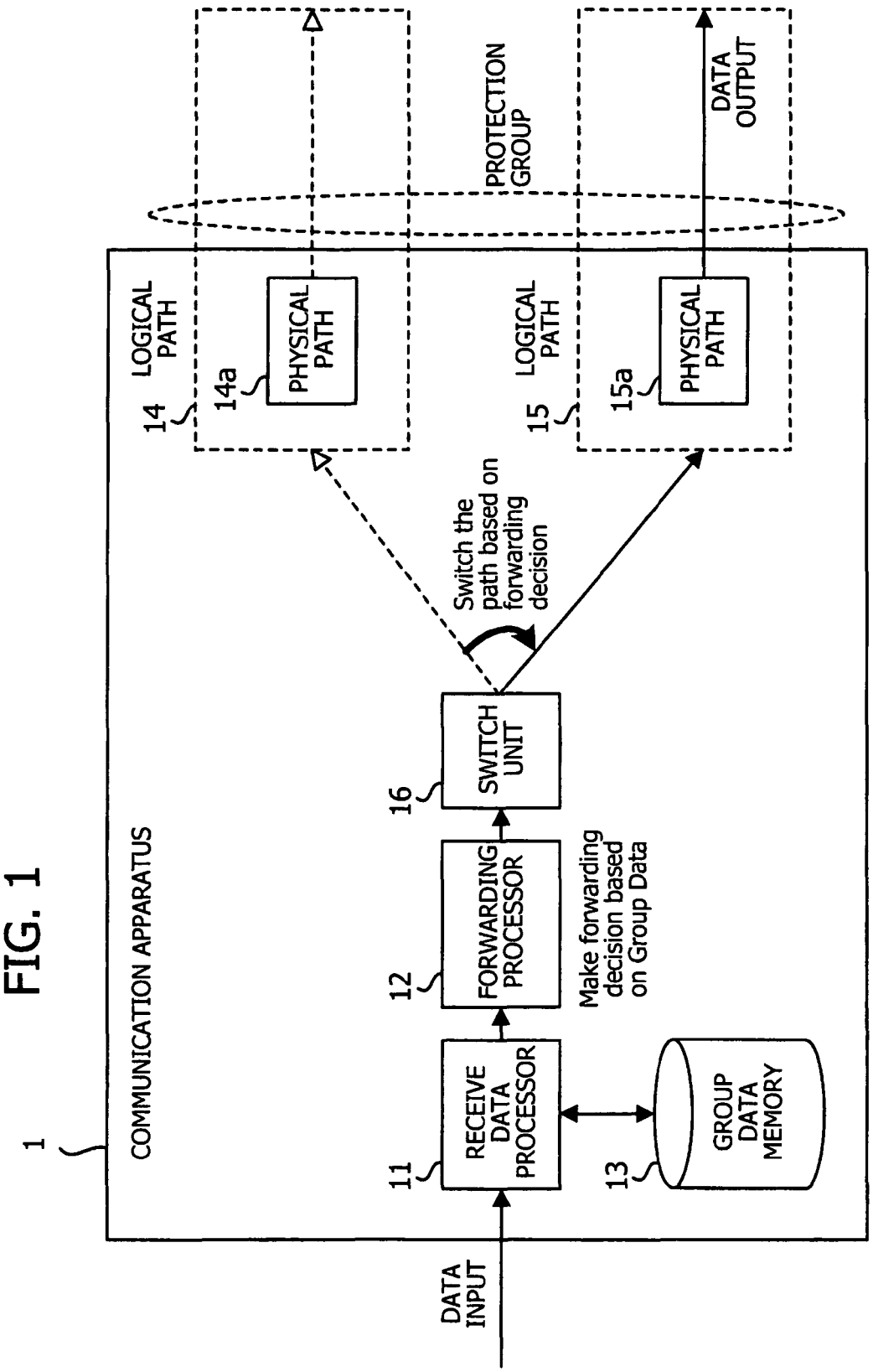

Embodiments of the present invention will be described below with reference to the accompanying drawings, wherein like reference numerals refer to like elements throughout.

(a) First Embodiment

FIG. 1 illustrates a communication apparatus 1 according to a first embodiment. This communication apparatus 1 is configured to transport data in a network section which employs redundancy for logical path connection. The illustrated communication apparatus 1 includes, among other things, a receive data processor 11, a forwarding processor 12, and a group data memory 13. Also included in the communication apparatus 1 are logical paths 14 and 15 which constitute a redundant logical path for transporting data. The communication apparatus 1 further includes a switch unit 16 to select one of the logical paths 14 and 15, based on a forwarding decision made by the forwarding processor 12. The former logical path 14 has a physical path 14a linked to a specific destination. Similarly, the latter logical path 15 has a physical path 15a.

The communication apparatus 1 receives data (e.g., frames and packets) from a user terminal device (not illustrated) and forwards the received data according to address and other information contained in the received data. For example, in the case where the input data is Ethernet frames, the communication apparatus 1 forwards them based on the media access control (MAC) address contained in each received frame. In the case where the input data is Internet Protocol (IP) frames, the communication apparatus 1 forwards them based on the IP address contained in each received frame.

The receive data processor 11 receives such input data and retrieves a group data record corresponding to the received data out of the group data memory 13. It is noted that this input data may be brought to the communication apparatus 1 via a redundant logical path, or a non-redundant logical path, or a physical path that does not belong to any logical paths.

According to the group data record retrieved by the receive data processor 11, the forwarding processor 12 makes a forwarding decision, i.e., determines which one of the logical paths 14 and 15 is to be used to forward the received data. Based on this forwarding decision, the switch unit 16 directs the received data to the determined logical path. Accordingly, the physical path 14a or 15a of the selected logical path 14 or 15 transports the data toward its destination network device, which may be a peer communication apparatus or a terminal device connected to the communication apparatus 1.

The group data memory 13 stores group data, i.e., a collection of records which associate protection group identifiers with path selection data. The protection group identifiers each identify a protection group that provides logical paths constituting a redundant logical path for transporting a group of data. In the present embodiment illustrated in FIG. 1, two logical paths 14 and 15 constitute a dual-redundant logical path, thus serving as a protection group. Path selection data associated with a protection group specifies which logical path in that protection group is to be used to forward data.

With the above-described arrangement, the communication apparatus 1 controls logical paths for transporting data traffic according to its relevant path selection data, in a network section employing redundancy for protection. Accordingly, the logical paths can be switched by modifying path selection data corresponding to the protection group of interest. This modification to the path selection data affects all data flows associated with the protection group, meaning that all those flows are switched at a time. This feature thus enables quick path switching operation.

The following sections will describe more specific embodiments of the communication apparatus outlined above. As an example implementation of the proposed communication apparatus, the following embodiments will discuss layer-2 (L2) switches which receive and forward frames of data link layer based on the media access control (MAC) address. It is not intended, however, to limit the scope of the present invention by those specific implementations. For example, the same features may also be applied to Internet Protocol (IP) routers and layer-3 switches that operate in the network layer based on IP address. While those skilled in the art may use both terms "packet" and "frame" to refer to the data units of layer 2 in the Open Systems Interconnection (OSI) reference model, the following part of the description will use the latter term "frame" consistently to refer to such data units for the reason of expediency.

(b) Second Embodiment

Figure 2:
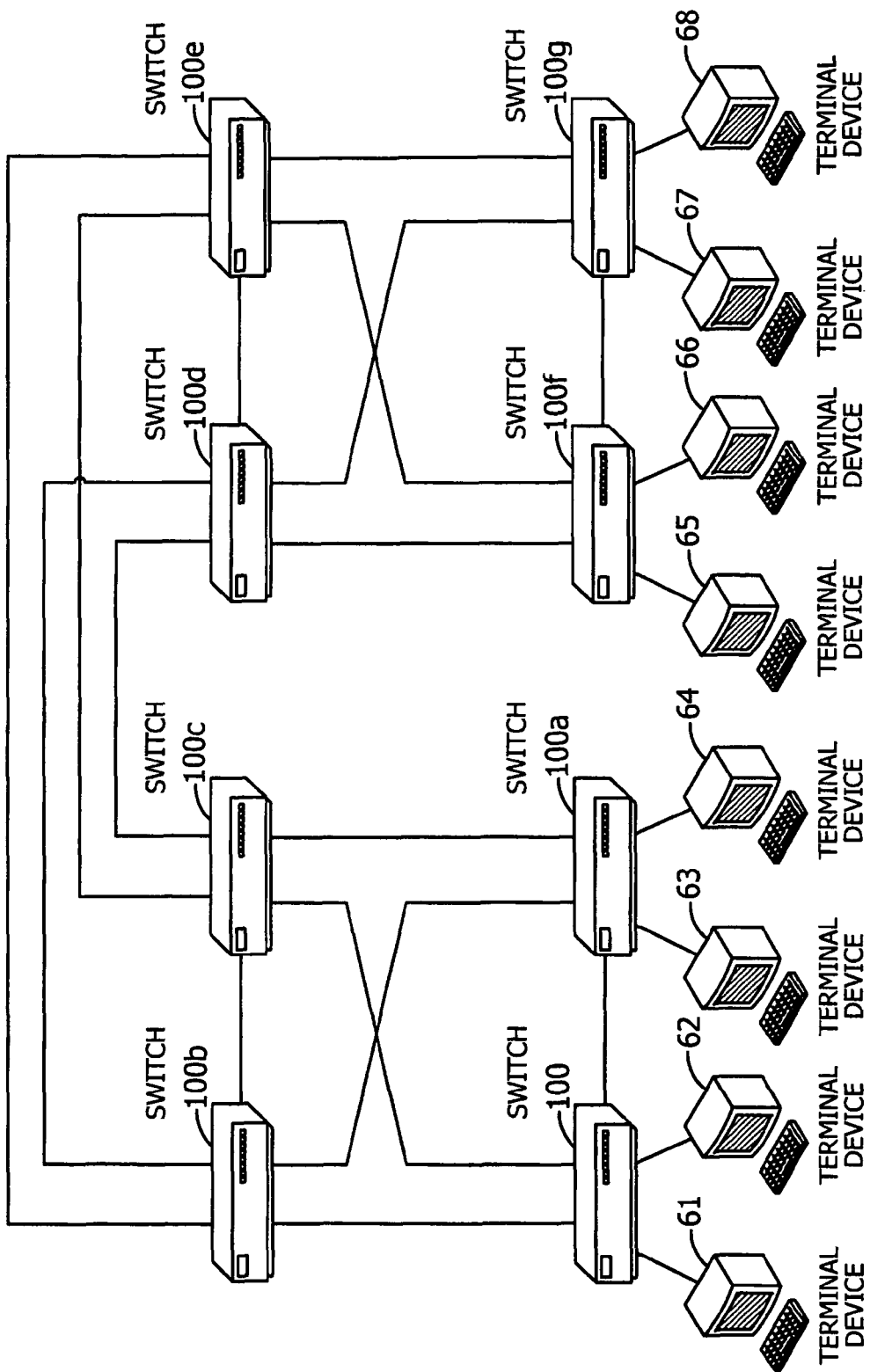

A second embodiment will now be described below. FIG. 2 is a block diagram giving an overview of a communications system according to the second embodiment. This communications system employs a plurality of L2 switches to forward frames of data link layer, thereby permitting terminal devices to exchange data with each other. Specifically, the communications system of FIG. 2 is formed from L2 switches (or simply "switches") 100 and 100a to 100g and terminal devices 61 to 68 attached to some of them. The terminal devices 61 to 68 are user devices. The switches 100 and 100a to 100g are similar to each other in terms of their structures and functions.

As can be seen from FIG. 2, the switch 100 is connected to three switches 100a, 100b, and 100c. The switch 100a is linked to three switches 100, 100b, and 100c. The switch 100b is linked to five switches 100, 100a, 100c, 100d, and 100e. The switch 100c is linked to five switches 100, 100a, 100b, 100d, and 100e. The switch 100d is linked to five switches 100b, 100c, 100e, 100f, and 100g. The switch 100e is linked to five switches 100b, 100c, 100d, 100f, and 100g. The switch 100f is linked to three switches 100d, 100e, and 100g. Lastly, the switch 100g is linked to three switches 100d, 100e, and 100f.

Two terminal devices 61 and 62 are attached to the switch 100. Another two terminal devices 63 and 64 are attached to the switch 100a. Yet another two terminal devices 65 and 66 are attached to the switch 100f. Still another two terminal devices 67 and 68 are attached to the switch 100g. Each switch-to-switch connection is organized by one or more physical links (network cables), as is each switch-to-terminal connection.

The above network of switches 100 and 100a to 100g delivers frames from their source terminal devices to destination terminal devices according to address information contained therein. Suppose, for example, that one terminal device 61 has placed a frame addressed to another terminal device 68. This frame is forwarded by the switch 100, switch 100c, switch 100d, and switch 100g in that order before it reaches the destination terminal device 68.

Figure 3:
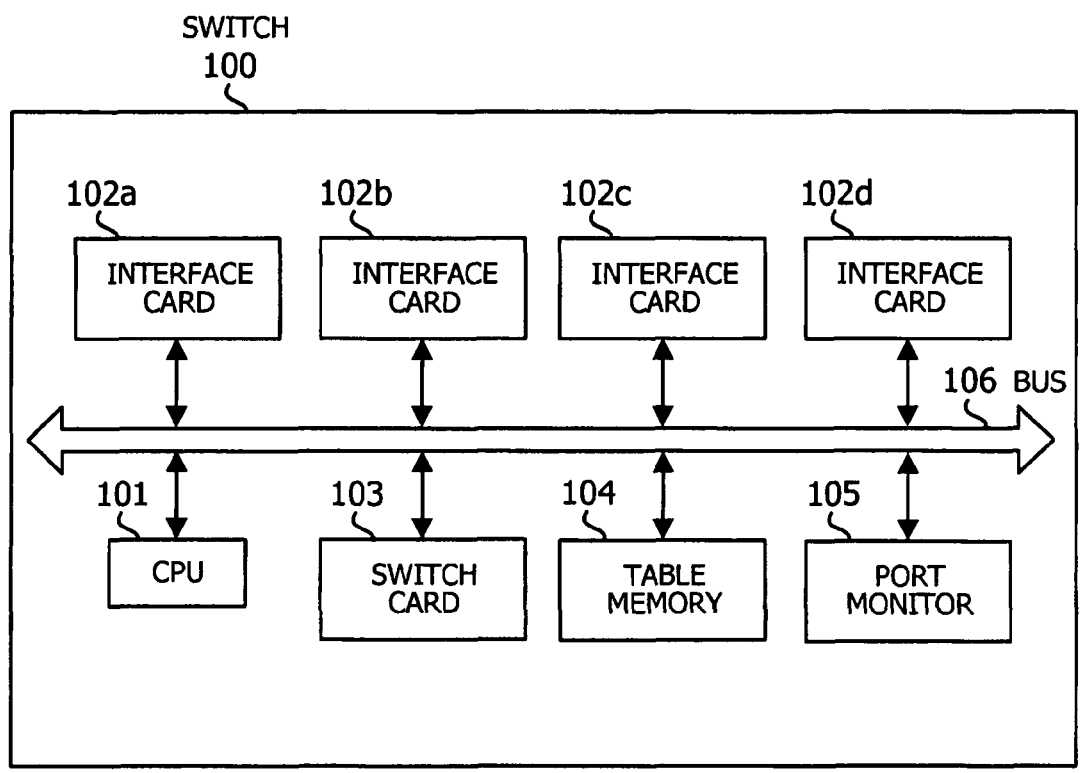

FIG. 3 illustrates a hardware configuration of a switch according to the second embodiment. More specifically, FIG. 3 illustrates an internal structure of one switch 100, which may similarly apply to the other switches 100a to 100g. The illustrated switch 100 includes a central processing unit (CPU) 101, four interface cards 102a, 102b, 102c, and 102d, a switch card 103, a table memory 104, a port monitor 105, and a bus 106.

The CPU 101 controls the entire system of the switch 100 by executing software programs stored in a memory (not illustrated), together with data stored in the same. Via a communication interface (not illustrated), the CPU 101 may receive commands from a system administrator through his or her terminal station (not illustrated). The CPU 101 executes the received commands and sends the results back to the administrator's terminal station. The table memory 104 contains a plurality of tables to manage logical link configurations, make decisions for forwarding frames over a logical link, and save the records of such forwarding decisions. The bus 106 is used to connect the CPU 101, interface cards 102a to 102d, switch card 103, table memory 104, and port monitor 105 with each other.

Each interface card 102a to 102d provides a plurality of (e.g., eight) communication ports, which can each accommodate one physical link. The interface cards 102a to 102d watch their ports to receive incoming frames. To allow concurrent receipt of frames at two or more communication ports, the interface cards 102a to 102d have internal buffers (not depicted) configured as temporary storage of received frames. The interface cards 102a to 102d supply those received frames to the switch card 103.

While not depicted in FIG. 3, the switch card 103 has a table to store source addresses of incoming frames, together with the identifiers of communication ports or logical links through which those packets arrive. This table may be established beforehand in a static manner. Upon receipt of a frame from one of the interface cards 102a, 102b, 102c, and 102d, the switch card 103 consults the table to determine where to forward the received frame. In the case where the determined destination is a logical link, the switch card 103 selects a specific physical interface card and port for forwarding the frame, by consulting the table stored in the table memory 104. The switch card 103 then sends the frame to the selected interface card. The receiving interface card 102a, 102b, 102c, and 102d transmits the frame from the selected communication port.

The port monitor 105 monitors communication ports of each interface card 102a, 102b, 102c, and 102d to detect failure (and recovery therefrom) of physical links connected to those ports. Upon detection of such an event, the port monitor 105 notifies the CPU 101 of that fact.

Figure 4:
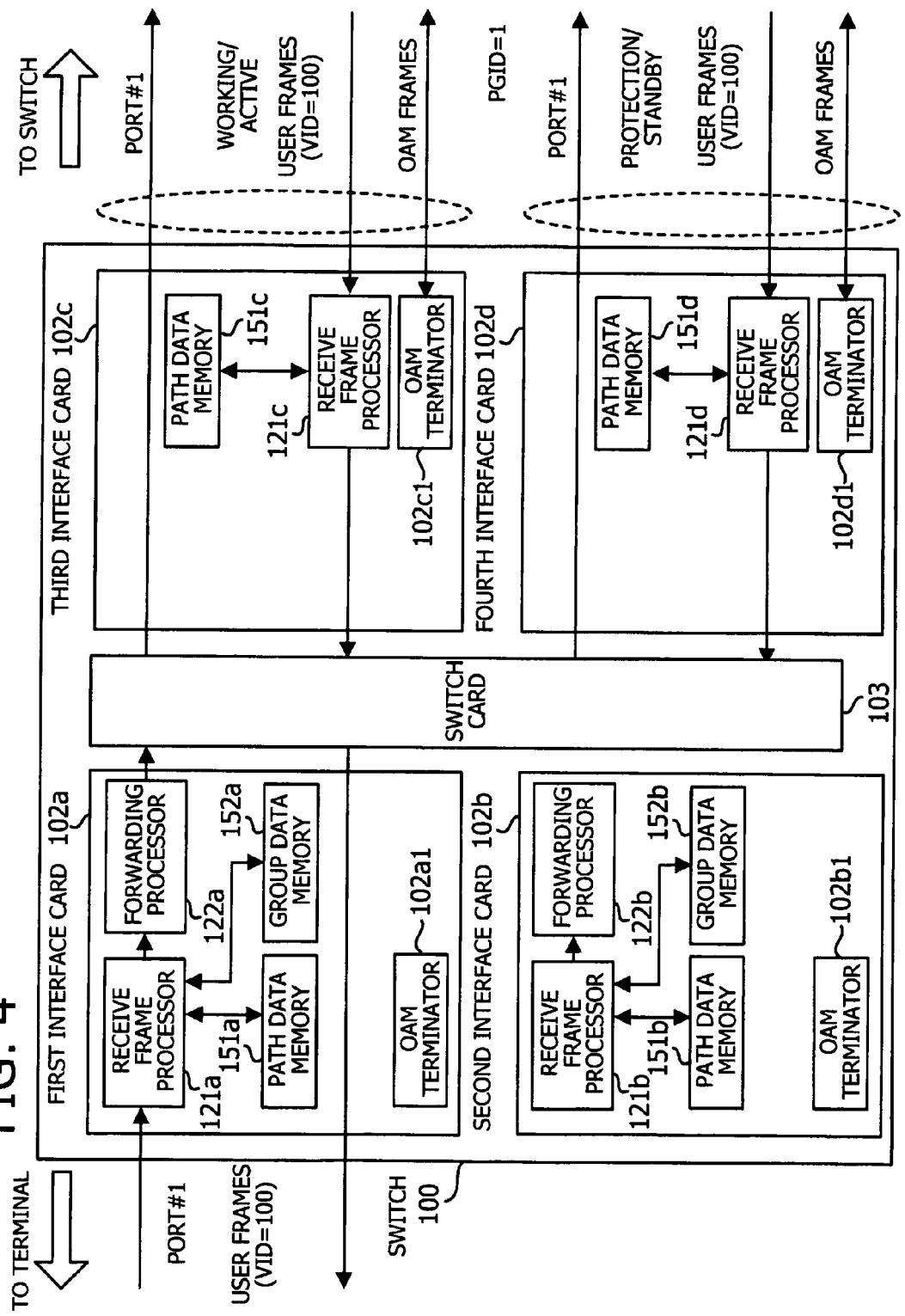

FIG. 4 is a functional block diagram of a switch according to the second embodiment. While FIG. 4 depicts only one switch 100, other switches 100a to 100g discussed in FIG. 2 also include similar functions. Briefly, FIG. 4 illustrates how the switch 100 handles a flow of user frames with a VID of 100 when it is received from a terminal device. For example, user frames are received by an interface card 102a and directed to either of two interface cards 102c and 102d that provide path protection capabilities.

According to the second embodiment, the switch 100 transports user frames by using a logical path that is duplexed over a specific network section, while making a forwarding decision for each user frame to be transmitted via a protected path. This switch 100 includes four interface cards 102a, 102b, 102c, and 102d, and a switch card 103. Where appropriate, the interface cards 102a to 102d are referred to by ordinal numbers, first to fourth, for explanatory purposes, as seen in FIG. 4 (and, for that matter, in other drawings that follow). The first interface card 102a includes an Operations, Administration, and Maintenance (OAM) terminator 102a1, a receive frame processor 121a, a forwarding processor 122a, a path data memory 151a, a group data memory 152a, and a controller (not illustrated in FIG. 4, but will be described in detail later with reference to FIG. 6).

To link with a peer communication apparatus, terminal device, or other network device, the first interface card 102a provides a network port (e.g., port #1) including interface functions, receive frame processing functions, transmit frame processing functions, and the like. The first interface card 102a may be implemented as a plug-in module that can be attached to or detached from the switch 100 as necessary. Alternatively, the interface card 102a may be integrated with the switch 100, or implemented as part of a motherboard for the switch 100.

The first interface card 102a outputs or discards received user frames, depending on forwarding decisions made by its forwarding processor 122a. In the former case, user frames are transmitted according to their relevant logical path data.

The OAM terminator 102a1 provides Ethernet OAM functions to detect failure of a path between communication devices by sending and receiving OAM frames. In other words, the OAM terminator 102a1 serves here as a failure detector. The functions of such OAM terminators 102a1 to 102d1 will be discussed in detail later, with reference to FIG. 5.

The receive frame processor 121a receives user frames from an attached terminal device via a redundant logical path, or a non-redundant logical path, or a physical path that does not belong to any logical paths. Those user frames are user data transported over the network including the switch 100 by using statistical multiplexing techniques. Upon receipt of such a user frame, the receive frame processor 121a retrieves a group data record relevant to the received user frame.

More specifically, the received user frame contains a specific VID, and the path data memory 151a stores path data for various VIDs. The receive frame processor 121a thus consults the path data memory 151a to retrieve a path data record corresponding to the VID of the received user frame. The retrieved path data record contains a specific sending protection group identifier (sending PGID), which may be found as part of group data stored in the group data memory 152a. This PGID permits retrieval of a group data record corresponding to the received user frame. In the present case of FIG. 4, the receive frame processor 121a receives a user frame via a non-redundant path from a terminal device and retrieves its corresponding group data record from the group data memory 152a. In this way, the receive frame processor 121a operates as the foregoing receive data processor 11 (FIG. 1).

PGID is an identifier used in the switch 100 to manage each path protection domain, or a section of the network where the path protection is available. According to the second embodiment, the switch 100 assigns this protection group identifier, PGID, to each flow of user data, so that the paths can be switched depending on the assigned PGIDs.

The forwarding processor 122a makes a forwarding decision for the received user frame, based on path selection data in the group data record that the receive frame processor 121*a* has retrieved. This decision is whether to forward or discard the received user frame, and in the case of forwarding the frame to a logical path, whether to use working entity or protection entity. In path protection, the working entity is a logical path that is used to forward a user flow in normal situation. The protection entity is a logical path that will be used in place of the working entity in the event of failure of the working entity.

It is noted here that the designation of working and protection entities is fixed, or static. That is, the working entity and protection entity do not swap their names, whether or not they are currently activated to transport frames. In the example of FIG. 4, the third interface card 102*c* is designated as working entity, and the fourth interface card 102*d* as protection entity, to transport user frames of VID=100. This designation does not change even if path switching is performed for those user frames.

In addition to the above distinctions between working and protection entities, a logical path is labeled "active" when it is currently used to transport user flows, and "standby" when it is not used to transport user flows at present, but ready to replace the currently active logical path in the event of failure or the like. The state of a logical path changes from active to standby, or standby to active, when protection switching is performed. Specifically, FIG. 4 illustrates user frames with VID=100 being sent out not from the standby interface card 102*d*, but from the active interface card 102*c*. These two interface cards 102*c* and 102*d* swap their roles when protection switching is performed on the logical path. User frames are now routed to the new active interface card 102*d*, whereas the ex-active interface card 102*c* enters standby state.

The path data memory 151*a* stores path data, i.e., a collection of records each including the following associated information items: (a) VLAN ID (VID) identifying user frames, (b) logical path data describing other interface cards 102*c* and 102*d* (physical paths) associated with a receiving logical path of those user frames, and (c) sending PGID indicating a protection group used to transport those user frames. This path data describes a logical path used to transport given user frames. According to the second embodiment, the flow of user frames is identified by their VID. A protection group has a working entity for use in normal situation to transport user frames and a protection entity for use in the event of failure of the working entity. More details of path data will be discussed later with reference to FIG. 7.

The group data memory 152*a* stores group data, i.e., a collection of records associating protection group identifiers with path selection data. Protection group identifiers identify each specific protection group that provides logical paths constituting a redundant logical path for transporting a group of user frames. Path selection data associated with a protection group specifies which logical path (i.e., working entity or protection entity) of that group is to transport those user frames. The path selection data normally specifies working entity in active state and will be modified when protection entity is activated as a result of protection switching. More details of group data will be discussed later with reference to FIGS. 8A and 8B.

The second interface card 102*b* includes an OAM terminator 102*b*1, a receive frame processor 121*b*, a forwarding processor 122*b*, a path data memory 151*b*, and a group data memory 152*b*. These elements are configured in the same way as their counterparts in the foregoing first interface card 102*a* to provide similar functions.

The third and fourth interface cards 102*c* and 102*d* include OAM terminators 102*c*1 and 102*d*1, receive frame processors 121*c* and 121*d*, path data memories 151*c* and 151*d*, respectively. The OAM terminators 102*c*1 and 102*d*1 function similarly to the foregoing OAM terminator 102*a*1. The receive frame processors 121*c* and 121*d* function similarly to the foregoing receive frame processor 121*a*. The path data memories 151*c* and 151*d* store path data records describing logical paths that the third and fourth interface cards 102*c* and 102*d* use to forward user frames.

The third and fourth interface card 102*c* and 102*d* are connected to other switches on the logical paths as will be described later in FIG. 5. The third interface card 102*c* is currently in active state to transport user frames, besides being designated as a working entity for transporting user frames with VID=100 in normal situation. On the other hand, the fourth interface card 102*d* has been designated as a protection entity which is supposed to transport user frames with VID=100 in the case of failure. The fourth interface card 102*d* is currently in standby state and thus loaded with no user frames. All the above interface cards 102*a* to 102*d* also provide physical path functions.

The switch card 103 routes user frames from their respective receiving interface cards to sending interface cards, based on decisions made by the forwarding processor 122*a*. The switch card 103 is configured to exchange data signals with interface cards 102*a* to 102*d* in the switch 100, so that the frame traffic can be switched among the interface cards 102*a* to 102*d*. The switch card 103 may be implemented as a plug-in module that can be attached to or detached from the switch 100 as necessary. Alternatively, the switch card 103 may be integrated with the switch 100, or implemented as part of a motherboard for the switch 100.

When a failure is detected on a logical path of outgoing user frames, the switch 100 reconfigures itself to replace the faulty path with an alternative logical path. The CPU 101 discussed in FIG. 3 modifies path selection data in the relevant group data record, so that the path selection data designates that alternative logical path. This modification of path selection data will be discussed in detail later with reference to FIG. 6.

The above-described processing functions of the switch 100 and its constituent elements may be encoded in the form of microcode or firmware of, for example, field programmable gate array (FPGA) devices and network processors.

Figure 5:
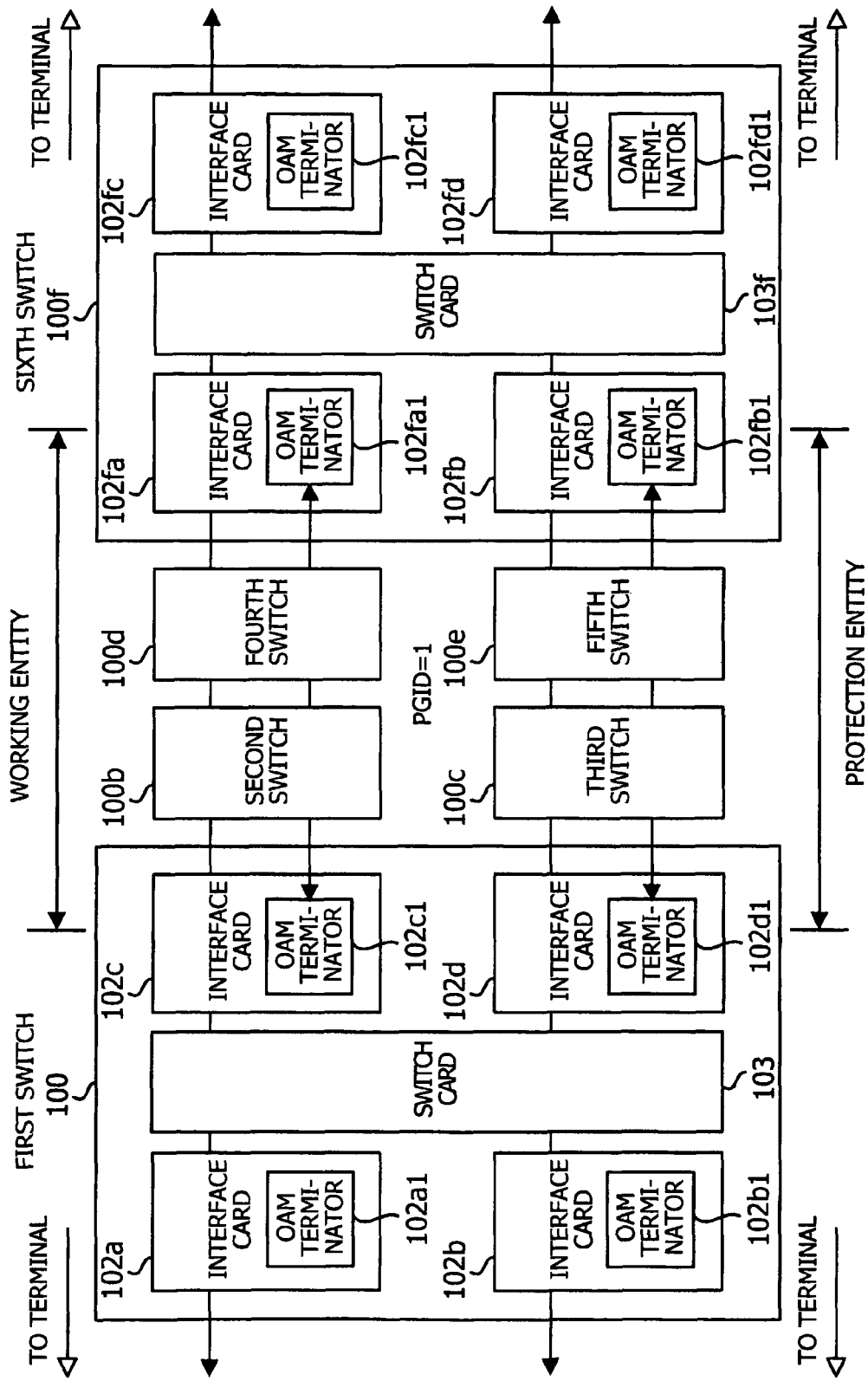

FIG. 5 illustrates a mechanism of forwarding frames according to the second embodiment. As seen from FIG. 5, the second embodiment provides path protection by using six switches 100, 100*b*, 100*c*, 100*d*, 100*e*, and 100*f*, which are designated respectively by ordinal numbers, first to sixth, for explanatory purposes. Terminal devices (not depicted) attached to the first switch 100 and sixth switch 100*f* communicate their user frames. To this end, a redundant logical path is established between the two switches 100 and 100*f*, where one path serves as working entity and another path as protection entity. Note that the second embodiment assumes the 1:1 protection architecture, in which user frames are transported by either the working entity or the protection entity, but not both at a time. Specifically, FIG. 5 illustrates the working entity operating in active state while the protection entity is in standby state. That is, the working entity carries user frames whereas the protection entity does not. In this situation, each switch on the protection entity is configured to discard frames other than OAM frames.

Also, in the second embodiment of FIG. 5, the working and protection entities are deployed in the same network section to support communication between two terminal devices noted above. The first switch 100 monitors this terminal-to-terminal communication by using OAM frames, handling such a redundant network section as a single path protection domain, or path protection group. In this path protection domain, those user frames are assigned a PGID of "1" so as to manage their transport with a single path protection group.

While not illustrated in FIG. 5, the first switch 100 may also be involved in another protection domain, aside from the above-noted path protection domain. Since user frames transported in this additional path protection domain is to be managed separately from those of PGID=1, the switch 100 assigns a different PGID (e.g., PGID=2) to that domain and monitors its condition similarly by using OAM frames.

As can be seen from the above-described embodiment, a common PGID is assigned to a plurality of different logical paths running in the same path protection domain. OAM frames are exchanged regularly to monitor those paths and detect anomalies in the working entity and protection entity between switches 100 and 100f. For example, the working entity may encounter a failure during its active operation. This failure disrupts reception of OAM frames, which leads to detection of a problem with the working network section between the switches 100 and 100f. Protection switching is performed by the interface cards at both ends of the failed working entity, thus forwarding the flow of terminal-to-terminal user frames to protection entity, instead of working entity. Now at the receiving end of working entity, user frames other than OAM frame are discarded if any, as formerly done in protection entity. At the receiving end of protection entity, user frames are fully processed, including OAM frames, for.

Figure 6:
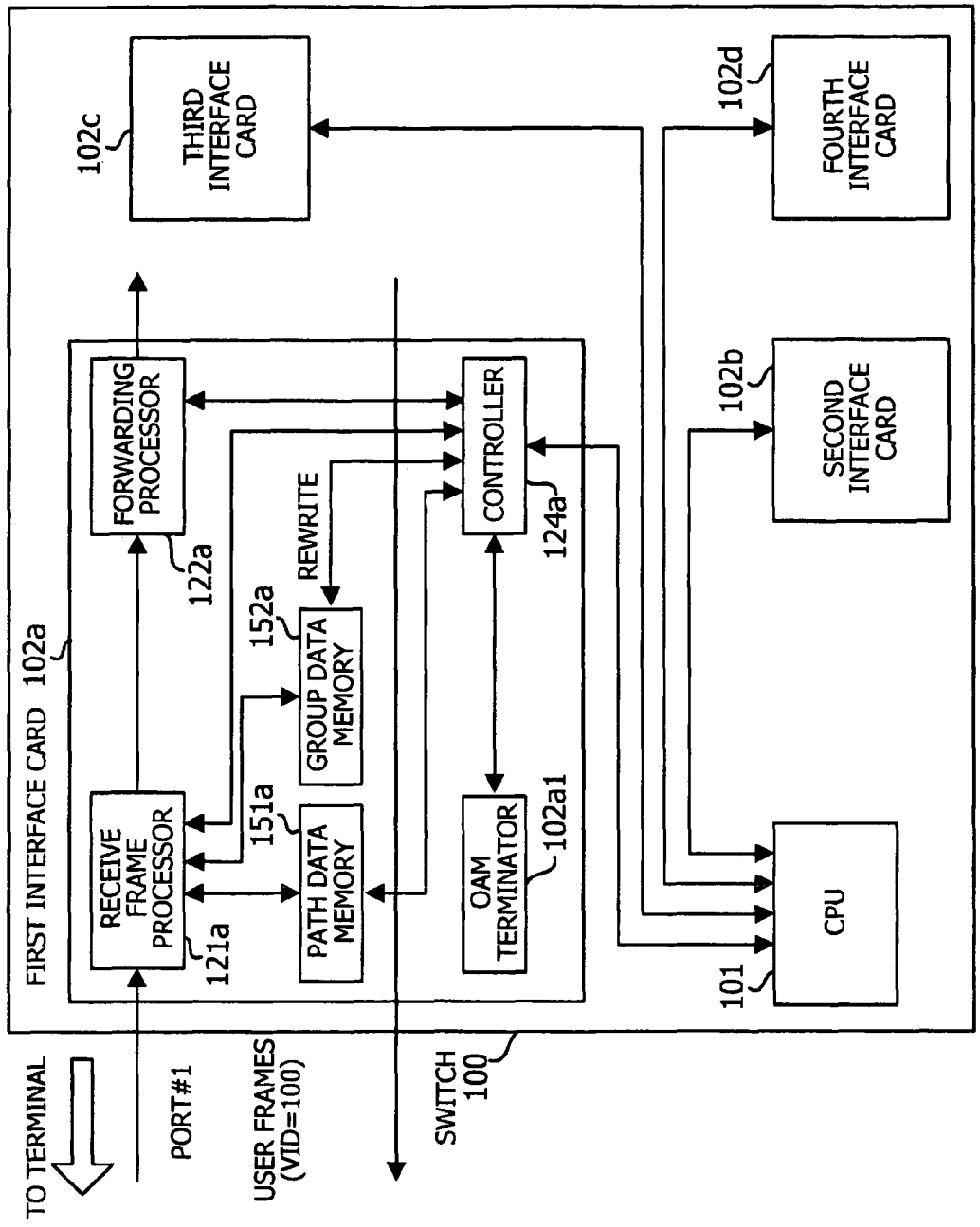

FIG. 6 illustrates how group data is modified according to the second embodiment. While the following explanation will focus on one interface card 102a, the same applies to other interface cards 102b to 102d.

In the illustrated switch 100, the CPU 101 interacts with interface cards 102a to 102d and switch card 103 by exchanging control signals with them, thereby configuring those cards, as well as collecting their alarm information and statistical data. While not illustrated in FIG. 6, the CPU 101 may be able to communicate with a control terminal, external monitor, or the like. The CPU 101 may be implemented in the form of a card or module, so that it can be attached to and detached from the switch 100.

Each interface card includes its own controller (e.g., controller 124a in the first interface card 102a). When switching logical paths, the CPU 101 sends control signals to those controllers so as to modify group data stored in their corresponding group data memories.

The controller 124a controls the first interface card 102a. Under the control of the controller 124a, the receive frame processor 121a and forwarding processor 122a receive and forward user frames with VID=100 via port #1. The controller 124a also manages path data in the path data memory 151a, as well as group data in the group data memory 152a.

The logical path assigned to outgoing user frames is switched to an alternative logical path when, for example, the OAM terminator 102a1 detects a failure on that path. In this case, the controller 124a modifies the path selection data field of a group data record, so that the path selection data field designates the alternative logical path. Suppose, for example, that the working entity has encountered a failure when it is active. In response, the controller 124a modifies a relevant group data record so that its path selection data field specifies the protection entity. The modified group data record permits the forwarding processor 122a to select an alternative logical path for forwarding subsequent user frames.

The deselected logical path may recover from failure afterwards. If such recovery is detected, the controller 124a may optionally restore the original content of the modified group data record so that its path selection data field specifies again the previous logical path used before failure was detected. This feature enables quick reverting of the network.

FIG. 7 illustrates an example data structure of path tables according to the second embodiment. The illustrated path table 151a1 has been prepared by a person who manages the switch 100 and stored in a path data memory 151a under the control of the CPU 101 and controller 124a in the switch 100. This path table 151a1 contains path data describing to which path the switch 100 is supposed to forward received user frames, for use in, for example, Ethernet protection switching. Specifically, the path table 151a1 is formed from the following data fields: "VLAN ID" (VID), "VID Validity Flag," "First Path Enable Flag," "First Path Data," "Second Path Enable Flag," "Second Path Data," and "Sending PGID." The field values arranged in the horizontal direction are associated with each other, thus constituting a single record of path data.

The VID field contains a VLAN ID indicating VLAN to which user frames belong, and the VID validity flag field indicates whether that VLAN ID is valid. Specifically, the VID validity flag takes a value of one to indicate validity and zero to indicate invalidity. When this VID validity flag is zero, the receive frame processor 121a discards user frames having the corresponding VLAN ID.

User frames identified by VID in the VLAN ID field are forwarded to either of two logical paths, which are referred to as first and second paths in the path table 151a1. The first path enable flag field contains a first path enable flag indicating whether the first path is enabled. Specifically, the first path enable flag is set to one when the first path is allowed to output user frames (i.e., first path is enabled). The first path enable flag is set to zero when the first path is not used to transport user frames (i.e., first path is disabled). Similarly, the second path enable flag field contains a second path enable flag indicating whether the second path is enabled. The second path enable flag is set to one when the second path is allowed to output user frames (i.e., second path is enabled). The second path enable flag is set to zero when the second path is not used to transport user frames (i.e., second path is disabled).

The first path data field contains first path data related to user frames identified by the corresponding VID field. This first path data includes output card and output port information indicating which interface card, as well as which port of that card, is used for the first path traffic. Similarly, the second path data field contains second path data related to user frames identified by the corresponding VID field. This second path data includes output card and output port information indicating which interface card, as well as which port of that card, is used for the second path traffic. When a user frame arrives with a certain VLAN ID, the switch 100 checks the first and second path enable flags and outputs the user frame from an output port specified by either the first path data or the second path data, whichever is found enabled.

According to the second embodiment, the path table 151a1 of FIG. 7 contains a value of "Card c" in its first path data field. This "Card c" denotes the third interface card 102c in FIG. 4. The first path data thus means that user frames are sent out of the third interface card 102c when the first path is selected. Likewise, the path table 151a1 of FIG. 7 contains a value of "Card d" in its second path data field, which refers to the fourth interface card 102d in FIG. 4. Accordingly, the second path data means that user frames are sent out of the fourth interface card 102d when the second path is selected.

The sending PGID field contains a sending PGID identifying a protection group to which the interface card sends received user frames. For example, the path table 151a1 in the first interface card 102a contains a value of one in its sending PGID field, since the third and fourth interface cards 102c and 102d sitting on the opposite side are connected to a protected path with PGID=1, as seen in FIG. 4, for forwarding user frames received by the first interface card 102a. When a user frame arrives at the switch 100, this sending PGID is used to find relevant path selection data in a group table, as will be described later in FIGS. 8A and 8B. Based on the found path selection data, either the first path or the second path is selected for the user frame. Then the combination of path enable flag and path data for the selected path (i.e., first path enable flag and first path data, or second path enable flag and second path data) specifies to which port of which interface card the received user frame should be directed.

While FIG. 7 only illustrates the path table 151a1 of the first interface card 102a, another interface card 102b also has a similar path table (not illustrated) in its own path data memory 151b. The latter path table contains information about which path the second interface card 102b uses to forward user frames. Likewise, the other two interface cards 102c and 102d in the switch 100 have their own path tables (not illustrated) in their respective path data memories 151c and 151d to provide information about which path those interface cards 102c and 102d use to forward user frames.

FIGS. 8A and 8B illustrate an example data structure of group tables according to the second embodiment. Specifically, FIG. 8A illustrates a group table 152a1 before path switching, while FIG. 8B illustrates a group table 152a2 after path switching. The group table 152a1 (152a2) has been defined by a person who manages the switch 100 and stored in a group data memory 152a under the control of the CPU 101 and controller 124a in the switch 100. The group table 152a1 (152a2) contains group data records each indicating a path corresponding to a specific protection group. More specifically, the group table 152a1 (152a2) is formed from "PGID" and "Path Selection Data" fields. The field values arranged in the horizontal direction are associated with each other, thus constituting a single record of group data.

While FIGS. 8A and 8B only illustrate a group table 152a1 (152a2) stored in the first interface card 102a, another interface card 102b also has a similar group table (not illustrated) in its group data memory 152b, which contains the same field values as the above-described group table 152a1 (152a2).

The PGID field contains a PGID identifying a specific protection group assigned to user frames. The path selection data field associated with a protection group contains path selection data indicating which path of that group is currently selected as active entity for communication. The CPU 101 modifies the path selection data of a relevant protection group when path switching is triggered as a result of a failure in working entity or other event. More specifically, the original path selection data specifies the first path for a protection group with PGID=1, as seen in the group table 152a1 of FIG. 8A. When the first path fails, the second path is supposed to take over the traffic of PGID=1. The CPU 101 thus modifies path selection data of that protection group to designate the second path as seen in the group table 152a2 of FIG. 8A.

Path selection data may, however, not always be rewritten. As in the case of PGID=0 illustrated in FIGS. 8A and 8B, the path selection data may be fixed to a specific value, so that the same path would be used even in failure situations. Such setup of path selection data enables the interface card to handle both protected user frames and unprotected user frames with a single group table.

According to the second embodiment, PGID is assigned to individual user frames carrying user data, for the purpose of controlling forwarding operation. According to the second embodiment, when a user frame is received by, for example, the first interface card 102a, a sending PGID is retrieved from the path table 151a1, based on VLAN ID of the received user frame and the VID field of the path table 151a1.

With the above features, the second embodiment enables a switch 100 to change the path in the case of failure of working entity or the like, by modifying the path selection data field of group tables stored in group data memories 152a and 152b, without the need for changing path tables in path data memories 151a to 151d. Since the content of group data tables is common to all interface cards 102a to 102d in the switch 100, the CPU 101 can perform the modification in a collective manner by making access to the group data memories 152a and 152b and setting common group data in them. It is therefore possible to perform simultaneous path switching of a plurality of user data flows being served in the same path protection domain, which is faster than the case of rewriting path table entries in individual interface cards for each different user frame traffic.

Figure 10:
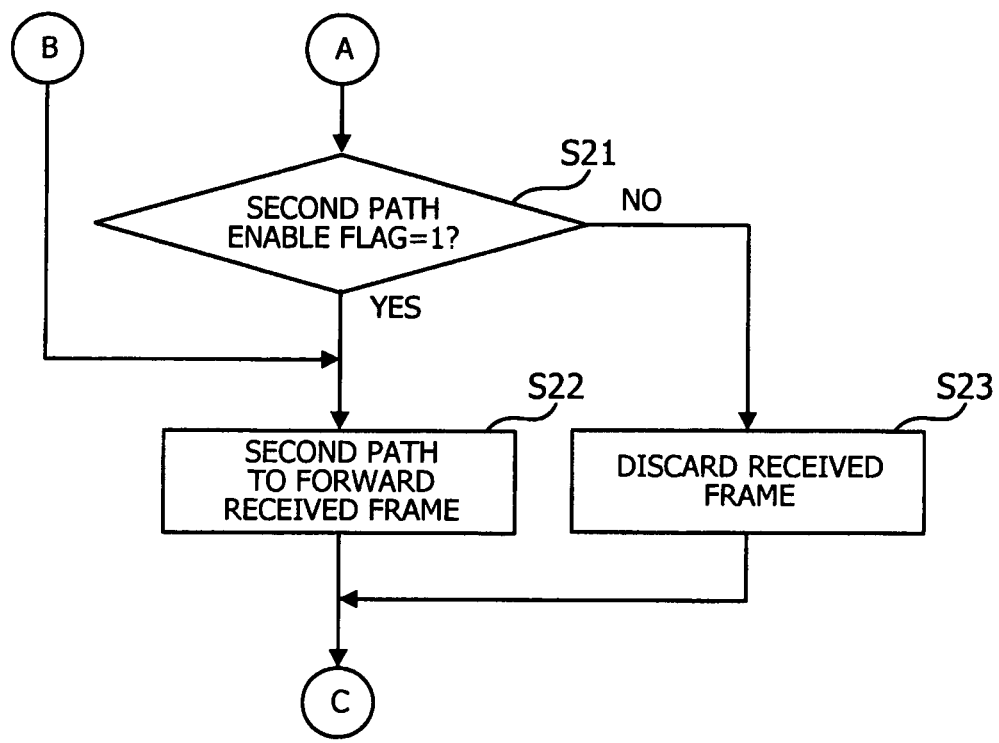

With the above-described structure, the second embodiment executes processing operations described below. FIGS. 9 and 10 are a method of a process of making forwarding decisions according to the second embodiment. This forwarding decision process determines which path to use to forward a given flow of user frames, based on path data and group data corresponding to VID of that flow. The process is initiated when a user frame arrives at a port (e.g., port #1) of the receive frame processor 121a.

According to the forwarding decision process of the second embodiment, the receiving interface card 102a determines PGID of each received user frame based on their VLAN ID and corresponding path data. By using this PGID, a corresponding group data record is retrieved. Based on the path selection data field of the retrieved group data record, it is then determined whether to forward the received user frames to the first path or second path, or to discard those user frames without forwarding them. More specifically, the forwarding decision process executes the following operations:

(Operation S11) The receive frame processor 121a extracts VLAN ID (VID) from a received user frame.

(Operation S12) The receive frame processor 121a consults a path table 151a1 in the path data memory 151a to retrieve a path data record corresponding to the VID extracted at operation S11.

(Operation S13) The receive frame processor 121a consults a group table in the group data memory 152a to find a group data record that corresponds to the sending PGID field of the path data record retrieved at operation S12. Note that the receive frame processor 121a consults the group table 152a1 of FIG. 8A for pre-switching operation, or the group table 152a2 of FIG. 83 for post-switching operation. The same applies to the subsequent part of the description.

(Operation S14) The forwarding processor 122a examines first path enable flag in the path data record retrieved at operation S12. If the first path enable flag is one (i.e., first path is enabled), the process advances to operation S15. If the first path enable flag is zero (i.e., first path is disabled), the process branches to operation S21 (FIG. 10).

(Operation S15) The forwarding processor 122a examines second path enable flag in the path data record retrieved at operation S12. If the second path enable flag is one, the process advances to operation S16. If the second path enable flag is zero, the process skips to operation S17.

(Operation S16) The forwarding processor 122a examines the group data record found at operation S13 to determine whether its path selection data field designates first path. If so, the process advances to operation S17. Otherwise, the process skips to S22 (FIG. 10).

(Operation S17) The forwarding processor 122a concludes that the first path is to forward the user frame, thus terminating the forwarding decision process.

(Operation S21) The forwarding processor 122a examines second path enable flag in the path data record retrieved at operation S12 (FIG. 9). If the second path enable flag is one, the process advances to operation S22. If the second path enable flag is zero, the process proceeds to operation S23.

(Operation S22) The forwarding processor 122a concludes that the second path is to forward the user frame, thus terminating the forwarding decision process.

(Operation S23) The forwarding processor 122a determines to discard the received user frame without forwarding it, thus terminating the forwarding decision process.

As can be seen from the above processing operations of the second embodiment, the receiving interface card 102a relies on path selection data in determining whether to use the first path or second path to forward received user frames. In other words, the forwarding paths can be switched by modifying path selection data. It is therefore possible to perform simultaneous path switching of a plurality of user data flows accommodated in the same path protection domain, which is faster than the case of rewriting path table entries in individual interface cards for each different user frame traffic.

As noted, logical paths are switched for protection by modifying path selection data. The time required for this modification does not depend on the number of user data flows that the switch 100 is forwarding. It is therefore possible to quickly finish the task of switching logical paths even in the case where the switch is loaded with a large number of flows.

After successful protection switching, the working entity may recover from failure, allowing the deselected logical path to operate again. The original content of path selection data may then be restored so as to change the selection from protection entity back to working entity, thus enabling quick reverting of the protected path.

(c) Third Embodiment

A third embodiment will now be described below. Since this third embodiment shares some elements with the foregoing second embodiment, the following description will focus on its distinctive features, while affixing like reference numerals to like elements.

Figure 11:
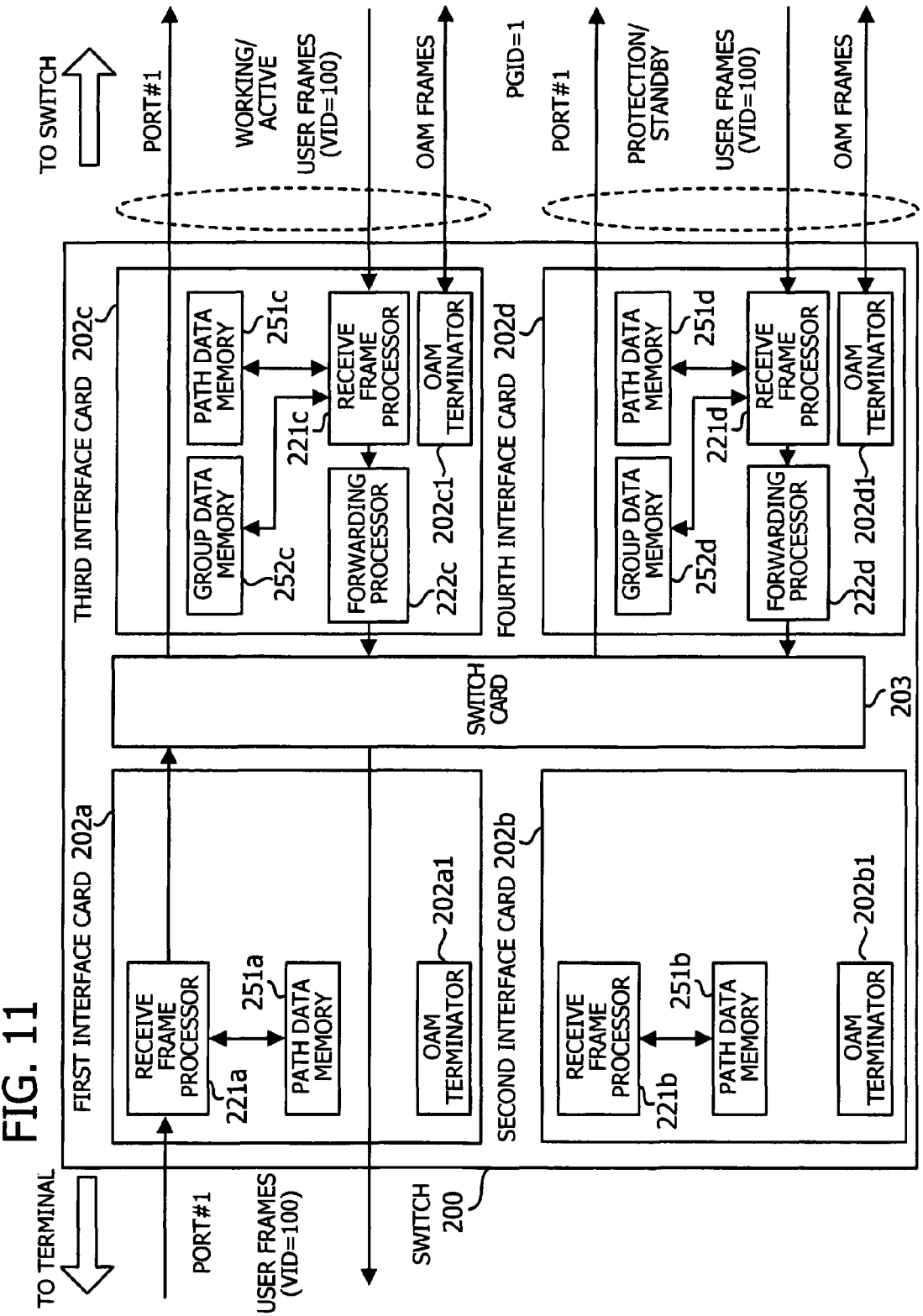

The third embodiment differs from the second embodiment in that the switch receives user frames from a protected path and forwards them to a terminal device while making a forwarding decision. FIG. 11 is a functional block diagram of a switch according to the third embodiment. While FIG. 11 only illustrates one switch 200, the same configuration applies to other switches connected to this switch 200 and constituting a protected network path. Briefly, FIG. 11 illustrates how the switch 200 handles a flow of user frames with a VID of 100 when it is received via a redundant logical path. Two interface cards 202c and 202d serve as part of a path protection domain, of which the former interface card 202c is active. Received user frames are forwarded by this active interface card 202c to their destination terminal device.

According to the third embodiment, the switch 200 includes four interface cards 202a, 202b, 202c, and 202d, and a switch card 203. The third interface card 202c includes an OAM terminator 202c1, a receive frame processor 221c, a forwarding processor 222c, a path data memory 251c, a group data memory 252c, and a controller (not illustrated). The third interface card 202c outputs or discards user frames, depending on forwarding decisions made by its forwarding processor 222c. In the former case, user frames are transmitted according to their relevant logical path data.

The OAM terminator 202c1 detects failure of a path between communication devices by sending and receiving OAM frames. In other words, the OAM terminator 202c1 serves here as a failure detector.

The receive frame processor 221c receives user frames from the path protection domain. Upon receipt of a user frame, the receive frame processor 221c searches the group data memory 252c to retrieve group data relevant to the received user frame. More specifically, the user frame contains a specific VID, and the path data memory 251c stores path data records for various VIDs. The receive frame processor 221c thus consults the path data memory 251c to retrieve a path data record corresponding to the VID of the received user frame. The retrieved path data record contains a specific receiving PGID, which may be found as part of group data stored in the group data memory 252c. This PGID permits retrievals of a group data record corresponding to the received user frame. In the embodiment depicted in FIG. 11, the receive frame processor 221c receives a user frame from the path protection domain and retrieves its corresponding group data record from the group data memory 252c. In this way, the receive frame processor 221c operates as the foregoing receive data processor 11 (FIG. 1).

The forwarding processor 222c determines whether to output the received user frame for forwarding or to discard it, based on path selection data in the group data record that the receive frame processor 221c has retrieved. More specifically, the forwarding processor 222c receives a path data record and a group data record retrieved by the receive frame processor 221c. The forwarding processor 222c compares the receiving PG path field of the path data record with the path selection data field of the group data record. When the receiving PG path coincides with the path selection data, the forwarding processor 222c determines to route the user frame from its logical path to the switch card 203. When the receiving PG path is different from the path selection data, the forwarding processor 222c determines to discard the user frame.

The path data memory 251c stores path data, i.e., a collection of records each including the following associated set of information items: (a) VID identifying user frames, (b) logical path data describing other interface cards (physical paths) associated with a receiving logical path of those user frames, (c) receiving PGID indicating a protection group used to transport those user frames, and (d) receiving PG path indicating whether the receiving logical path in the logical path data is a working entity or protection entity. This path data describes a logical path used to transport given user frames. Details of path data according to the third embodiment will be discussed later with reference to FIGS. 12 and 13.

The group data memory 252c stores group data records associating protection group identifiers with path selection data. Protection group identifiers identify each specific protection group that provides logical paths constituting a redundant logical path for transporting a group of user frames. Path selection data associated with a protection group specifies which logical path of the group is selected to transport user frames. The third embodiment uses the same group data structure discussed in the second embodiment, and accordingly, its explanation will not be repeated here.

The fourth interface card 202d includes an OAM terminator 202d1, a receive frame processor 221d, a forwarding processor 222d, a path data memory 251d, and a group data memory 252d, which are configured in the same way as their counterparts in the foregoing third interface card 202c to provide similar functions. Note that the fourth interface card 202d is configured as protection entity and thus forwards no user frames in normal situation.

The first and second interface cards 202a and 202b includes OAM terminators 202a1 and 202b1, receive frame processors 221a and 221b, and path data memories 251a and 251b, respectively. The OAM terminators 202a1 and 202b1 function similarly to the foregoing OAM terminator 202c1. The receive frame processors 221a and 221b function similarly to the foregoing receive frame processor 221c. The path data memories 251a and 251b store path data records describing a logical path that the first and second interface cards 202a and 202b use to forward user frames. All the above interface cards 202a to 202d also provide physical path functions.

The switch card 203 routes user frames from their respective receiving interface cards to sending interface cards, based on decisions made by the forwarding processors 222c and 222d. The switch card 203 is configured to exchange data signals with interface cards 202a to 202d in the switch 200, so that the frame traffic can be switched among those interface cards 202a to 202d.

FIGS. 12 and 13 illustrate an example data structure of path tables according to the third embodiment. The path table 251c1 of FIG. 12 has been prepared by a person who manages the switch 200 and stored in a path data memory 251c under the control of a CPU (not illustrated) and controller (not illustrated) in the switch 200. Similarly to this path table 251c1, another path table 251d1 illustrated in FIG. 13 is stored in a path data memory 251d. These two path tables 251c1 and 251d1 contain path data describing to which path the switch 200 is supposed to forward received user frames. Specifically, the path tables 251c1 and 251d1 are each formed from the following data fields: "VID," "VID Validity Flag," "First Path Enable Flag," "First Path Data," "Second Path Enable Flag," "Second Path Data," "Receiving PGID," and "Receiving PG Path." The field values arranged in the horizontal direction are associated with each other, thus constituting a single record of path data.

The VID field contains VLAN ID of a virtual LAN to which user frames belong, and the VID validity flag field indicates whether the VLAN ID is valid, as in the path table 151a1 of the foregoing second embodiment.

User frames identified by VID in the VLAN ID field are forwarded to either of first and second paths. The first path enable flag field contains a first path enable flag indicating whether the first path is enabled, as in the path table 151a1 of the foregoing second embodiment. Similarly, the second path enable flag field contains a second path enable flag.

The first path data field contains first path data, as in the path table 151a1 of the foregoing second embodiment. Likewise, the second path data field contains second path data.

According to the third embodiment, the path table 251c1 of FIG. 12 contains a value of "Card a" in its first path data field. This "Card a" refers to the first interface card 202a in FIG. 11. The first path data thus means that user frames are sent out of the first interface card 202a when the first path is selected.

The receiving PGID field contains a receiving PGID identifying a protection group from which the interface card receives user frames. For example, the path tables 251c1 and 251d1 contain a value of one in its receiving PGID field since their respective interface cards 202c and 202d participate in the path protection of PGID=1 and receive user frames from that protection group, as can be seen from FIG. 11. When a user frame arrives at the switch 200, this receiving PGID is used to find relevant path selection data in a group table (see FIGS. 8A and 8B). Based on the path selection data, either the first path or the second path is selected for the user frame. The corresponding combination of a path enable flag and path data (i.e., first path enable flag and first path data, or second path enable flag and second path data) then specifies to which port of which interface card the received user frame should be directed.

The receiving PG path field of a path table indicates whether the corresponding interface card acts in the receiving protection group either as first path or as second path (i.e., working entity or protection entity). For example, the path table 251c1 of the third interface card 202c indicates, in its receiving PG path field, that the third interface cards 202c serves as part of the first path (i.e., working entity) for user frames of PGID=1. Likewise, the path table 251d1 indicates that the fourth interface cards 202d serves as part of the second path (i.e., protection entity) for user frames of PGID=1.

Figure 14:
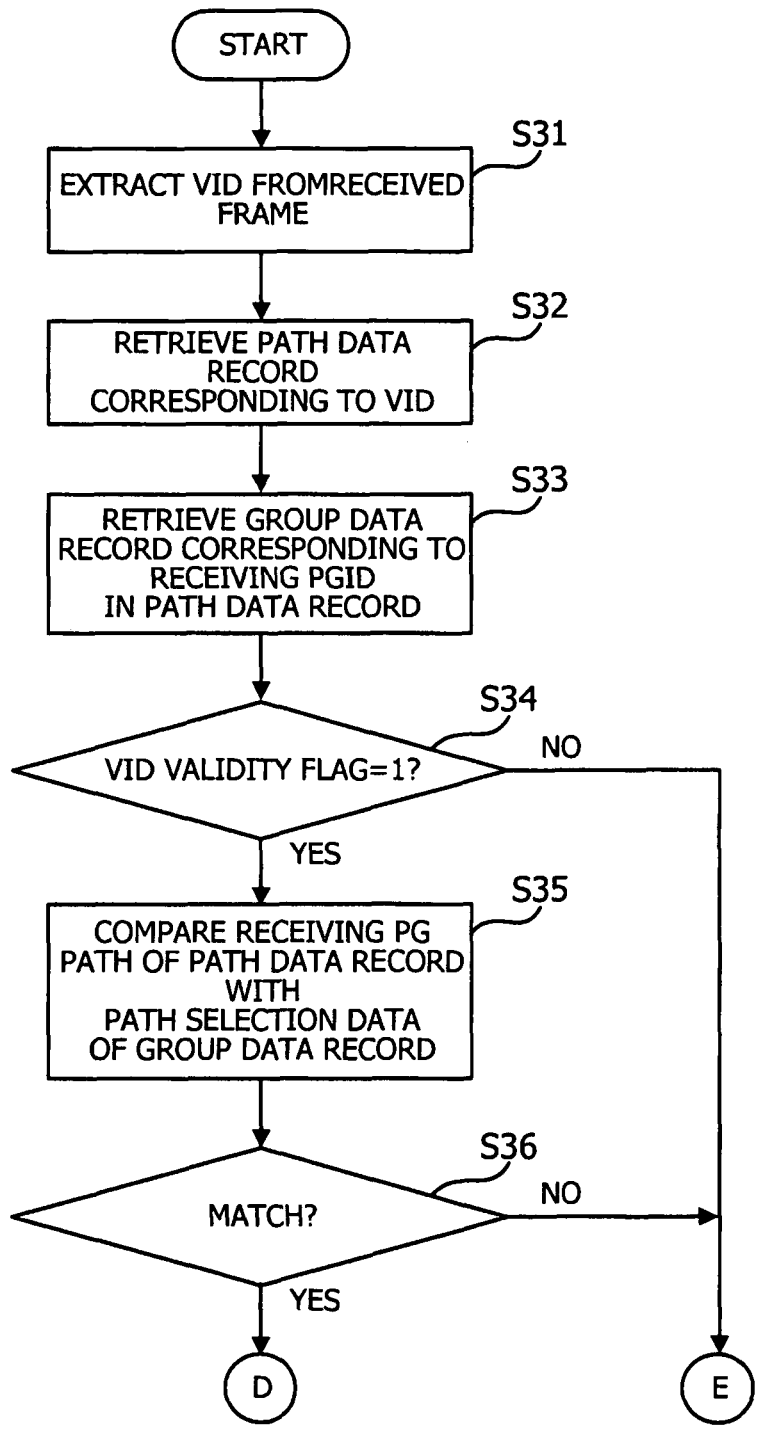
Figure 15:
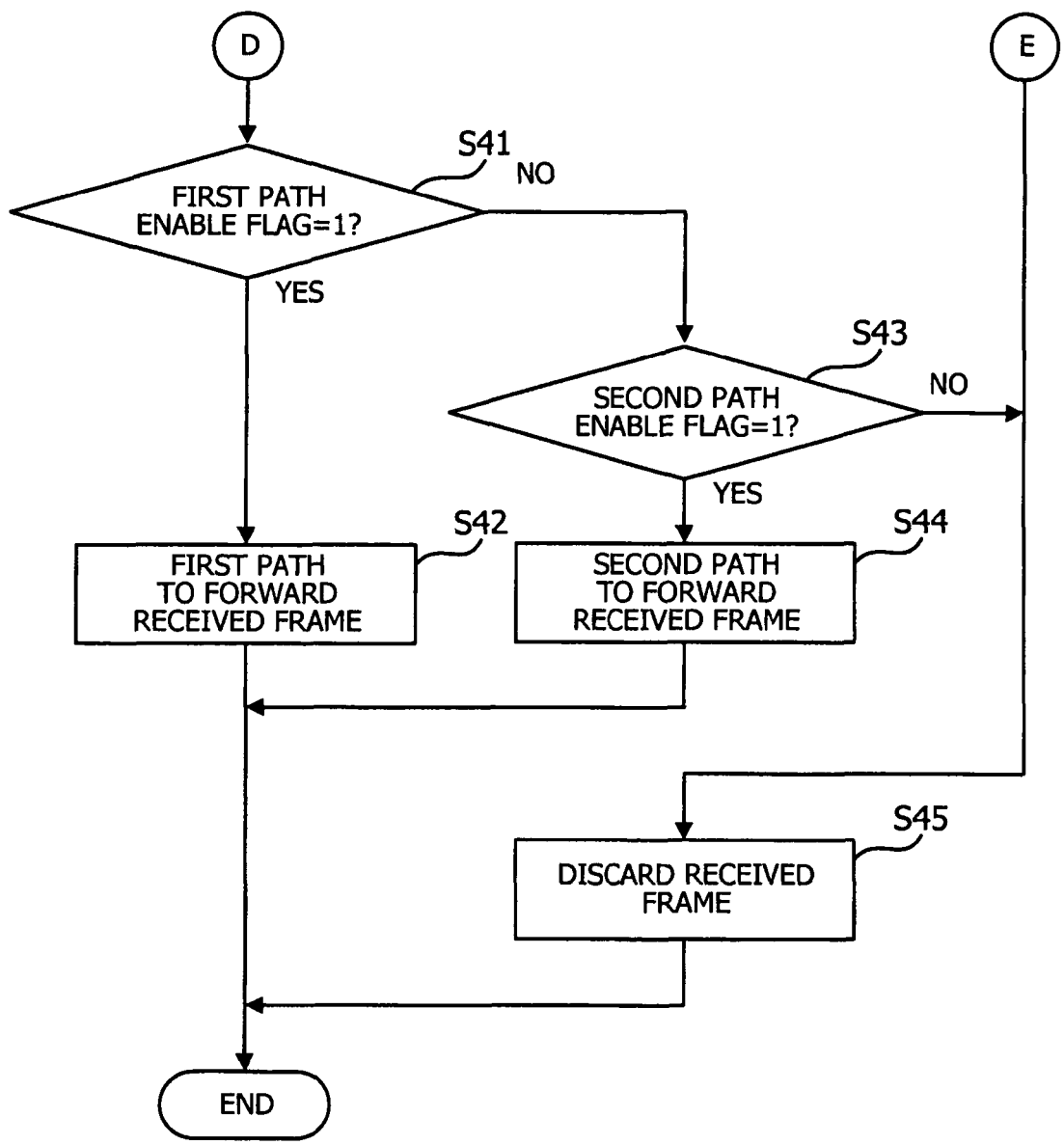

With the above-described structure, the third embodiment executes processing operations described below. FIGS. 14 and 15 are a method of a process of making forwarding decisions according to the third embodiment. This forwarding decision process determines which path to use to forward a given flow of user frames, based on path data and group data corresponding to VID of that flow. The process is initiated at each interface card 202c and 202d when a user frame arrives at a port of their receive frame processors 121a and 221d. For example, the third interface card 202c operates as follows to make a forwarding decision.

According to the forwarding decision process of the third embodiment, the receiving interface card 202c determines PGID of each user frame based on their VLAN ID and corresponding path data. By using this PGID, a corresponding group data record is retrieved. Based on the path selection data field of the retrieved group data record, it is then determined which of the first and second paths is supposed to forward the received user frames, or whether to discard those user frames without forwarding them. More specifically, the forwarding decision process executes the following operations:

(Operation S31) The receive frame processor 221c extracts VID from a received user frame.

(Operation S32) The receive frame processor 221c consults a path table 251c1 in the path data memory 251c to retrieve a path data record corresponding to the VID extracted at operation S31.

(Operation S33) The receive frame processor 221c consults a group table in the group data memory 252c to find a group data record that corresponds to the receiving PGID field of the path data record retrieved at operation S32.

(Operation S34) The forwarding processor 222c examines the VID validity flag in the path data record retrieved at operation S32. If the VID validity flag is one (i.e., VID is valid), the process advances to operation S35. If the VID validity flag is zero (i.e., VID is invalid), the process branches to operation S45 (FIG. 15).

(Operation S35) The forwarding processor 222c compares the receiving PG path field of the path data record retrieved at operation S32 with the path selection data field of the group data record retrieved at operation S33.

(Operation S36) The forwarding processor 222c examines the comparison result of operation S35. That is, if the two field values match with each other, the process advances to operation S41 (FIG. 15). If the two field values are different, the process proceeds to operation S45.

(Operation S41) The forwarding processor 222c examines first path enable flag in the path data record retrieved at operation S32 (FIG. 14). If the first path enable flag is one, the process advances to operation S42. If the first path enable flag is zero, the process skips to operation S43.

(Operation S42) The forwarding processor 222c concludes that the first path is to forward the user frame, thus terminating the forwarding decision process.

(Operation S43) The forwarding processor 222c examines second path enable flag in the path data record retrieved at operation S32. If the second path enable flag is one, the process advances to operation S44. If the second path enable flag is zero, the process skips to operation S45.

(Operation S44) The forwarding processor 222c concludes that the second path is to forward the user frame, thus terminating the forwarding decision process.

(Operation S45) The forwarding processor 222c determines to discard the received user frame without forwarding it, thus terminating the forwarding decision process.

As can be seen from the above processing operations of the third embodiment, the receiving interface cards 202c and 202d determine which of them is supposed to forward the user frames received from the path protection domain. In other words, each interface card 202c and 202d participating in the path protection decides whether to forward or discard user frames. This decision is made on the basis of path selection data, meaning that the forwarding paths can be switched by modifying path selection data. It is therefore possible to perform simultaneous path switching of a plurality of user data flows being served by the same path protection domain, which is faster than the case of rewriting path table entries in individual interface cards for each different user frame traffic.

Logical paths are switched for protection by modifying path selection data. The time required for this modification does not depend on the number of user data flows that the switch 200 is forwarding. It is therefore possible to quickly finish the task of switching logical paths even in the case where the switch is loaded with a large number of flows.

After the successful protection switching, the failure of working entity may be removed, allowing the deselected logical path to operate again. The original content of path selection data may then be restored so as to change the selection from protection entity back to working entity, thus enabling quick reverting of the protected path.

(d) Fourth Embodiment

A fourth embodiment will now be described below. Since this fourth embodiment shares some elements with the foregoing second and third embodiments, the following description will focus on its distinctive features, while affixing like reference numerals to like elements.

The fourth embodiment differs from the second and third embodiments in that the switch receives user frames from both the terminal device and path protection domain and makes a forwarding decision to perform protection switching as necessary.

Figure 16:
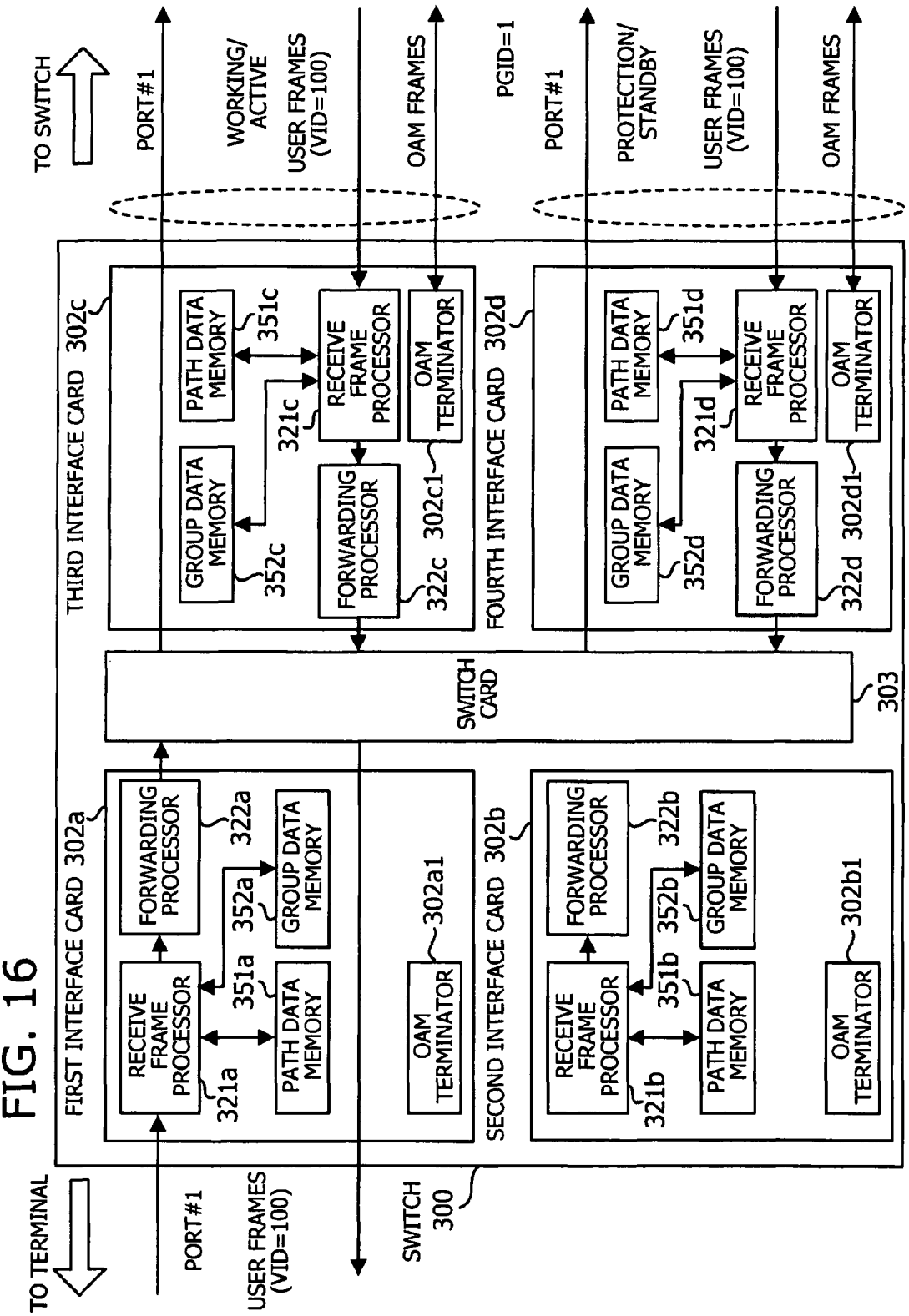

FIG. 16 is a functional block diagram of a switch according to the fourth embodiment. While FIG. 16 illustrates only one switch 300, the same configuration applies to other switches connected to this switch 300 to provide protected network paths. Briefly, FIG. 16 illustrates how the switch 300 handles a bidirectional flow of user frames with a VID of 100 over a redundant logical path, where two interface cards 302c and 302d take part in path protection. User frames from a terminal device are received by the first interface card 302a and forwarded to the protected path. User frames received from the protected path are forwarded to the terminal device via the first interface card 302a.

According to the fourth embodiment, the illustrated switch 300 includes four interface cards 302a, 302b, 302c, and 302d, and a switch card 303. The first interface card 302a includes an OAM terminator 302a1, a receive frame processor 321a, a forwarding processor 322a, a path data memory 351a, a group data memory 352a, and a controller (not illustrated). The first interface card 302a outputs or discards user frames, depending on forwarding decisions made by its forwarding processor 322a. In the former case, user frames are transmitted according to their relevant logical path data.

The OAM terminator 302a1 detects failure of a path between communication devices by sending and receiving OAM frames. In other words, the OAM terminator 302a1 serves here as a failure detector.

The receive frame processor 321a receives user frames from an attached terminal device. Upon receipt of a user frame, the receive frame processor 321a searches the group data memory 352a to retrieve group data relevant to the received user frame. More specifically, the user frame contains a specific VID, and the path data memory 351a stores path data records for various VIDs. The receive frame processor 321a thus consults the path data memory 351a to retrieve a path data record corresponding to the VID of the received user frame. The retrieved path data record contains a specific receiving PGID, which may be found as part of group data stored in the group data memory 352a. This PGID permits retrieval of a group data record corresponding to the received user frame. In the embodiment depicted in FIG. 16, the receive frame processor 321a receives a user frame from the attached terminal device via a non-redundant path and retrieves a corresponding group data record from the group data memory 352a. In this way, the receive frame processor 321a operates as the foregoing receive data processor 11 (FIG. 1).

The forwarding processor 322a determines whether to output the received user frame for forwarding or to discard it, based on path selection data in the group data record that the receive frame processor 321a has retrieved. More specifically, the forwarding processor 322a receives a path data record and a group data record retrieved by the receive frame processor 321a. The forwarding processor 322a compares the receiving PG path field of the path data record with the path selection data field of the group data record. When the two field values match with each other, the forwarding processor 322a determines to output the user frame to its relevant logical path. When the two field values are different, the forwarding processor 322a determines to discard the user frame.

The path data memory 351a stores path data, i.e., a collection of records each including the following associated set of information items: (a) VID identifying user frames, (b) logical path data describing other interface cards (physical paths) associated with a receiving logical path of those user frames, (c) sending PGID and receiving PGID indicating protection groups used to transport those user frames, and (d) receiving PG path indicating whether the receiving logical path in the logical path data is a working entity or protection entity. This path data describes a logical path used to transport given user frames. Details of path data according to the fourth embodiment will be discussed later with reference to FIGS. 17 to 19.

The group data memory 352a stores group data records associating protection group identifiers with path selection data. Protection group identifiers identify each specific protection group that provides logical paths constituting a redundant logical path for transporting group of user frames. Path selection data associated with a protection group specifies which logical path of the group is selected to transport user frames. The fourth embodiment uses the same group data structure discussed in the second embodiment, and accordingly, its explanation will not be repeated here.

The second to fourth interface cards 302b to 302d include their own OAM terminators 302b1 to 302d1, receive frame processors 321b to 321d, forwarding processors 322b to 322d, path data memories 351b to 351d, and group data memories 352b to 352d. These functional blocks are configured in the same way as their counterparts in the foregoing first interface card 302a to provide similar functions. The receive frame processor 321c in the third interface card 302c is connected to working entity in the path protection domain and thus receives user frames from that domain.

The switch card 303 routes user frames from their respective receiving interface cards to sending interface cards, based on forwarding decisions made by the forwarding processors 322a to 322d. The switch card 303 is configured to exchange data signals with interface cards 302a to 302d in the switch 300, so that the frame traffic can be switched among those interface cards 302a to 302d.

FIGS. 17 to 19 illustrate an example data structure of path tables according to the fourth embodiment. The path table 351a1 of FIG. 17 has been prepared by a person who manages the switch 300 and stored in a path data memory 351a under the control of a CPU (not illustrated) and controller (not illustrated) in the switch 300. Similarly to this path table 351a1, another path table 351c1 illustrated in FIG. 18 is stored in the path data memory 351c, and yet another path table 351d1 illustrated in FIG. 19 is stored in the path data memory 351d. Those path tables 351a1, 351c1, and 351d1 contain path data describing to which path the switch 300 is supposed to forward received user frames. Specifically, the path tables 351a1, 351c1, and 351d1 are each formed from the following data fields: "VID," "VID Validity Flag," "First Path Enable Flag," "First Path Data," "Second Path Enable Flag," "Second Path Data," "Sending PGID," "Receiving PGID," and "Receiving PG Path." The field values arranged in the horizontal direction are associated with each other, thus constituting a single record of path data.

The VID field contains VLAN ID of a virtual LAN to which user frames belong, and the VID validity flag field indicates whether the VLAN ID is valid, as in the path tables 251c1 and 251d1 of the foregoing third embodiment.

User frames identified by VID in the VLAN ID field are forwarded to either of first and second paths. The first path enable flag field contains a first path enable flag indicating whether the first path is enabled, as in the path tables 251c1 and 251d1 of the foregoing third embodiment. Similarly, the second path enable flag field contains a second path enable flag.

The first path data field contains first path data, as in the path tables 251c1 and 251d1 of the foregoing third embodiment. Likewise, the second path data field contains second path data.

The sending PGID field contains a sending PGID identifying a protection group (and ultimately its associated interface cards) to which received user frames are directed, as in the path table 151a1 of the foregoing second embodiment. For example, the path table 351a1 (FIG. 17) in the first interface card 302a contains a value of one in its sending PGID field, since the third and fourth interface cards 302c and 302d sitting on the opposite side are connected to a protected path of PGID=1, as can be seen in FIG. 16. On the other hand, the path tables 351c1 and 351d1 (FIGS. 18 and 19) stored in the third and fourth interface cards 302c and 302d contain a value of zero in their sending PGID field since the first interface card 302a sitting opposite to them is connected to a non-protected path for a terminal device, as can be seen in FIG. 16. That is, a zero-valued sending PGID denotes connection to a non-protected path.

The receiving PGID field contains a receiving PGID identifying a protection group from which the interface card receives user frames, as in the path tables 251c1 and 251d1 of the foregoing third embodiment. As mentioned above, the first interface card 302a is connected to a terminal device, and thus its path table 351a1 contains a value of zero in its receiving PGID field to indicate the connection to a non-protected path. In contrast, the third and fourth interface cards 302c and 302d are connected to a protected path of PGID=1, and thus their respective path tables 351c1 and 351d1 contain a value of one in their receiving PGID field.

The receiving PG path field of a path table indicates whether the corresponding interface card acts as first path or as second path in a protection group identified by the receiving PGID field, as in the path tables 251c1 and 251d1 of the foregoing third embodiment.

While FIGS. 17 to 19 only depict path tables 351a1, 351c1, and 351d1 stored in the path data memories 351a, 351c, and 351d, yet another path table (not illustrated) may be similarly implemented in the path data memory 351b of the second interface card 302b. This path table describes entities to which or from which the second interface card 302b may send or receive user frames.

Figure 20:
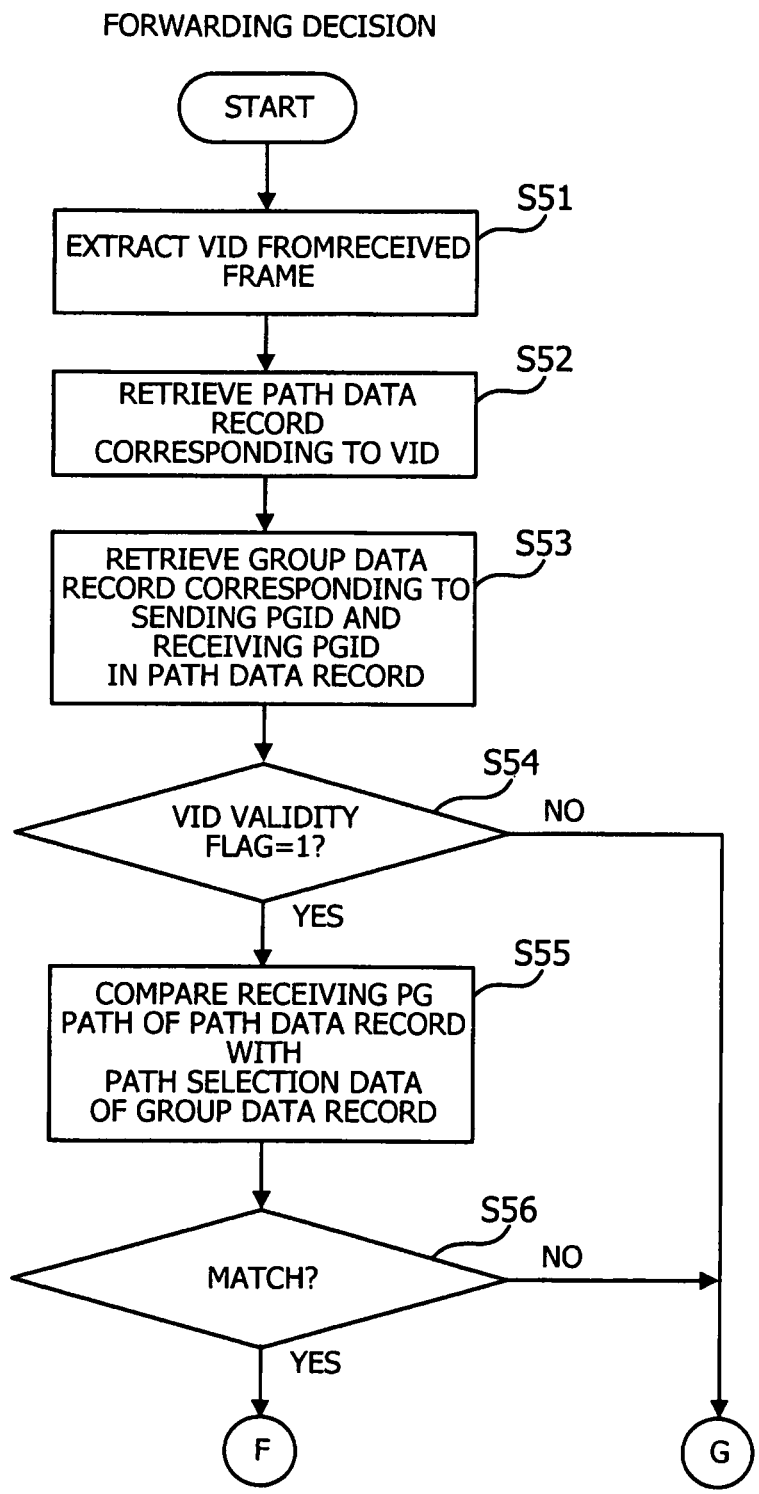
Figure 21:
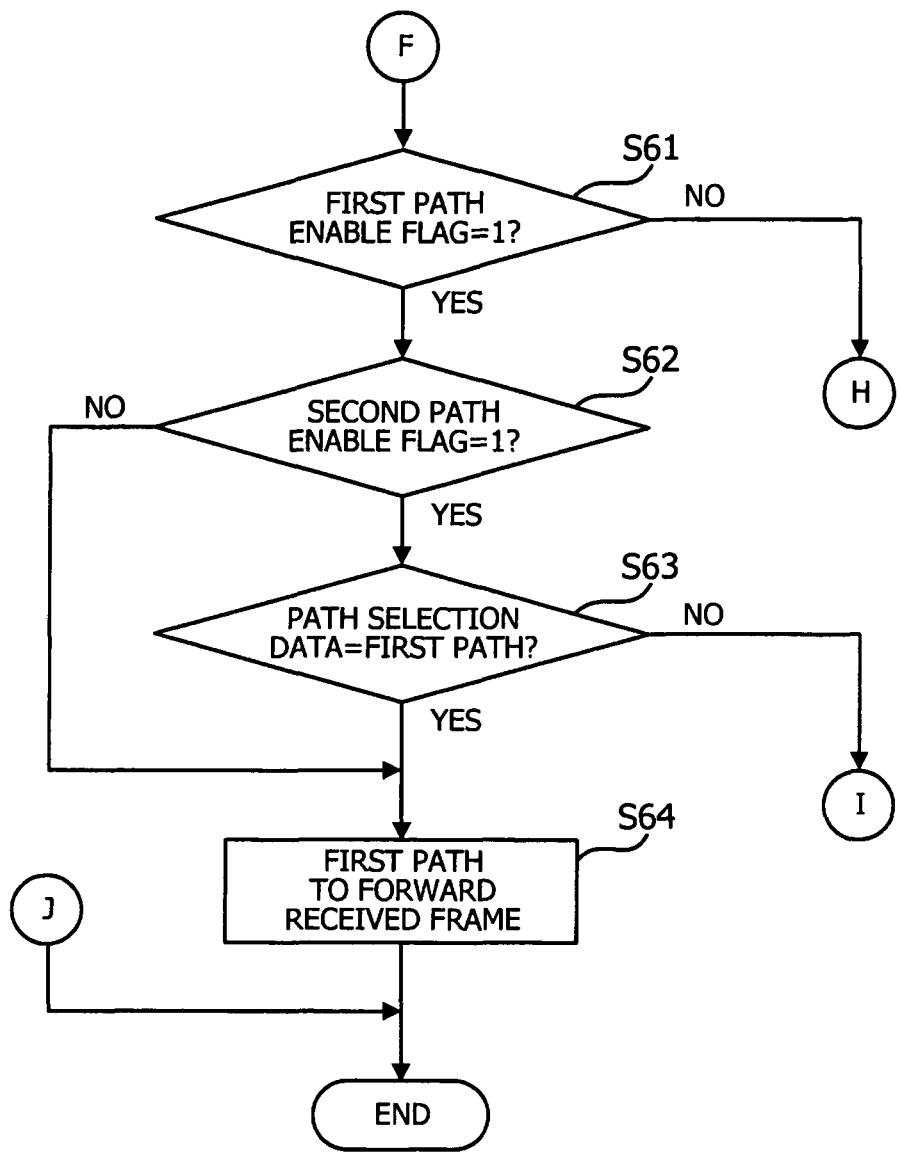
Figure 22:
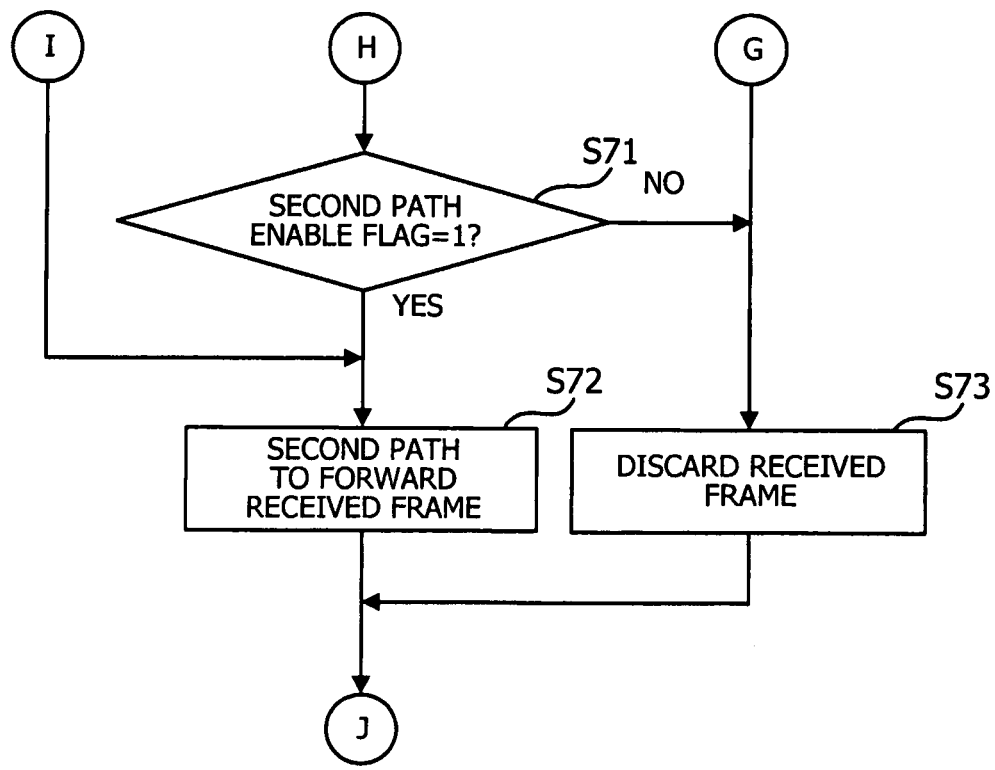

With the above-described structure, the fourth embodiment executes processing operations described below. FIGS. 20 to 22 are a method of a process of making forwarding decisions according to the fourth embodiment. This forwarding decision process determines which path to use to forward a given flow of user frames, based on path data and group data corresponding to VID of that flow. The process is initiated at each interface card 302c and 302d when a user frame arrives at a port of their receive frame processors 321c and 321d. For example, the third interface card 302c operates as follows to make a forwarding decision.

According to the forwarding decision process of the fourth embodiment, the third interface card 302c determines PGID of each received user frame based on their VLAN ID and corresponding path data. By using this PGID, a corresponding group data record is retrieved. Based on the path selection data field of the retrieved group data record, it is then determined which of the first and second paths is supposed to forward the received user frames, or whether to discard those user frames without forwarding them. More specifically, the forwarding decision process executes the following operations:

(Operation S51) The receive frame processor 321c extracts VID from a received user frame.

(Operation S52) The receive frame processor 321c consults a path table 351c1 in the path data memory 351c to retrieve a path data record corresponding to the VID extracted at operation S51.

(Operation S53) The receive frame processor 321c consults a group table in the group data memory 352c to retrieve a group data record corresponding to the receiving PGID of the path data record retrieved at operation S52, as well as a group data record corresponding to the sending PGID of the same.

(Operation S54) The forwarding processor 322c examines the VID validity flag in the path data record retrieved at operation S52. If the VID validity flag is one (i.e., VID is valid), the process advances to operation S55. If the VID validity flag is zero (i.e., VID is invalid), then the process branches to operation S73 (FIG. 22).

(Operation S55) The forwarding processor 322c compares the receiving PG path field of the path data record retrieved at operation S52 with the path selection data field of the group data record retrieved at operation S53.

(Operation S56) The forwarding processor 322c examines the comparison result of operation S55. That is, if the two field values match with each other, the process advances to operation S61 (FIG. 21). If the two field values are different, the process proceeds to operation S73.

(Operation S61) The forwarding processor 322c examines first path enable flag in the path data record retrieved at operation S52 (FIG. 20). If the first path enable flag is one, the process advances to operation S62. If the first path enable flag is zero, the process branches to operation S71 (FIG. 22).

(Operation S62) The forwarding processor 322c examines second path enable flag in the path data record retrieved at operation S52. If the second path enable flag is one, the process advances to operation S63. If the second path enable flag is zero, the process skips to operation S64.

(Operation S63) The forwarding processor 322c determines whether the path selection data in the group data record retrieved at operation S53 (FIG. 20) specifies the first path. If so, the process advances to operation S64. If not, the process branches to S72 (FIG. 22).

(Operation S64) The forwarding processor 322c concludes that the first path is to forward the user frame, thus terminating the forwarding decision process.

(Operation S71) The forwarding processor 322c examines second path enable flag in the path data record retrieved at operation S52 (FIG. 20). If the second path enable flag is one, the process advances to operation S72. If the second path enable flag is zero, the process proceeds to operation S73.

(Operation S72) The forwarding processor 322c concludes that the second path is to forward the user frame, thus terminating the forwarding decision process.

(Operation S73) The forwarding processor 322c determines to discard the received user frame without forwarding it, thus terminating the forwarding decision process.

The foregoing second and third embodiments provide interface cards connected to either a client device (e.g., user's terminal device) or a network device (e.g., switch) in a path protection domain. As can be seen from the fourth embodiment described above, it is also possible to provide interface cards that can work with both types of devices.

(e) Fifth Embodiment

A fifth embodiment will now be described below. Since this fifth embodiment shares some elements with the foregoing fourth embodiment, the following description will focus on its distinctive features, while affixing like reference numerals to like elements.

The fifth embodiment differs from the fourth embodiment in that the switch receives user frames from one path protection domain and forwards them to another path protection domain by making forwarding decisions and performing protection switching as necessary.

Figure 23:
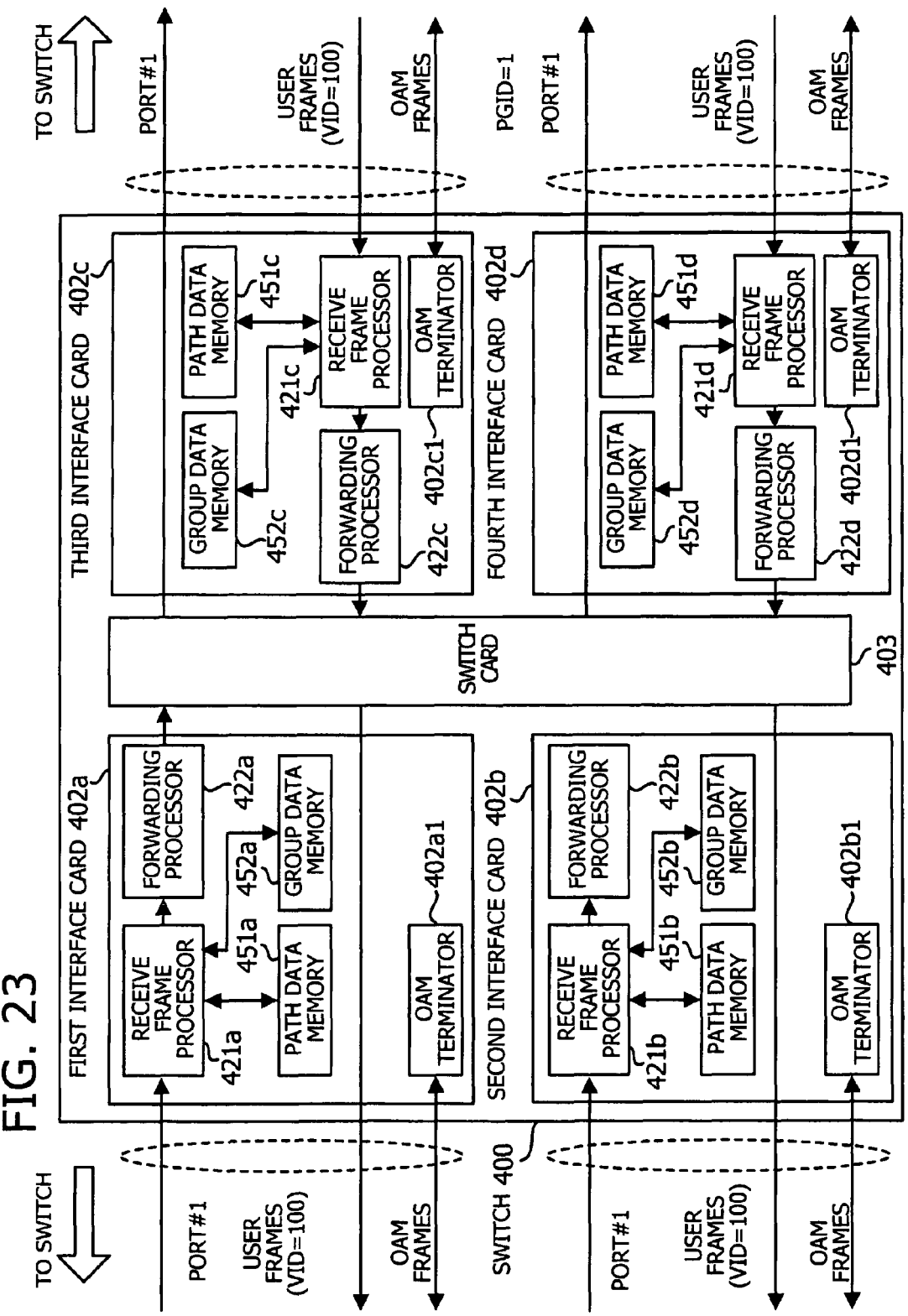

FIG. 23 is a functional block diagram of a switch according to the fifth embodiment. While FIG. 23 illustrates only one switch 400, the same configuration applies to other switches connected to this switch 400 to provide protected network paths. The communication links are protected on both sides of the switch 400. Two interface cards 402a and 402b are connected to one redundant logical path, and another two interface cards 402c and 402d are connected to another redundant logical path. FIG. 23 illustrates how the switch 400 forwards a flow of user frames with VID=100 using such interface cards and logical paths.

According to the fifth embodiment, the switch 400 includes four interface cards 402a, 402b, 402c, and 402d and a switch card 403. The first interface card 402a includes an OAM terminator 402a1, a receive frame processor 421a, a forwarding processor 422a, a path data memory 451a, a group data memory 452a, and a controller (not illustrated).

The first interface card 402a outputs or discards user frames, depending on forwarding decisions made by its forwarding processor 422a. In the former case, user frames are transmitted according to their relevant logical path data. The OAM terminator 402a1 detects failure of a path between communication devices by sending and receiving OAM frames. In other words, the OAM terminator 402a1 serves here as a failure detector.

The receive frame processor 421a receives user frames from a path protection domain. Upon receipt of a user frame, the receive frame processor 421a searches the group data memory 452a to retrieve group data relevant to the received user frame. More specifically, the user frame contains a specific VID, and the path data memory 451a stores path data records for various VIDs. The receive frame processor 421a thus consults the path data memory 451a to retrieve a path data record corresponding to the VID of the received user frame. The retrieved path data record contains a specific receiving PGID, which may be found as part of group data stored in the group data memory 452a. This PGID permits retrieval of a group data record corresponding to the received user frame. In the present embodiment, the receive frame processor 421a receives user frames from a path protection domain and retrieves a corresponding group data record from the group data memory 452a. In this way, the receive frame processor 421a operates as the foregoing receive data processor 11 (FIG. 1).

The forwarding processor 422a determines whether to output the received user frame for forwarding or to discard it, based on path selection data in the group data record that the receive frame processor 421a has retrieved. More specifically, the forwarding processor 422a receives a path data record and a group data record retrieved by the receive frame processor 421a. The forwarding processor 422a compares the receiving PG path field of the path data record with the path selection data field of the group data record. When the two field values match with each other, the forwarding processor 422a determines to output the user frame to its relevant logical path. When the two field values are different, the forwarding processor 422a determines to discard the user frame.

Here the receive frame processor 421a and forwarding processor 422a execute a forwarding decision process similarly to their counterparts in the foregoing fourth embodiment. For the details of this process, see the previous discussion of the method of FIGS. 20 to 22.

The path data memory 451a stores path data, i.e., a collection of records each including the following associated set of information items: (a) VID identifying user frames, (b) logical path data describing other interface cards (physical paths) associated with a receiving logical path of those user frames, (c) sending PGID and receiving PGID indicating protection groups used to transport those user frames, and (d) receiving PG path indicating whether the receiving logical path in the logical path data is a working entity or protection entity. This path data describes a logical path used to transport given user frames. Details of path data according to the fifth embodiment will be discussed later with reference to FIGS. 26 to 29.

The group data memory 452a stores group data records associating protection group identifiers with path selection data. Protection group identifiers identify each specific protection group that provides logical paths constituting a redundant logical path for transporting a group of user frames. Path selection data associated with a protection group specifies which logical path of the group is selected to transport user frames. Details of group data records according to the fifth embodiment will be discussed later with reference to FIGS. 30A and 30B.

The second to fourth interface cards 402b to 402d include their own OAM terminators 402b1 to 402d1, receive frame processors 421b to 421d, forwarding processors 422b to 422d, path data memories 451b to 451d, and group data memories 452b to 452d. These functional blocks are configured in the same way as their counterparts in the foregoing first interface card 402a to provide similar functions. As in the second and third embodiments, the interface cards 402a to 402d may be able to connect to terminal devices.

The switch card 403 routes user frames from their respective receiving interface cards to sending interface cards, based on forwarding decisions made by the forwarding processors 422a to 422d. The switch card 403 is configured to exchange data signals with interface cards 402a to 402d in the switch 400, so that the frame traffic can be switched among those interface cards 402a to 402d.

Figure 24:
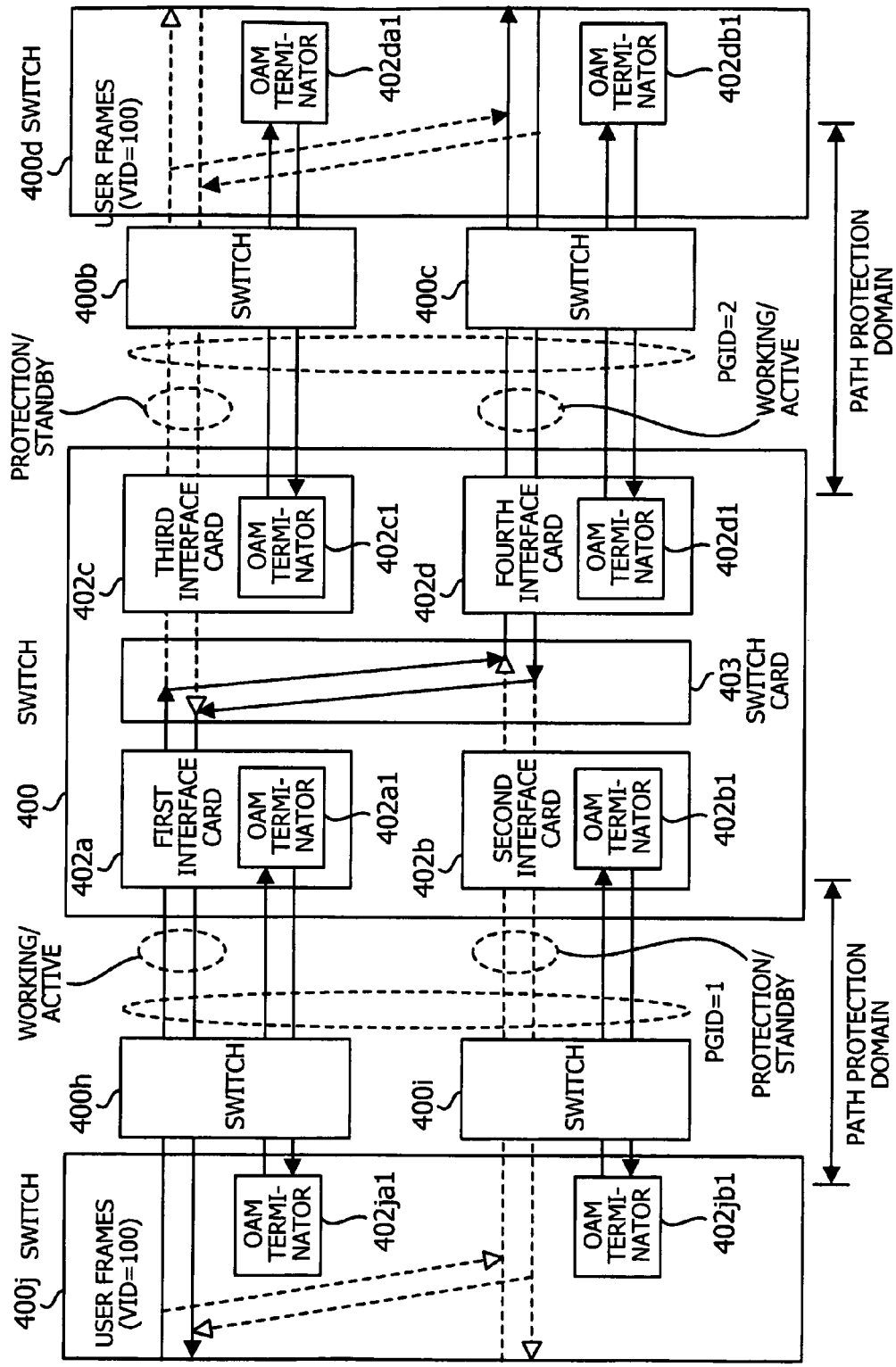
Figure 25:
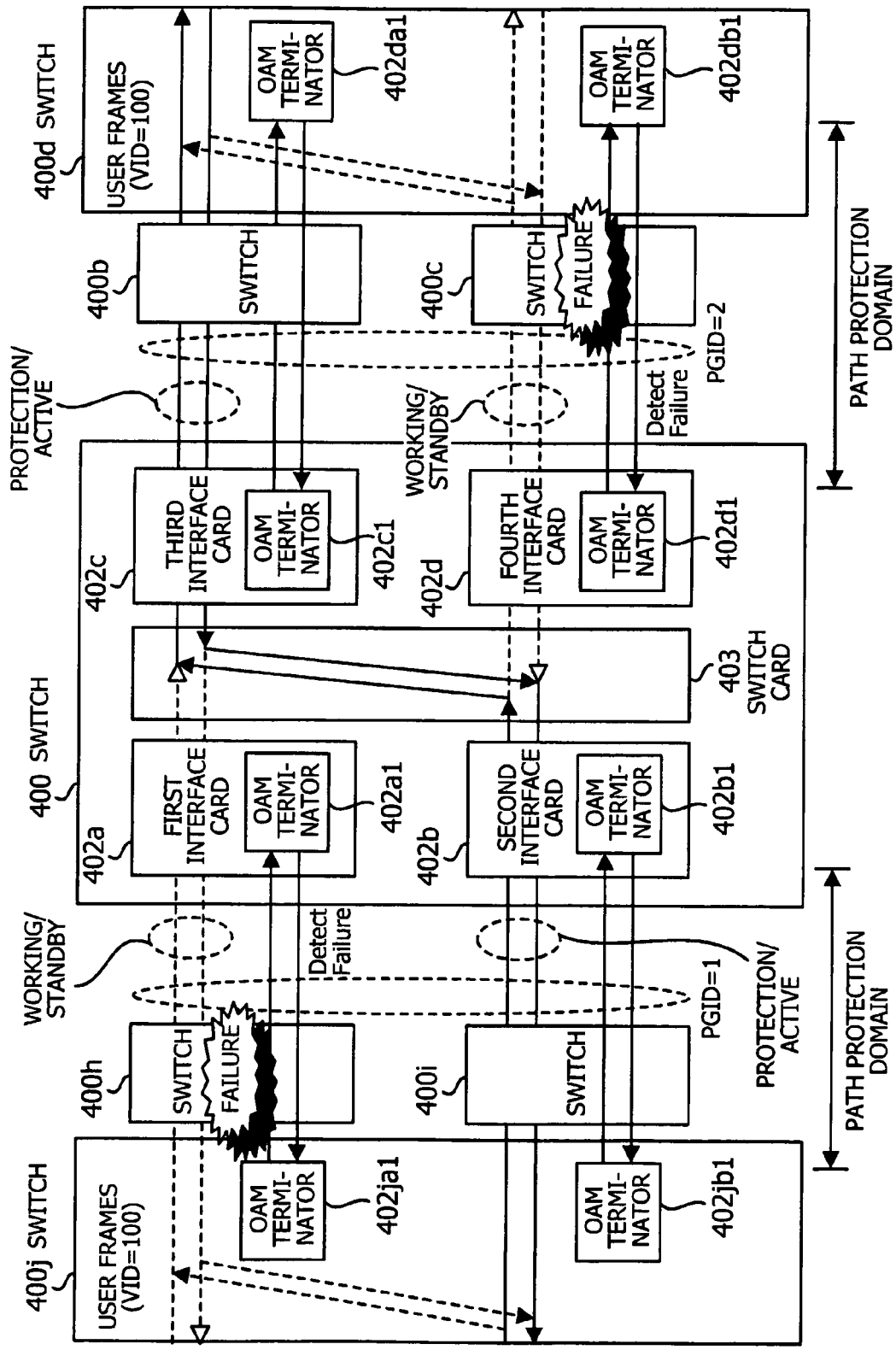

According to the fifth embodiment, the frames are transported as illustrated in FIG. 24 in normal situation, or as illustrated in FIG. 25 in failure situation. As seen from FIGS. 24 and 25, the network paths are protected on both sides of the switch 400. That is, the switch 400 is linked to a remote switch 400j via a protected path connection of PGID=1, which is provided by interface cards 402a and 402b, a redundant logical path extending from them, and intermediate switches 400h and 400i. The switch 400 is also linked to another remote switch 400d via a protected path connection of PGID=2, which is provided by interface cards 402c and 402d, a redundant logical path extending from them, and intermediate switches 400b and 400c.

More specifically, a logical path runs between the first interface card 402a and switch 400j via an intermediate switch 400h. Another logical path runs between the second interface card 402b and switch 400j via an intermediate switch 400i. Yet another logical path runs between the third interface card 402c and switch 400d via an intermediate switch 400b. Still another logical path runs between the fourth interface card 402d and switch 400d via an intermediate switch 400c.

The logical path between the first interface card 402a and switch 400j is monitored by their OAM terminators 402a1 and 402ja1. Likewise, the logical path between the second interface card 402b and switch 400j is monitored by their OAM terminators 402b1 and 402jb1. The logical path between the third interface card 402c and switch 400d is monitored by their OAM terminators 402c1 and 402da1. The logical path between the fourth interface card 402d and switch 400d is monitored by their OAM terminators 402d1 and 402db1.

FIG. 24 depicts a setup of the network in normal situation. In the path protection domain between switches 400 and 400j, the logical path between the first interface card 402a and switch 400j serves as a working entity in active state, while that between the second interface card 402b and switch 400j serves as a protection entity in standby state. In the path protection domain between switches 400 and 400d, the logical path between the third interface card 402c and switch 400d serves as a protection entity in standby state, while that between the fourth interface card 402d and switch 400d serves as a working entity in active state. The above two active logical paths are connected together through the switch card 403 in the switch 400, thus permitting user frames having VID=100 to be transported between two switches 400j and 400d via the switch 400.

Suppose now that two switches 400h and 400c have failed as illustrated in FIG. 25. The failure of the former switch 400h disrupts communication between the first interface card 402a and switch 400j, and is thus detected by OAM terminators 402a1 and 402ja1 monitoring the logical path including the switch 400h. Similarly, the failure of the latter switch 400c disrupts communication between the fourth interface card 402d and switch 400d, and is thus detected by OAM terminators 402d1 and 402db1 monitoring the logical path including the switch 400c.

The OAM terminator 402a1 now indicates that the logical path running through the switch 400h is not operational. Accordingly, the switch 400 changes that faulty logical path from active to standby, and the logical path running through the switch 400i from standby to active, as illustrated in FIG. 25. Also, the OAM terminator 402d1 indicates that the logical path running through the switch 400c is not operational. Accordingly, the switch 400 changes that faulty logical path from active to standby, and the logical path running through the switch 400b from standby to active, as illustrated in FIG. 25. The switch card 403 is also reconfigured in response to the above protection switching, so that the newly activated logical paths will be connected to each other. As a result, user frames having VID=100 can be transported between switches 400j and 400d via the switch 400.

FIGS. 26 to 29 illustrate an example data structure of path tables according to the fifth embodiment. The path table 451a1 of FIG. 26 has been prepared by a person who manages the switch 400 and stored in a path data memory 451a under the control of a CPU (not illustrated) and controller (not illustrated) in the switch 400. Similarly, another path table 451b1 illustrated in FIG. 27 is stored in the path data memory 451b. Yet another path table 451c1 illustrated in FIG. 28 is stored in the path data memory 451c. Still another path table 451d1 illustrated in FIG. 29 is stored in the path data memory 451d. Those path tables 451a1 to 451d1 contain path data describing to which path the switch 400 is supposed to forward received user frames. Similar to path tables 351a1, 351c1, and 351d1 of the foregoing fourth embodiment, the path tables 451a1 to 451d1 are each formed from the following data fields: "VID," "VID Validity Flag," "First Path Enable Flag," "First Path Data," "Second Path Enable Flag," "Second Path Data," "Sending PGID," "Receiving PGID," and "Receiving PG Path." The field values arranged in the horizontal direction are associated with each other, thus constituting a single record of path data.

The VID field contains VLAN ID of a virtual LAN to which user frames belong, and the VID validity flag field indicates whether the VLAN ID is valid, as in the path tables 351a1, 351c1, and 351d1 of the foregoing fourth embodiment.

User frames identified by VID in the VLAN ID field are forwarded to either of first and second paths. The first path enable flag field contains a first path enable flag indicating whether the first path is enabled, as in the path tables 351a1, 351c1, and 351d1 of the foregoing fourth embodiment. Similarly, the second path enable flag field contains a second path enable flag.

The first path data field contains first path data, as in the path tables 351a1, 351c1, and 351d1 of the foregoing fourth embodiment. Likewise, the second path data field contains second path data.

The sending PGID field contains a sending PGID identifying a protection group (and ultimately its associated interface cards) to which the receiving interface card forwards received user frames, as in the path tables 351a1, 351c1, and 351d1 of the foregoing fourth embodiment.

The receiving PGID field contains a receiving PGID identifying a protection group from which the interface card receives user frames, as in the path tables 351a1, 351c1, and 351d1 of the foregoing fourth embodiment.

The receiving PG path field of a path table indicates whether the corresponding interface card acts in the receiving protection group either as first path or as second path, as in the path tables 351a1, 351c1, and 351d1 of the foregoing fourth embodiment.

FIGS. 30A and 30B illustrate an example data structure of group tables according to the fifth embodiment. Specifically, FIG. 30A illustrates a group table 452a1 before path switching, while FIG. 30B illustrates a group table 452a2 after path switching. The group table has been prepared by a person who manages the switch 400 and stored in a group data memory 452a under the control of a CPU (not illustrated) and controller (not illustrated) in the switch 400. The group table 452a1 (452a2) is formed from "PGID" and "path selection data" fields, similarly to the group table 152a1 (152a2) of the foregoing second embodiment. The field values arranged in the horizontal direction are associated with each other, thus constituting a single record of group data.

While FIGS. 30A and 30B only illustrate a group table stored in the first interface card 402a, other three interface cards 402b to 402d also have similar group tables (not illustrated) in their own group data memories 452b to 452d. Those group tables contain the same field values as the above-described group table 452a1 (452a2).

The PGID field contains a PGID identifying a protection group assigned to user frames, as in the group table 152a1 (152a2) of the foregoing second embodiment. The path selection data field of a protection group contains path selection data indicating which path is currently selected as active entity for communication in that group, as in the group table 152a1 (152a2) of the foregoing second embodiment. As FIG. 23 illustrates, the switch 400 according to the fifth embodiment is connected to two protected paths distinguished by their PGIDs, 1 and 2. Accordingly, the group table 452a1 (452a2) of FIGS. 30A and 30B contains two group data records for PGID=1 and PGID=2.

As can be seen from the above description, the fifth embodiment enables a switch to interconnect two path protection domains, in addition to providing features of the foregoing fourth embodiment. Each pair of interface cards in this switch accommodates a protected path, and the protection switching mechanism of the switch copes with failure in any path.

(f) Sixth Embodiment

A sixth embodiment will now be described below. Since this sixth embodiment shares some elements with the foregoing fourth embodiment, the following description will focus on its distinctive features, while affixing like reference numerals to like elements. The sixth embodiment differs from the fourth embodiment in that low-priority user frames are discarded in the path protection.

Figure 31:
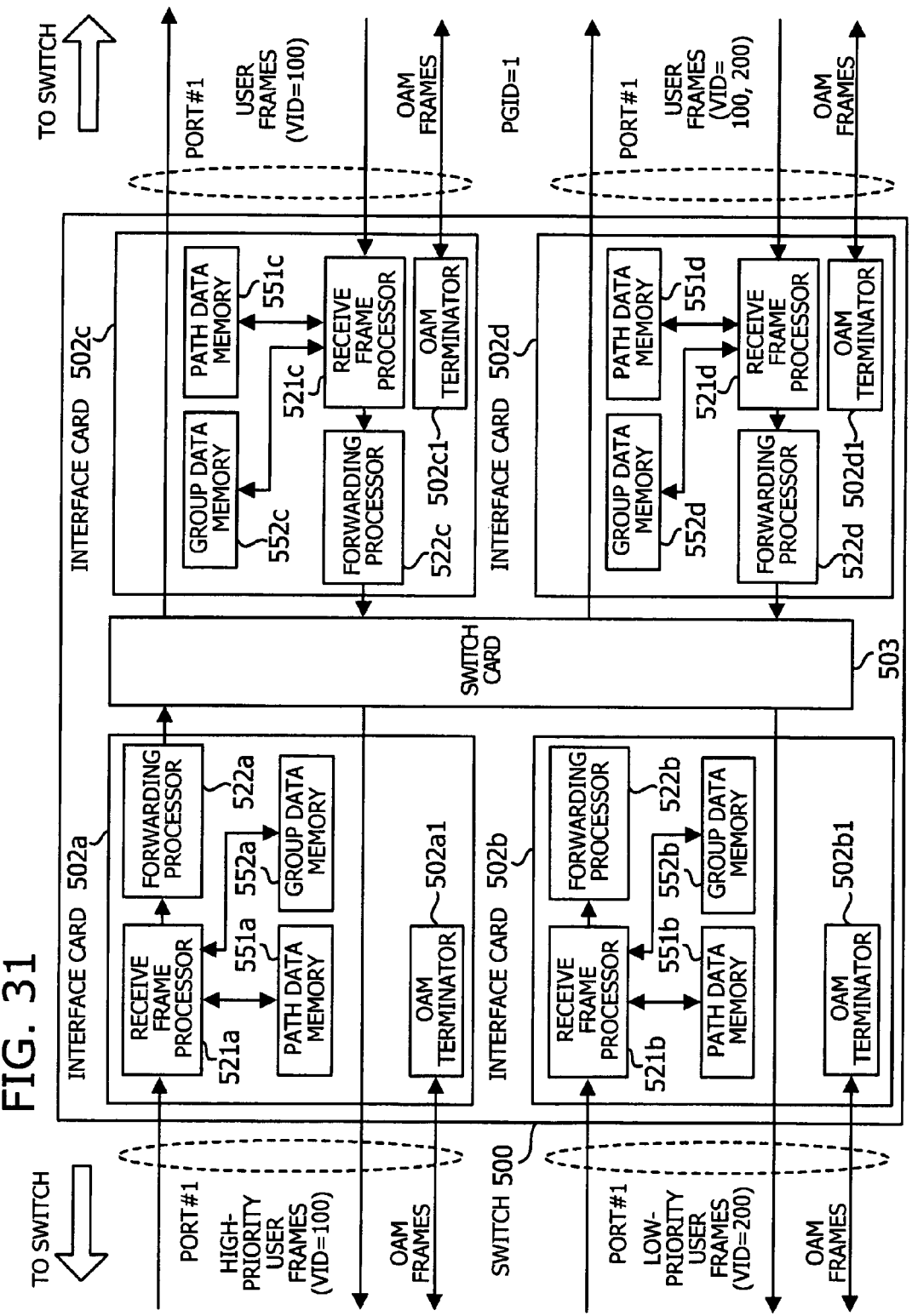

FIG. 31 is a functional block diagram of a switch according to the sixth embodiment. While FIG. 31 illustrates only one switch 500, the same configuration applies to other switches connected to this switch 500 to provide protected network paths. The communication links are protected on both sides of the switch 500. Two interface cards 502a and 502b are connected to one redundant logical path, and other two interface cards 502c and 502d are connected to another redundant logical path. FIG. 31 illustrates how the switch 500 forwards a flow of high-priority user frames of VID=100 and low-priority user frames of VID=200 using such interface cards and logical paths.

According to the sixth embodiment, the switch 500 includes four interface cards 502a, 502b, 502c, and 502d and a switch card 503. The first interface card 502a includes an OAM terminator 502a1, a receive frame processor 521a, a forwarding processor 522a, a path data memory 551a, a group data memory 552a, and a controller (not illustrated).

The first interface card 502a outputs or discards user frames, depending on forwarding decisions made by its forwarding processor 522a. In the former case, user frames are transmitted according to their relevant logical path data. The OAM terminator 502a1 detects failure of a path between communication devices by sending and receiving OAM frames. In other words, the OAM terminator 502a1 serves here as a failure detector.

The receive frame processor 521a receives user frames from a path protection domain. Upon receipt of a user frame, the receive frame processor 521a searches the group data memory 552a to retrieve group data relevant to the received user frame. More specifically, the user frame contains a specific VID, and the path data memory 551a stores path data records for various VIDs. The receive frame processor 521a thus consults the path data memory 551a to retrieve a path data record corresponding to the VID of the received user frame. The retrieved path data record contains a specific receiving PGID, which may be found as part of group data stored in the group data memory 552a. This PGID permits retrieval of a group data record corresponding to the received user frame. In the present embodiment, the receive frame processor 521a receives user frames from the attached path protection domain and retrieves a corresponding group data record from the group data memory 552a. In this way, the receive frame processor 521a operates as the foregoing receive data processor 11 (FIG. 1).

The forwarding processor 522a determines whether to output the received user frame for forwarding or to discard it, based on path selection data in the group data record that the receive frame processor 521a has retrieved. More specifically, the forwarding processor 522a receives a path data record and a group data record retrieved by the receive frame processor 521a. The forwarding processor 522a compares the receiving PG path field of the path data record with the path selection data field of the group data record. When the two field values match with each other, the forwarding processor 522a determines to output the user frame to its relevant logical path. When the two field values are different, the forwarding processor 522a determines to discard the user frame.

Here the receive frame processor 521a and forwarding processor 522a execute a forwarding decision process similarly to their counterparts in the foregoing fourth embodiment. For the details of this process, see the previous discussion of the method of FIGS. 20 to 22.

The path data memory 551a stores path data, i.e., a collection of records each including the following associated set of information items: (a) VID identifying user frames, (b) logical path data describing other interface cards (physical paths) associated with a receiving logical path of those user frames, (c) sending PGID and receiving PGID indicating protection groups used to transport those user frames, and (d) receiving PG path indicating whether the receiving logical path in the logical path data is a working entity or protection entity. This path data describes a logical path used to transport given user frames.

It is noted that the path data for user frames of VID=100 defines both working entity and protection entity because of their higher priority. On the other hand, the path data for user frames of VID=200 only defines working entity because of their lower priority. That is, according to the sixth embodiment, high-priority user frames can use both working and protection entities in their protection group, whereas low-priority user frames are only allowed to use working entity. Accordingly, the high-priority user frames can be fully protected from possible failure in the active working entity. In the event of failure, the protection entity is activated by modifying path selection data of their corresponding group data. In contrast, the low-priority user frames are discarded when their assigned working entity is failed.

The sixth embodiment also allows high-priority user frames to take over the working entity of low-priority user frames when logical paths are switched. In this case, the path data of low-priority user frames is configured to stop sending user frames over the working entity in the event of switchover. In other words, the working entity of low-priority user frames is used as protection entity of high-priority user frames. Accordingly, the path protection domain transports high-priority user frames in preference to low-priority user frames (which would be discarded in failure situation), thus achieving priority-controlled transport of user frames. Details of path data according to the sixth embodiment will be discussed later with reference to FIGS. 34 to 37.

The group data memory 552a stores group data records associating protection group identifiers with path selection data. Protection group identifiers identify each specific protection group that provides logical paths constituting a redundant logical path for transporting a group of user frames. Path selection data associated with a protection group specifies which logical path of the group is selected to transport user frames. The sixth embodiment uses the same group data structure discussed in the fifth embodiment, and accordingly, its explanation will not be repeated here.

The second to fourth interface cards 502b to 502d include their own OAM terminators 502b1 to 502d1, receive frame processors 521b to 521d, forwarding processors 522b to 522d, path data memories 551b to 551d, and group data memories 552b to 552d. These functional blocks are configured in the same way as their counterparts in the foregoing first interface card 502a to provide similar functions. As in the second and third embodiments, the interface cards 502a to 502d may be able to connect to terminal devices.

The switch card 503 routes user frames from their respective receiving interface cards to sending interface cards, based on forwarding decisions made by the forwarding processors 522a to 522d. The switch card 503 is configured to exchange data signals with interface cards 502a to 502d in the switch 500, so that the frame traffic can be switched among those interface cards 502a to 502d.

Figure 32:
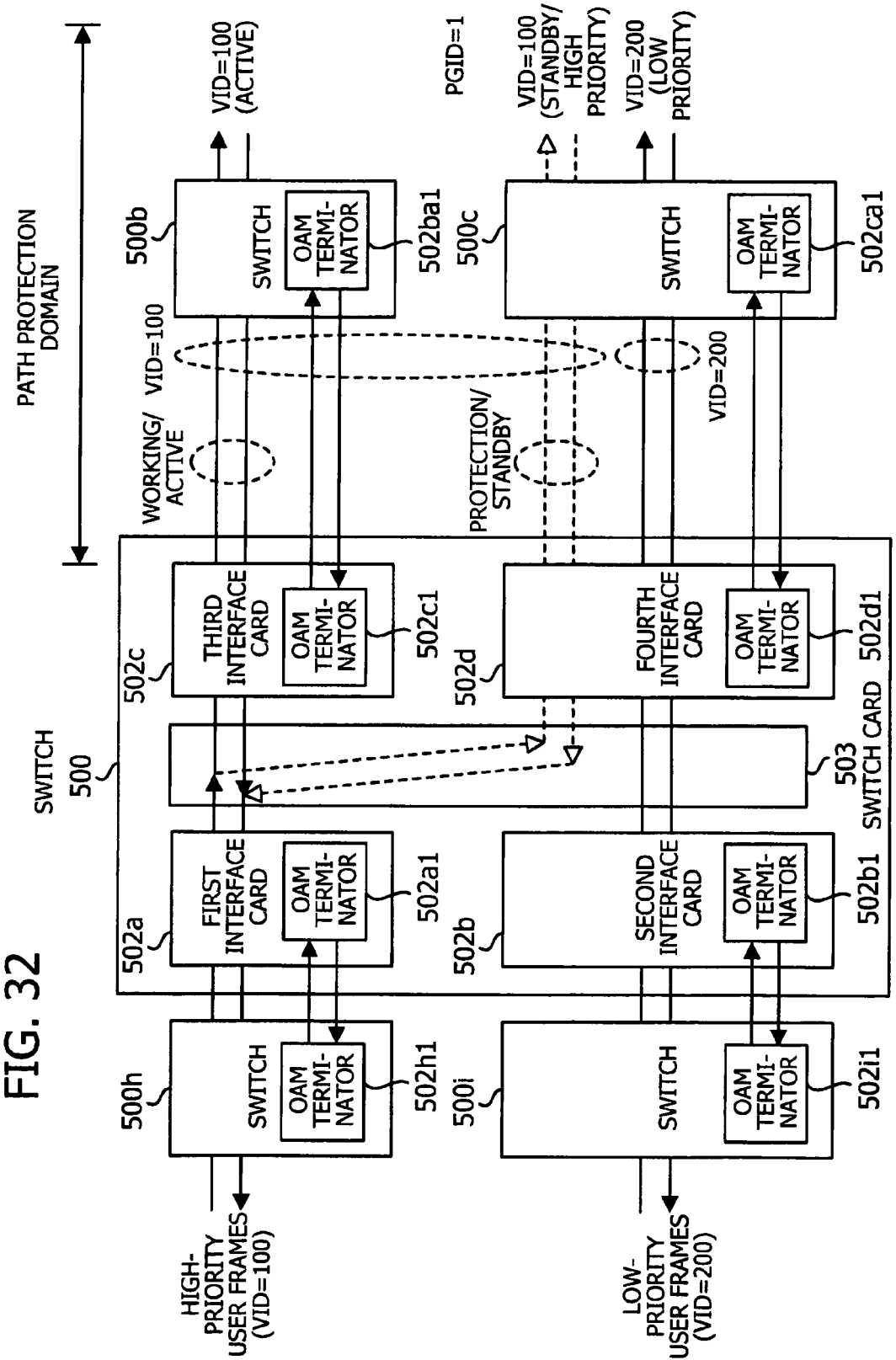
Figure 33:
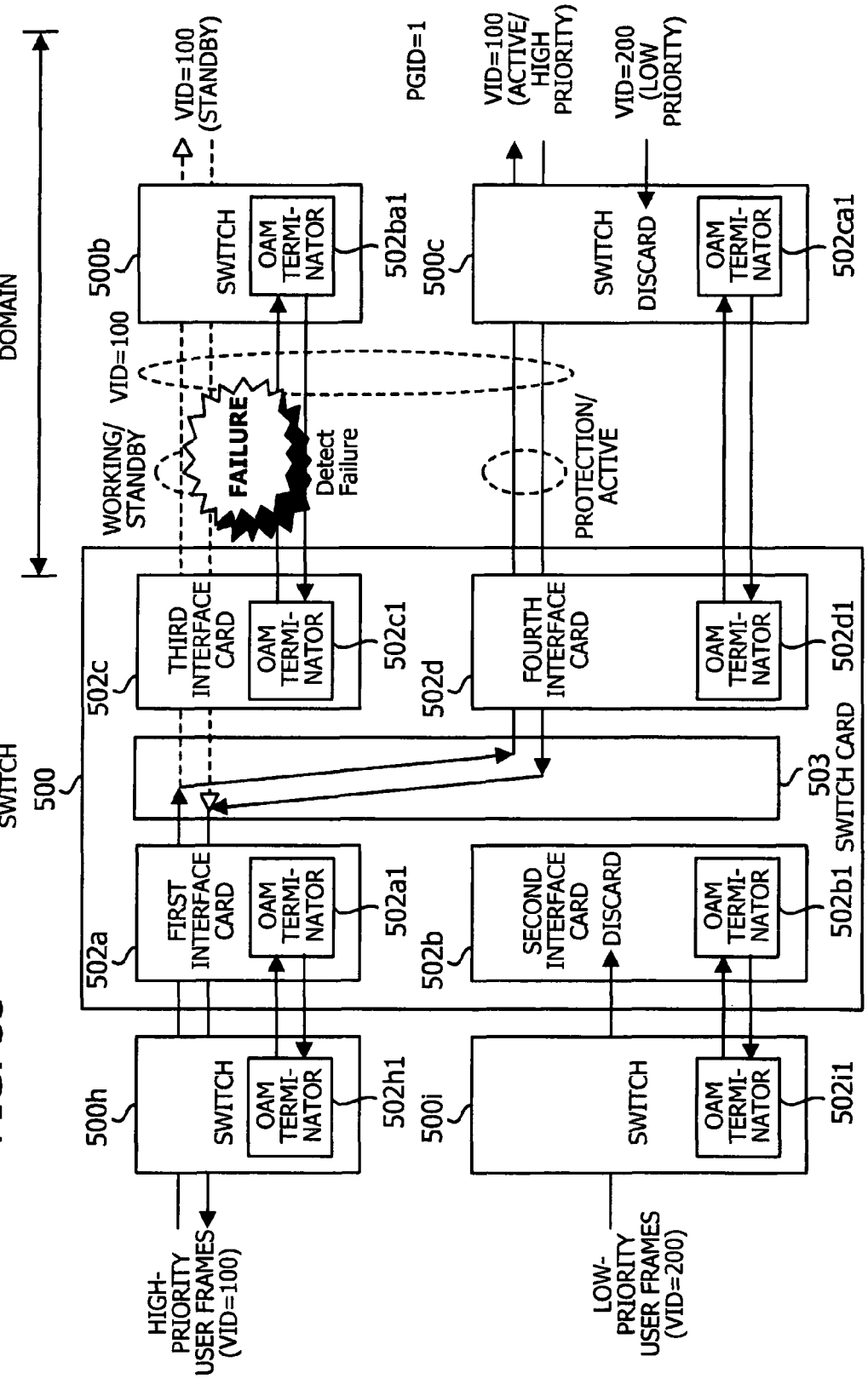
FIG. 33 illustrates how frames are transferred in a failure situation according to the sixth embodiment.

According to the sixth embodiment, the frames are transported as illustrated in FIG. 32 in normal situation, or as illustrated in FIG. 33 in failure situation. As seen in FIGS. 32 and 32, the switch 500 is coupled to a path protection domain, with its third and fourth interface cards 502c and 502d. The switch 500 is also connected to another switch 500h via its first interface card 502a. Further, the switch 500 is connected to yet another switch 500i via its second interface card 502b. The path protection domain employs switches 500b and 500c, which are connected respectively to third and fourth interface cards 502c and 502d of the switch 500.

According to the sixth embodiment, a flow of user frames with VID=100 is transported over a non-redundant path between switches 500h and 500, as well as over a path protection domain of PGID=1, under the control of the switch 500. This path protection domain offers a dual-redundant logical path, one running from the third interface card 502c to the switch 500b, the other running from the fourth interface card 502d to the switch 500c. Another flow of user frames with VID=200 is transported over a non-redundant path between switches 500i and 500c. The switch 500 is located in the middle of this path.

The logical path between the first interface card 502a and switch 500h is monitored by their OAM terminators 502a1 and 502h1. Likewise, the logical path between the second interface card 502b and switch 500i is monitored by their OAM terminators 502b1 and 502i1. The logical path between the third interface card 502c and switch 500b is monitored by their OAM terminators 502c1 and 502ba1. The logical path between the fourth interface card 502d and switch 500c is monitored by their OAM terminators 502d1 and 502c1.

FIG. 32 indicates a setup of the network in normal situation. In the illustrated path protection domain, user frames with VID=100 Specifically, the logical path between the third interface card 502c and switch 500b serves as a working entity in active state, while that between the fourth interface card 502d and switch 500c serves as a protection entity in standby state. User frames with VID=200, on the other hand, are transported over a non-protected path between the third interface card 502c and switch 500d. To transport the above-noted two flows of user frame, the switch card 503 in the switch 500 interconnects each two opposite paths. The above path setup permits user frames with VID=100 to be transported between switches 500h and 500b or between switches 500h and 500c via the switch 500, and user frames with VID=200 to be transported between switches 500i and 500c via the switch 500.

Suppose now that the logical path between the third interface card 502c and switch 500b has failed as illustrated in FIG. 33, thus disrupting transport of user frames with VID=100 over active working entity in the protection section. This failure is detected by OAM terminators 502c1 and 502ba1 monitoring that logical path.

In response to the failure detection at the OAM terminator 502c1, the switch 500 now initiates protection switching for user frames with VID=100. Accordingly, the working entity is changed from active to standby, and the protection entity is changed from standby to active, as illustrated in FIG. 33. The switch 500 also stops transporting user frames with VID=200. These user frames are thus discarded in relevant part, as indicated in FIG. 33.

FIGS. 34 to 37 illustrate an example data structure of path tables according to the sixth embodiment. The path table 551a1 of FIG. 34 has been prepared by a person who manages the switch 500 and stored in the path data memory 551a under the control of a CPU (not illustrated) and controller (not illustrated) in the switch 500. Similarly, another path table 551b1 illustrated in FIG. 35 is stored in the path data memory 551b. Still another path table 551c1 illustrated in FIG. 36 is stored in the path data memory 551c. Still another path table 551d1 illustrated in FIG. 37 is stored in the path data memory 551d. Those path tables 551a1 to 551d1 contain path data describing to which path the switch 500 is supposed to forward received user frames. Similarly to path tables 351a1, 351c1, and 351d1 of the foregoing fourth embodiment, the path tables 551a1 to 551d1 are each formed from the following data fields: "VID," "VID Validity Flag," "First Path Enable Flag," "First Path Data," "Second Path Enable Flag," "Second Path Data," "Sending PGID," "Receiving PGID," and "Receiving PG Path." The field values arranged in the horizontal direction are associated with each other, thus constituting a single record of path data.

The VID field contains VLAN ID of a virtual LAN to which user frames belong, and the VID validity flag field indicates whether the VLAN ID is valid, as in the path tables 351a1, 351c1, and 351d1 of the foregoing fourth embodiment.

User frames identified by VID in the VLAN ID field are forwarded to either of first and second paths. The first path enable flag field contains a first path enable flag indicating whether the first path is enabled, as in the path tables 351a1, 351c1, and 351d1 of the foregoing fourth embodiment. Similarly, the second path enable flag field contains a second path enable flag.

The first path data field contains first path data, as in the path tables 351a1, 351c1, and 351d1 of the foregoing fourth embodiment. Likewise, the second path data field contains second path data.

The sending PGID field contains a sending PGID identifying a protection group (and ultimately its associated interface cards) to which the receiving interface card forwards received user frames, as in the path tables 351a1, 351c1, and 351d1 of the foregoing fourth embodiment. The receiving PGID field contains a receiving PGID identifying a protection group from which the interface card receives user frames, as in the path tables 351a1, 351c1, and 351d1 of the foregoing fourth embodiment. The receiving PG path field of a path table indicates whether the corresponding interface card acts in the receiving protection group either as first path or as second path, as in the path tables 351a1, 351c1, and 351d1 of the foregoing fourth embodiment.

The switch 500 of the sixth embodiment receives two classes of user frames with different priorities as depicted in FIG. 31. User frames with VID=100 have a higher priority, while those with VID=200 have a lower priority.

In the path protection domain, the third interface card 502c (Card c) is configured to be working entity (first path) and currently specified to provide an active path for high-priority user frames with VID=100. This setup is seen in the first path enable flag and first path data fields of the path table 551a1 (FIG. 34), as well as in the receiving PG path field of the path table 551c1 (FIG. 36). Also, the fourth interface card 502d (Card d) is configured to be protection entity (second path) in the path protection domain. This setup is seen in the second path enable flag and second path data fields of the path table 551a1 (FIG. 34), as well as in the receiving PG path field of the path table 551d1 (FIG. 37).

Low-priority user frames with VID=200, on the other hand, have no assignment of protection entity (second path), while the fourth interface card 502d (card d) is configured to be working entity (first path). This setup is seen in the first path enable flag and first path data fields of the path table 551b1 (FIG. 35), as well as in the receiving PG path field of the path table 551d1 (FIG. 37).

With the above-described features of the sixth embodiment, the group data is altered in the case of failure or the like, so that its path selection data specifies second path, instead of first path. The forwarding decision process initiates forwarding operation of user frames with VID=100 via the fourth interface card 502d according to path tables 551a1 and 551d1, while stopping the same in the third interface card 502c according to path tables 551a1 and 551c1. At the same time, the forwarding of user frames with VID=200 is also stopped according to the path tables 551b1 and 551c1. It is possible, by configuring each path table in this way, to stop and discard low-priority user frames, while continuing forwarding operation of high-priority user frames over the protected path. The sixth embodiment thus enables priority-based control of user frame traffic in the case of failure in a path protection domain.

As can be seen from the above description, the sixth embodiment enables path protection for prioritized user frames, in addition to providing features of the fourth embodiment. The sixth embodiment discards low-priority user frames upon protection switching due to a path failure, thus making it possible to maintain the transport of high-priority user frames.

(g) Seventh Embodiment

A seventh embodiment will now be described below. Since the seventh embodiments shares some elements with the foregoing fifth embodiment, the following description will focus on its distinctive features, while affixing like reference numerals to like elements.

The seventh embodiment differs from the fifth embodiment in its use of a group enable flag indicating validity of each protection group. This group enable flag permits a switch to control communication on an individual protection group basis.

Figure 38:
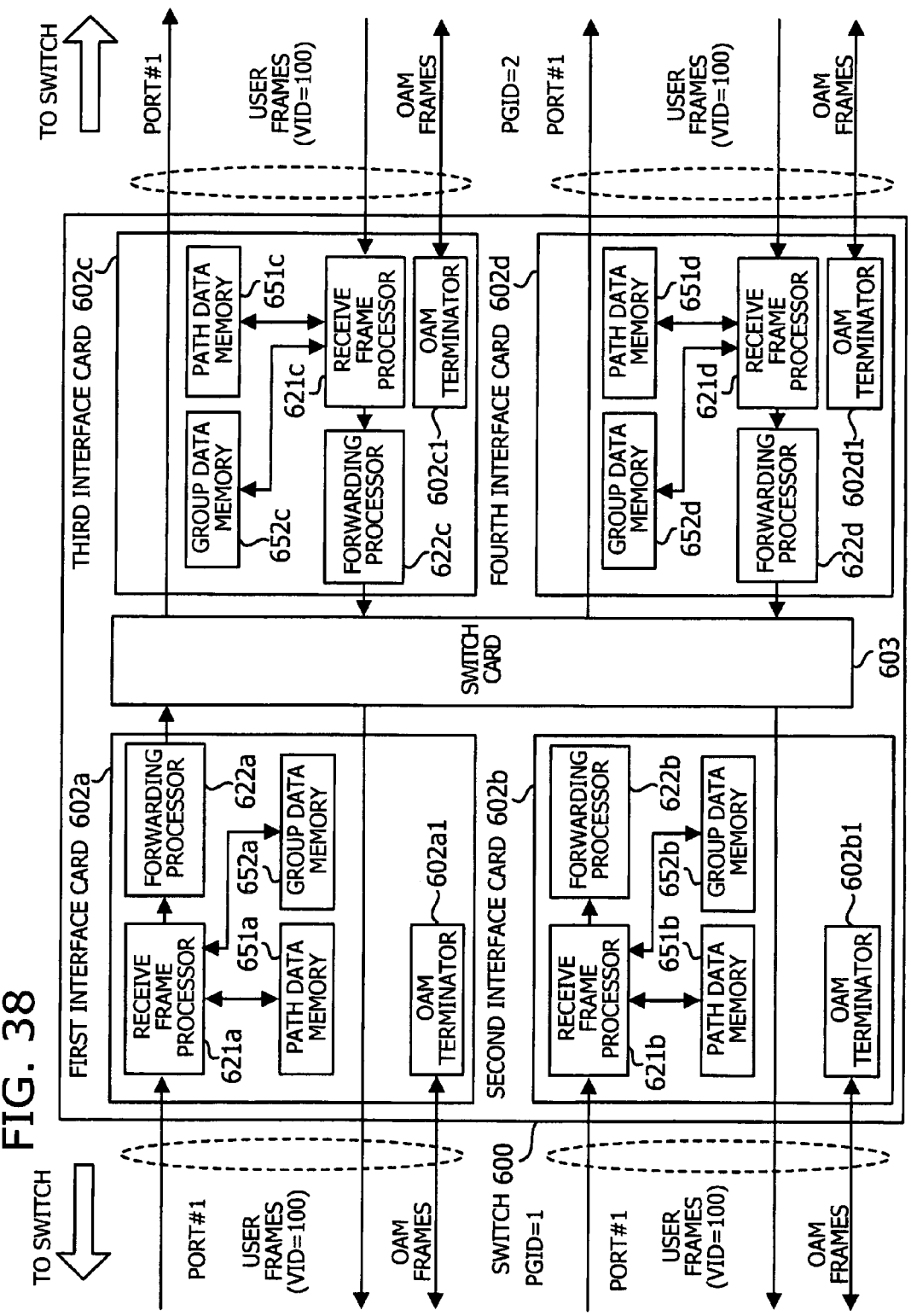
FIG. 38 is a functional block diagram of a switch according to a seventh embodiment.

FIG. 38 is a functional block diagram of a switch according to the seventh embodiment. While FIG. 38 illustrates only one switch 600, the same configuration applies to other switches connected to this switch 600 to provide protected network paths. The communication links are protected on both sides of the switch 600, where two interface cards 602a and 602b are connected to one redundant logical path, and another two interface cards 602c and 602d are connected to another redundant logical path. The switch 600 has group enable flags in its group data, which makes it possible to control forwarding operation on an individual PGID basis. FIG. 38 illustrates how the switch 600 forwards a flow of user frames with VID=100 using such interface cards and logical paths.

According to the seventh embodiment, the switch 600 includes four interface cards 602a, 602b, 602c, and 602d and a switch card 603. The first interface card 602a includes an OAM terminator 602a1, a receive frame processor 621a, a forwarding processor 622a, a path data memory 651a, a group data memory 652a, and a controller (not illustrated). The first interface card 602a outputs or discards user frames, depending on forwarding decisions made by its forwarding processor 622a. In the former case, user frames are transmitted according to their relevant logical path data.

The OAM terminator 602a1 detects failure of a path between communication devices by sending and receiving OAM frames. In other words, the OAM terminator 602a1 serves here as a failure detector.

The receive frame processor 621a receives user frames from a path protection domain. Upon receipt of a user frame, the receive frame processor 621a searches the group data memory 652a to retrieve group data relevant to the received user frame. More specifically, the user frame contains a specific VID, and the path data memory 651a stores path data records for various VIDs. The receive frame processor 621a thus consults the path data memory 651a to retrieve a path data record corresponding to the VID of the received user frame. The retrieved path data record contains a specific receiving PGID, which may be found as part of group data stored in the group data memory 652a. This PGID permits retrieval of a group data record corresponding to the received user frame. In the present embodiment, the receive frame processor 621a receives user frames from the attached path protection domain and retrieves a corresponding group data record from the group data memory 652a. In this way, the receive frame processor 621a operates as the foregoing receive data processor 11 (FIG. 1).

The forwarding processor 622a determines whether to output the received user frame for forwarding or to discard it, based on path selection data in the group data record that the receive frame processor 621a has retrieved. More specifically, the forwarding processor 622a receives a path data record and a group data record retrieved by the receive frame processor 621a. The forwarding processor 622a compares the receiving PG path field of the path data record with the path selection data field of the group data record. When the two field values match with each other, the forwarding processor 622a determines to output the user frame to its relevant logical path. When the two field values are different, the forwarding processor 622a determines to discard the user frame. In addition to the above, the forwarding processor 622a examines the group enable flag field of the retrieved group data record. When this group enable flag field indicates invalidity of the protection group of interest, the forwarding processor 622a determines to discard the user frame.

The path data memory 651a stores path data, i.e., a collection of records each including the following associated set of information items: (a) VID identifying user frames, (b) logical path data describing other interface cards (physical paths) associated with a receiving logical path of those user frames, (c) sending PGID and receiving PGID indicating protection groups used to transport those user frames, and (d) receiving PG path indicating whether the receiving logical path in the logical path data is a working entity or protection entity. This path data describes a logical path used to transport given user frames. The seventh embodiment uses the same path data structure discussed in the fifth embodiment, and accordingly, its explanation will not be repeated here.

The group data memory 652a stores group data, i.e., a collection of records each formed from a protection group identifier, a group enable flag, and path selection data. Protection group identifiers identify each specific protection group that provides logical paths constituting a redundant logical path for transporting a group of user frames. Group enable flags associated with protection groups indicate whether each group is allowed to transport user frames. Path selection data associated with a specific protection group specifies which logical path of the group is selected to transport user frames. Details of group data according to the seventh embodiment will be discussed later with reference to FIG. 39.

The second to fourth interface cards 602b to 602d include their own OAM terminators 602b1 to 602d1, receive frame processors 621b to 621d, forwarding processors 622b to 622d, path data memories 651b to 651d, group data memories 652b to 652d. These functional blocks are configured in the same way as their counterparts in the foregoing first interface card 602a to provide similar functions. As in the second and third embodiments, those interface cards 602a to 602d may be able to connect to terminal devices.

The switch card 603 routes user frames from their respective receiving interface cards to sending interface cards, based on forwarding decisions made by the forwarding processors 622a to 622d. The switch card 603 is configured to exchange data signals with interface cards 602a to 602d in the switch 600, so that the frame traffic can be switched among those interface cards 602a to 602d.

FIGS. 39A and 39B illustrate an example data structure of group tables according to the seventh embodiment. Specifically, FIG. 39A illustrates a group table 652a1 before path switching, while FIG. 39B illustrates a group table 652a2 after path switching. The group table 652a1 (652a2) has been prepared by a person who manages the switch 600 and stored in a group data memory 652a under the control of a CPU (not illustrated) and controller (not illustrated) in the switch 600. Specifically, the group table 652a1 (652a2) is formed from frame following data fields: "PGID," "Group Enable Flag," and "Path Selection Data." The field values arranged in the horizontal direction are associated with each other, thus constituting a single record of group data.

While FIGS. 39A and 39B only illustrate a group table stored in the first interface card 602a, other three interface cards 602b to 602d also have similar group tables (not illustrated) in their own group data memories 652b to 652d. Those group tables contain the same field values as the above-described group table 652a1 (652a2). The PGID field contains a PGID identifying a protection group assigned to user frames, as in the group table 452a1 (452a2) of the foregoing fifth embodiment.

The group enable flag field indicates whether the corresponding protection group is enabled. When a specific protection group is used to transport user frames, its corresponding group enable flag is set to one to indicate the validity of that group. When a specific protection group is not used to transport user frames, its group enable flag is set to zero to indicate the invalidity of that group.

The path selection data field of a protection group contains path selection data indicating which path is currently selected as active entity for communication in that group, as in the group table 452a1 (452a2) of the foregoing fifth embodiment.

Figure 40:
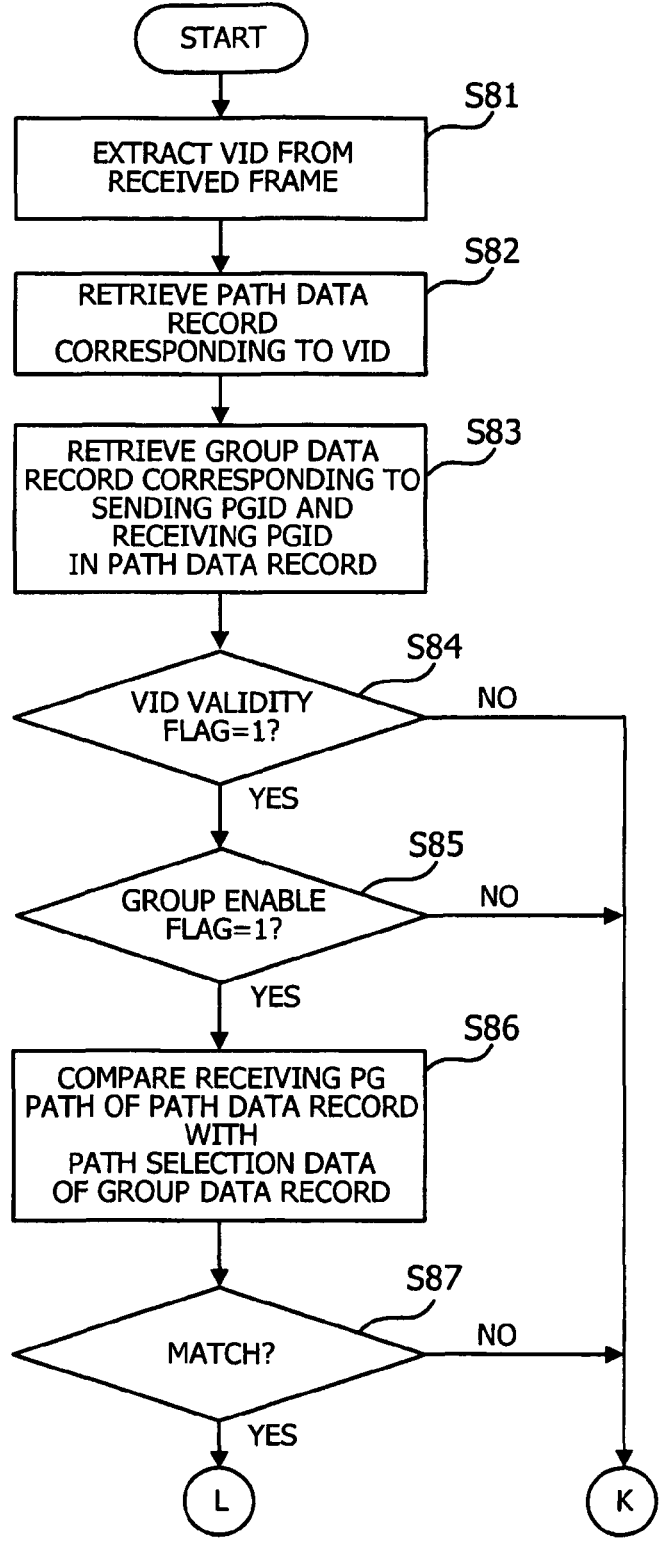
FIGS. 40 to 42 are a method illustrating a process to make a forwarding decision according to the seventh embodiment.
Figure 41:
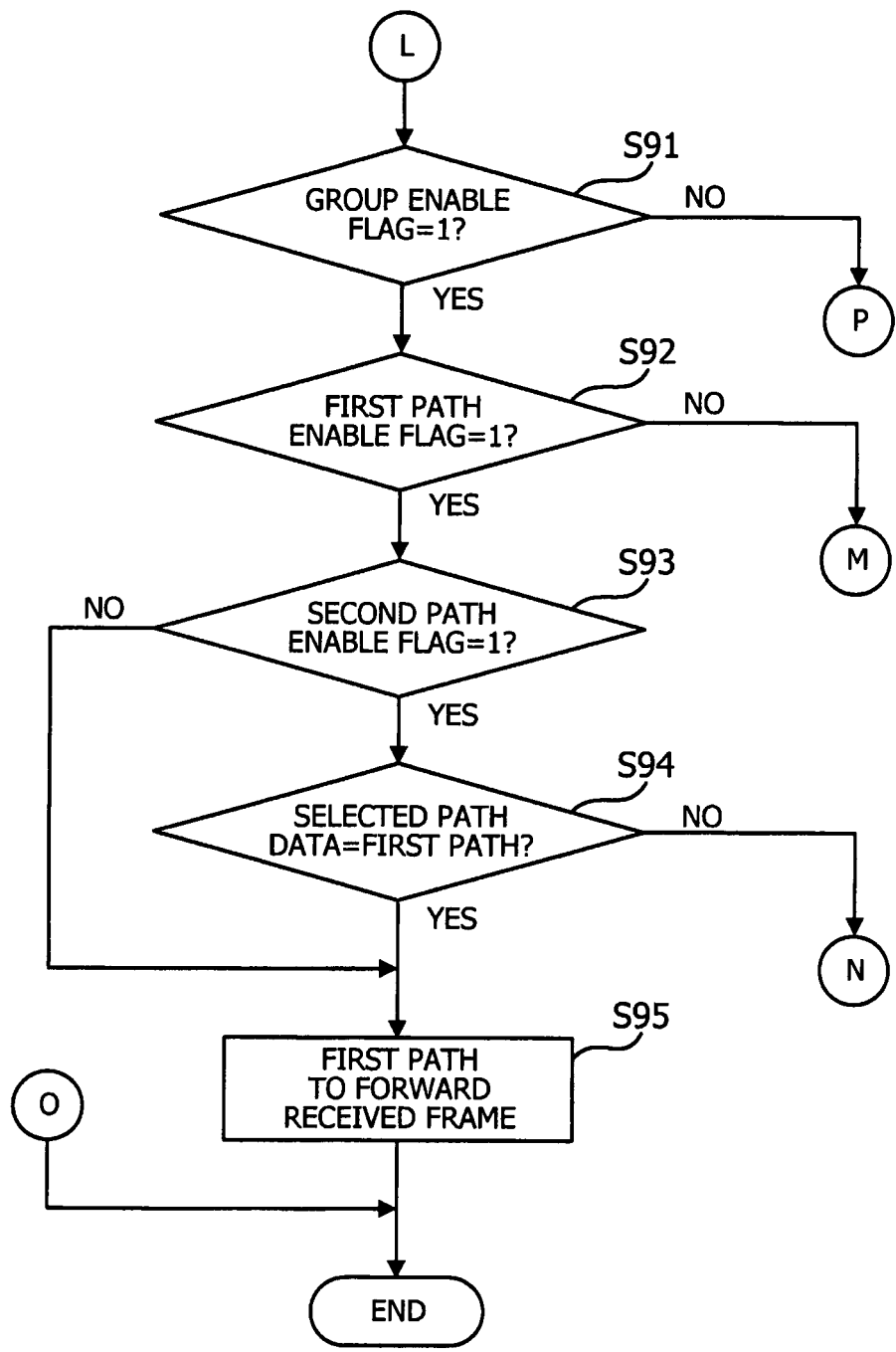
Figure 42:
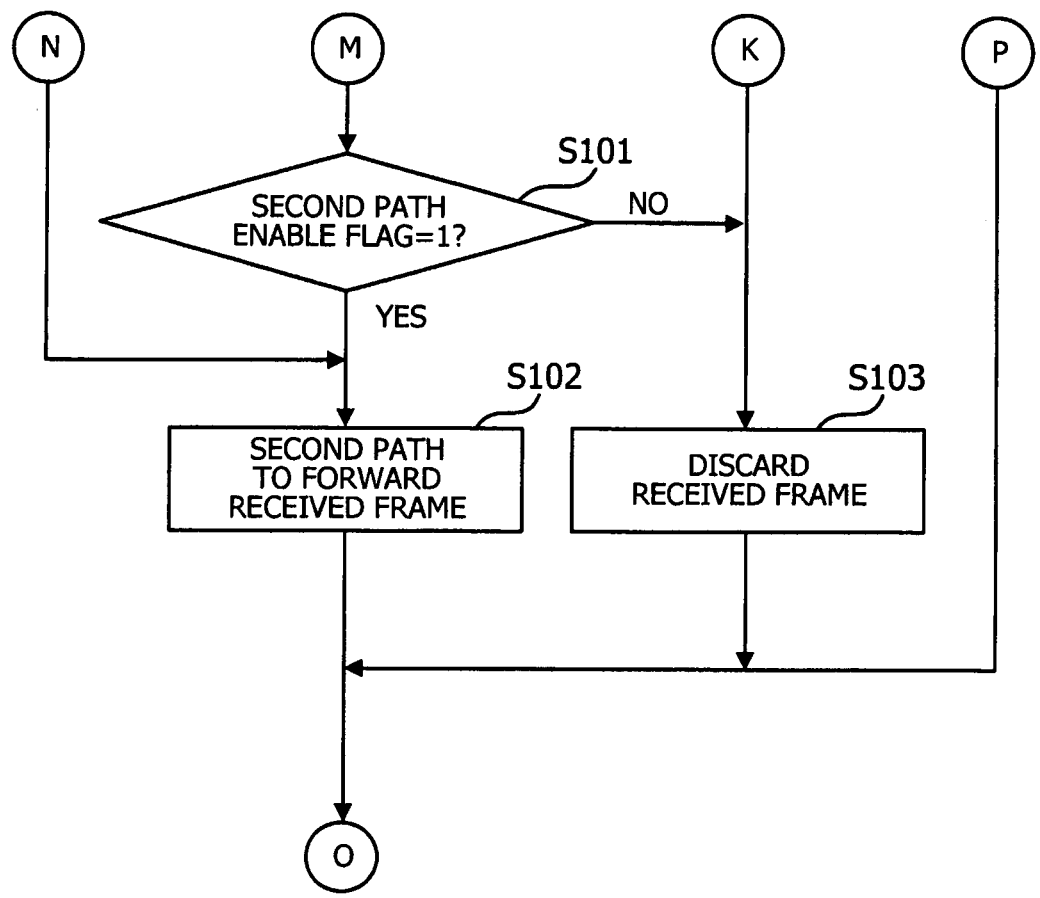

With the above-described structure, the seventh embodiment executes processing operations described below. FIGS. 40 to 42 are a method of a process of making forwarding decisions according to the seventh embodiment. This forwarding decision process determines which path to use to forward a given flow of user frames, based on path data and group data corresponding to VID of that flow. The process is initiated at each interface card 602a to 602d when a user frame arrives at a port of their receive frame processors 621a to 621d. For example, the first interface card 602a operates as follows to make a forwarding decision.

According to the forwarding decision process of the seventh embodiment, the first interface card 602a determines PGID of each received user frame based on their VLAN ID and corresponding path data. A group data record corresponding to the PGID is retrieved. Based on the group enable flag field of this record, it is then determined whether to forward or discard the user frame. It is also determined, based on the path selection data field of the retrieved group data record, whether to forward the user frame to first path or second path, or to discard the user frame without forwarding it. More specifically, the forwarding decision process executes the following operations:

(Operation S81) The receive frame processor 621a extracts VID from a received user frame.

(Operation S82) The receive frame processor 621a consults a path table (not illustrated) in the path data memory 651a to retrieve a path data record corresponding to the VID extracted at operation S81.

(Operation S83) The receive frame processor 621a consults a group table in the group data memory 652a to retrieve a group data record corresponding to the receiving PGID field of the path data record retrieved at operation S82, as well as a group data record corresponding to the sending PGID of the same.

(Operation S84) The forwarding processor 622a examines the VID validity flag in the path data record retrieved at operation S82. If the VID validity flag is one (i.e., VID is valid), the process advances to operation S85. If the VID validity flag is zero (i.e., VID is invalid), then the process branches to operation S103 (FIG. 42).

(Operation S85) The forwarding processor 622a examines the group enable flag in the group data record retrieved at operation S83. If the group enable flag is one (i.e., group is enabled), the process advances to operation S86. If the group enable flag is zero (i.e., group is disabled), then the process branches to operation S103.

(Operation S86) The forwarding processor 622a compares the receiving PG path field of the path data record retrieved at operation S82 with the path selection data field of the group data record retrieved at operation S83.

(Operation S87) The forwarding processor 622a examines the comparison result of operation S86. That is, if the two field values match with each other, the process advances to operation S91 (FIG. 41). If the two field values are different, the process proceeds to operation S103.

(Operation S91) The forwarding processor 622a examines the group enable flag in the group data record retrieved at operation S83 (FIG. 40). If the group enable flag is one (i.e., group is enabled), the process advances to operation S92. If the group enable flag is zero (i.e., group is disabled), then the process branches to operation S103 (FIG. 42).

(Operation S92) The forwarding processor 622c examines first path enable flag in the path data record retrieved at operation S82 (FIG. 40). If the first path enable flag is one, the process advances to operation S93. If the first path enable flag is zero, the process branches to operation S101 (FIG. 42).

(Operation S93) The forwarding processor 622a examines second path enable flag in the path data record retrieved at operation S82. If the second path enable flag is one, the process advances to operation S94. If the second path enable flag is zero, the process skips to operation S95.

(Operation S94) The forwarding processor 622a determines whether the path selection data in the group data record retrieved at operation S83 specifies the first path. If so, the process advances to operation S95. If not, the process branches to S102 (FIG. 42).

(Operation S95) The forwarding processor 622a concludes that the first path is to forward the user frame, thus terminating the forwarding decision process.

(Operation S101) The forwarding processor 622a examines second path enable flag in the path data record retrieved at operation S82 (FIG. 40). If the second path enable flag is one, the process advances to operation S102. If the second path enable flag is zero, the process skips to operation S103.

(Operation S102) The forwarding processor 622a concludes that the second path is to forward the user frame, thus terminating the forwarding decision process.

(Operation S103) The forwarding processor 622a determines to discard the received user frame without forwarding it, thus terminating the forwarding decision process.

As can be seen from the above description, the seventh embodiment makes forwarding decisions based on group enable flags, in addition to providing features of the fifth embodiment. By modifying group enable flags, the switch controls whether to transmit or discard user frames on an individual protection group basis. This feature of the seventh embodiment makes it possible to quickly stop the ongoing flow of user frames on a particular path in various situations, such as when modifying link connections, when a failure is encountered, and when testing the network or its constituent components.

(h) Eighth Embodiment

An eighth embodiment will now be described below. Since this eighth embodiment shares some elements with the foregoing fourth embodiment, the following description will focus on its distinctive features, while affixing like reference numerals to like elements.

Figure 43:
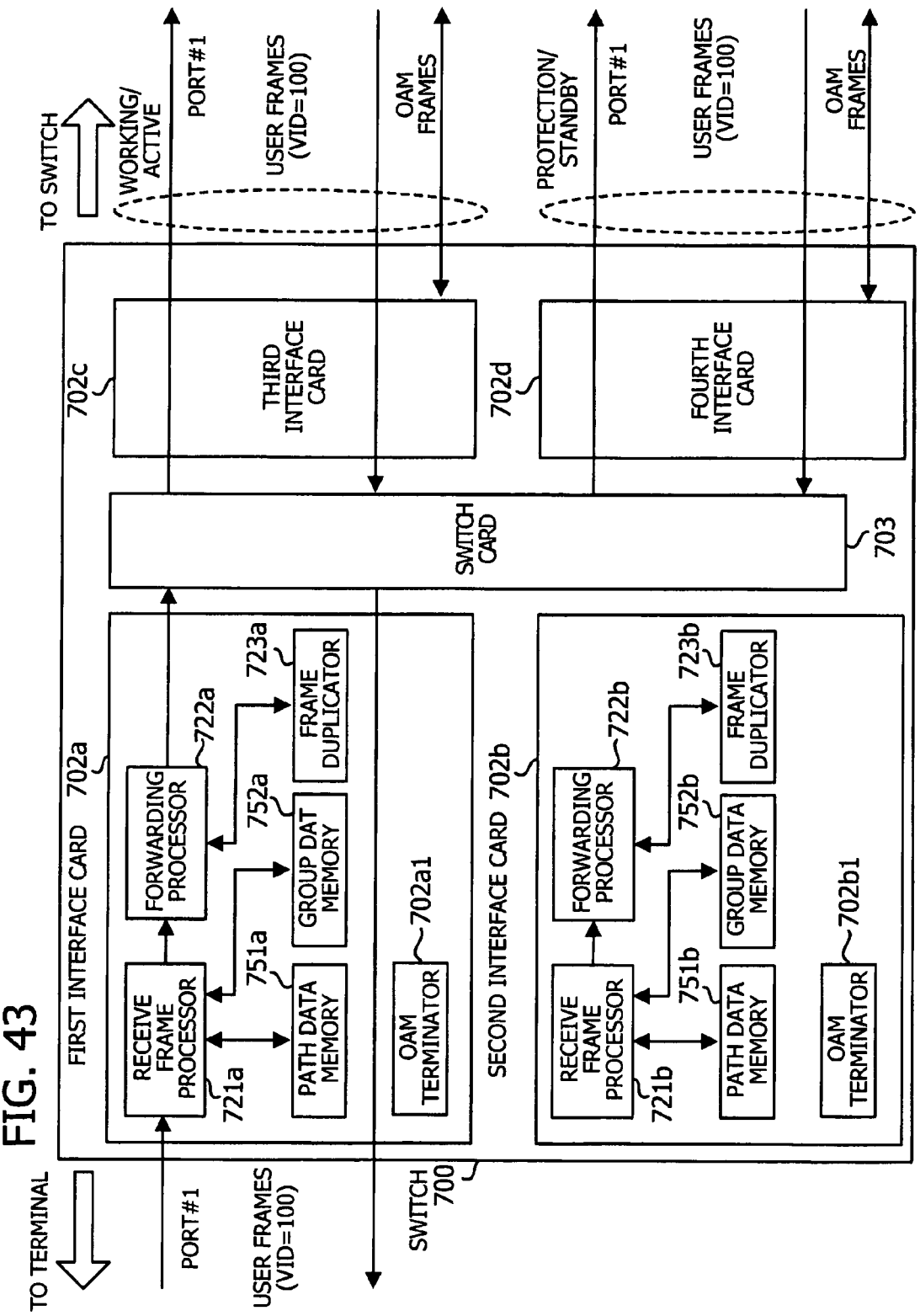
FIG. 43 is a functional block diagram of a switch according to an eighth embodiment.

The eighth embodiment differs from the fourth embodiment in its use of a 1+1 enable flag to determine whether to execute 1+1 protection. FIG. 43 is a functional block diagram of a switch according to the eighth embodiment. While FIG. 43 illustrates only one switch 700, the same configuration applies to other switches connected to this switch 700 to provide protected network paths.

Specifically, FIG. 43 illustrates a switch 700 configured to support the 1+1 protection architecture. A flow of user frames with VID=100 are transported over a 1+1 redundant logical path extending from interface cards 702c and 702d. According to the eighth embodiment, the illustrated switch 700 includes four interface cards 702a, 702b, 702c, and 702d and a switch card 703. The first interface card 702a includes an OAM terminator 702a1, a receive frame processor 721a, a forwarding processor 722a, a frame duplicator 723a, a path data memory 751a, a group data memory 752a, and a controller (not illustrated). The first interface card 702a outputs or discards user frames, depending on forwarding decisions made by its forwarding processor 722a. In the former case, user frames are transmitted according to their relevant logical path data.

The OAM terminator 702a1 detects failure of a path between communication devices by sending and receiving OAM frames. In other words, the OAM terminator 702a1 serves here as a failure detector.

The receive frame processor 721a receives user frames from a path protection domain. Upon receipt of a user frame, the receive frame processor 721a searches the group data memory 752a to retrieve group data relevant to the received user frame. More specifically, the user frame contains a specific VID, and the path data memory 751a stores path data records for various VIDs. The receive frame processor 721a thus consults the path data memory 751a to retrieve a path data record corresponding to the VID of the received user frame. The retrieved path data record contains a specific receiving PGID, which may be found as part of group data stored in the group data memory 752a. This PGID permits retrieval of a group data record corresponding to the received user frame. In the present embodiment, the receive frame processor 721a receives user frames from a terminal device via a non-protected path and retrieves a corresponding group data record from the group data memory 752a. In this way, the receive frame processor 721a operates as the foregoing receive data processor 11 (FIG. 1).

The forwarding processor 722a determines whether to output the received user frame for forwarding or to discard it, based on path selection data in the group data record that the receive frame processor 721a has retrieved. More specifically, the forwarding processor 722a receives a path data record and a group data record retrieved by the receive frame processor 721a. The forwarding processor 722a compares the receiving PG path field of the path data record with the path selection data field of the group data record. When the two field values match with each other, the forwarding processor 722a determines to output the user frame to its relevant logical path. When the two field values are different, the forwarding processor 722a determines to discard the user frame. The forwarding processor 722a further examines the 1+1 enable flag field of the above path data record. When this flag indicates that 1+1 protection is enabled, the forwarding processor 722a determines to output the user frame to two logical paths to achieve the 1+1 protection.

In the 1+1 protection architecture, the user data traffic is copied and fed to both logical paths of a protected domain. The frame duplicator 723a copies each received user frame for the purpose of transmission over two logical paths constituting 1+1 protection. The copied user frames are fed to the third and fourth interface cards 702c and 702d so that they are transported over the protected section.

The path data memory 751a stores path data, i.e., a collection of records each including the following associated set of information items: (a) VID identifying user frames, (b) logical path data describing other interface cards (physical paths) associated with a receiving logical path of those user frames, (c) 1+1 enable flag indicating whether 1+1 protection is enabled for those user frames, (d) sending PGID and receiving PGID indicating protection groups used to transport those user frames, and (e) receiving PG path indicating whether the receiving logical path in the logical path data is a working entity or protection entity. This path data describes a logical path used to transport given user frames. Details of group data according to the eighth embodiment will be discussed later with reference to FIG. 44.

The group data memory 752a stores group data records associating protection group identifiers with path selection data. Protection group identifiers identify each specific protection group that provides logical paths constituting a redundant logical path for transporting a group of user frames. Path selection data associated with a protection group specifies which logical path of the group is selected to transport user frames. The eighth embodiment uses the same group data structure discussed in the fifth embodiment, and accordingly, its explanation will not be repeated here.

The second interface card 702b includes its own OAM terminator 702b1, receive frame processor 721b, forwarding processor 722b, frame duplicator 723b, path data memory 751b, group data memory 752b. These functional blocks are configured in the same way as their counterparts in the foregoing first interface card 702a to provide similar functions. While not illustrated in FIG. 43, the third and fourth interface cards 702c and 702d also include their own OAM terminator, receive frame processor, forwarding processor, frame duplicator, path data memory, and group data memory, similarly to the foregoing interface card 702a. As in the second and third embodiments, those interface cards 702a to 702d may be able to connect to terminal devices.

The switch card 703 routes user frames from their respective receiving interface cards to sending interface cards, based on forwarding decisions made by the forwarding processors 722a to 722d. The switch card 703 is configured to exchange data signals with interface cards 702a to 702d in the switch 700, so that the frame traffic can be switched among those interface cards 702a to 702d.

FIG. 44 illustrates an example data structure of path tables according to the eighth embodiment. The path table 751a1 of FIG. 44 has been prepared by a person who manages the switch 700 and stored in a path data memory 751a under the control of a CPU (not illustrated) and controller (not illustrated) in the switch 700. The path table 751a1 contains path data describing to which path the switch 700 is supposed to forward received user frames. The path table 751a1 is formed from the following data fields: "VID," "VID Validity Flag," "First Path Enable Flag," "First Path Data," "Second Path Enable Flag," "Second Path Data," "1+1 Enable Flag," "Sending PGID," "Receiving PGID," and "Receiving PG Path." The field values arranged in the horizontal direction are associated with each other, thus constituting a single record of path data.

The VID field contains VLAN ID of a virtual LAN to which user frames belong, and the VID validity flag field indicates whether the VLAN ID is valid, as in the path tables 351a1, 351c1, and 351d1 of the foregoing fourth embodiment.

User frames identified by VID in the VLAN ID field are forwarded to either of first and second paths. The first path enable flag field contains a first path enable flag indicating whether the first path is enabled, as in the path tables 351a1, 351c1, and 351d1 of the foregoing fourth embodiment. Similarly, the second path enable flag field contains a second path enable flag.

The first path data field contains first path data, as in the path tables 351a1, 351c1, and 351d1 of the foregoing fourth embodiment. Likewise, the second path data field contains second path data.

The 1+1 enable flag field contains a 1+1 enable flag indicating whether the 1+1 protection architecture is enabled. For example, the path table 751a1 of the first interface card 702a contains a value of one in its 1+1 enable flag field, since the third and fourth interface cards 702c and 702d sitting opposite to the first interface card 702a are configured as transport entities of 1+1 protection, as illustrated in FIG. 43. In contrast, the path tables (not illustrated) of the third and fourth interface cards 702c and 702d contain a value of zero in their 1+1 enable flag field, since the first interface card 702a sitting opposite to the third and fourth interface cards 702c and 702d is not involved in any 1+1 protection paths, as can be seen from FIG. 43.

The sending PGID field contains a sending PGID identifying a protection group (and ultimately its associated interface cards) to which the receiving interface card forwards received user frames. The receiving PGID field contains a receiving PGID identifying a protection group from which the interface card receives user frames. The receiving PG path field of a path table indicates whether the corresponding interface card acts in the receiving protection group either as first path or as second path. That is, those data fields are similar to their counterparts in path tables 351a1, 351c1, and 351d1 of the foregoing fourth embodiment.

While FIG. 44 only illustrates a path table 751a1 of the first interface card 702a, the other interface cards 702b, 702c, and 702d also have their own path tables in their respective path data memories (e.g., 751b). Those path tables have the same data structure as the path table 751a1 described above, but may contain different path data records describing sending and receiving transport entities of user frames.

Figure 45:
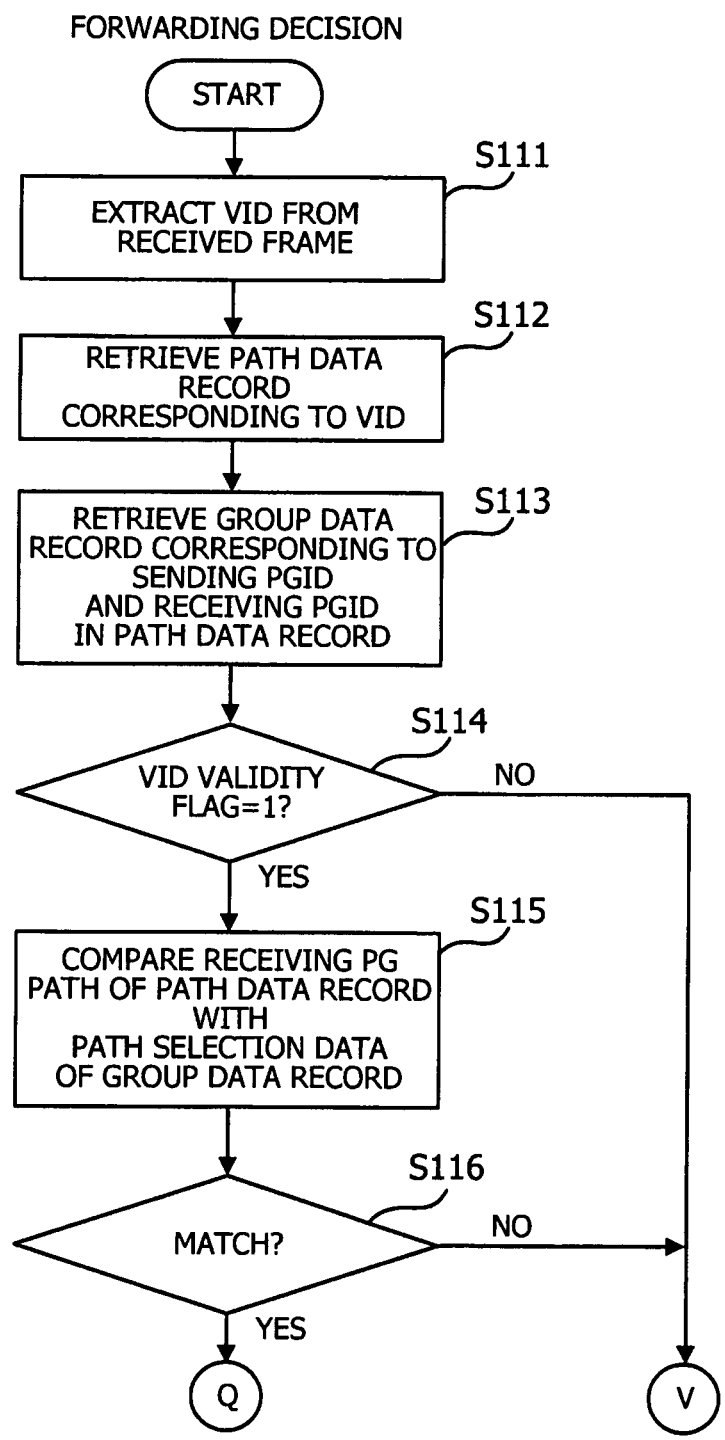
FIGS. 45 to 47 are a method illustrating a process to make a forwarding decision according to the eighth embodiment.
Figure 46:
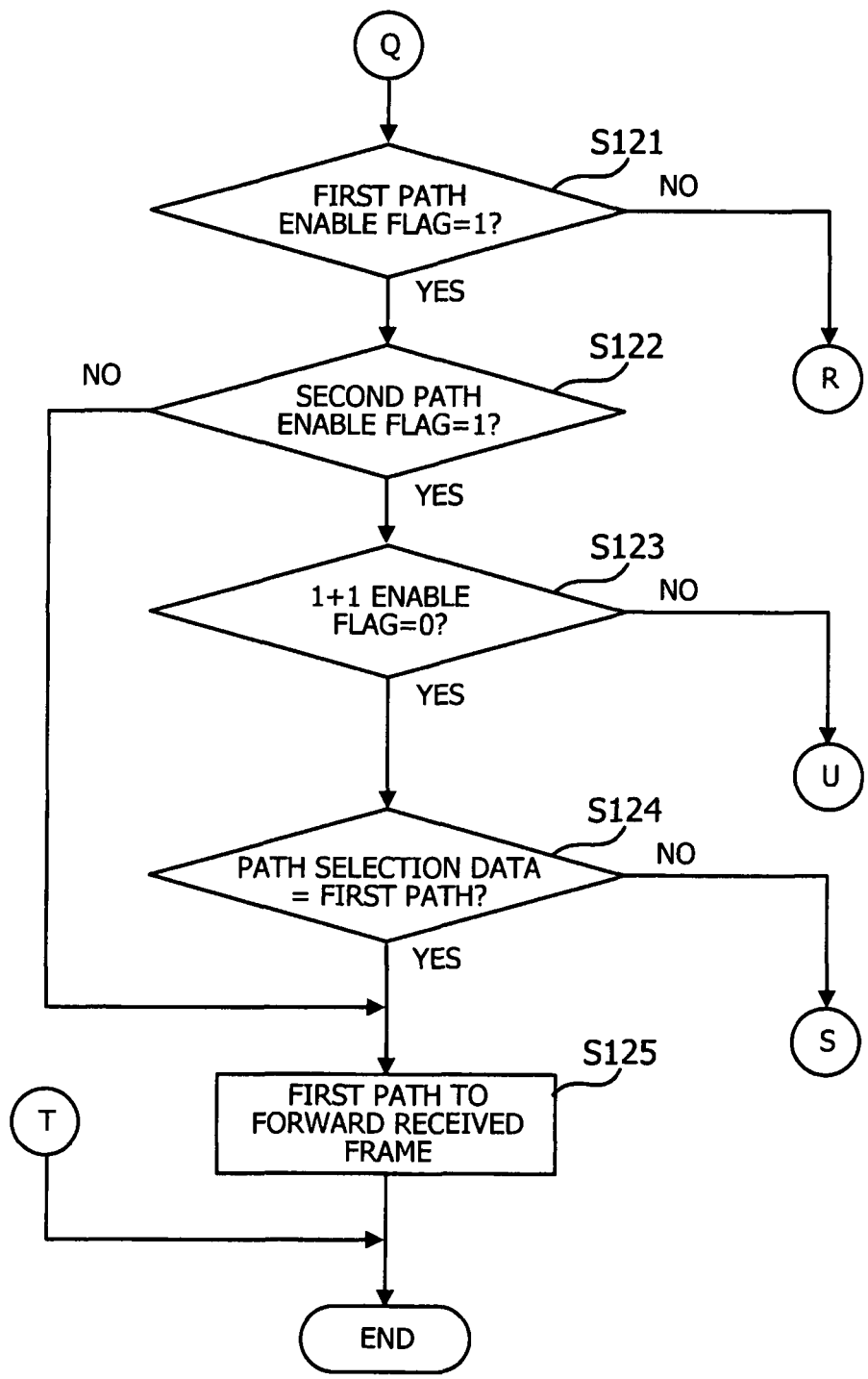
Figure 47:
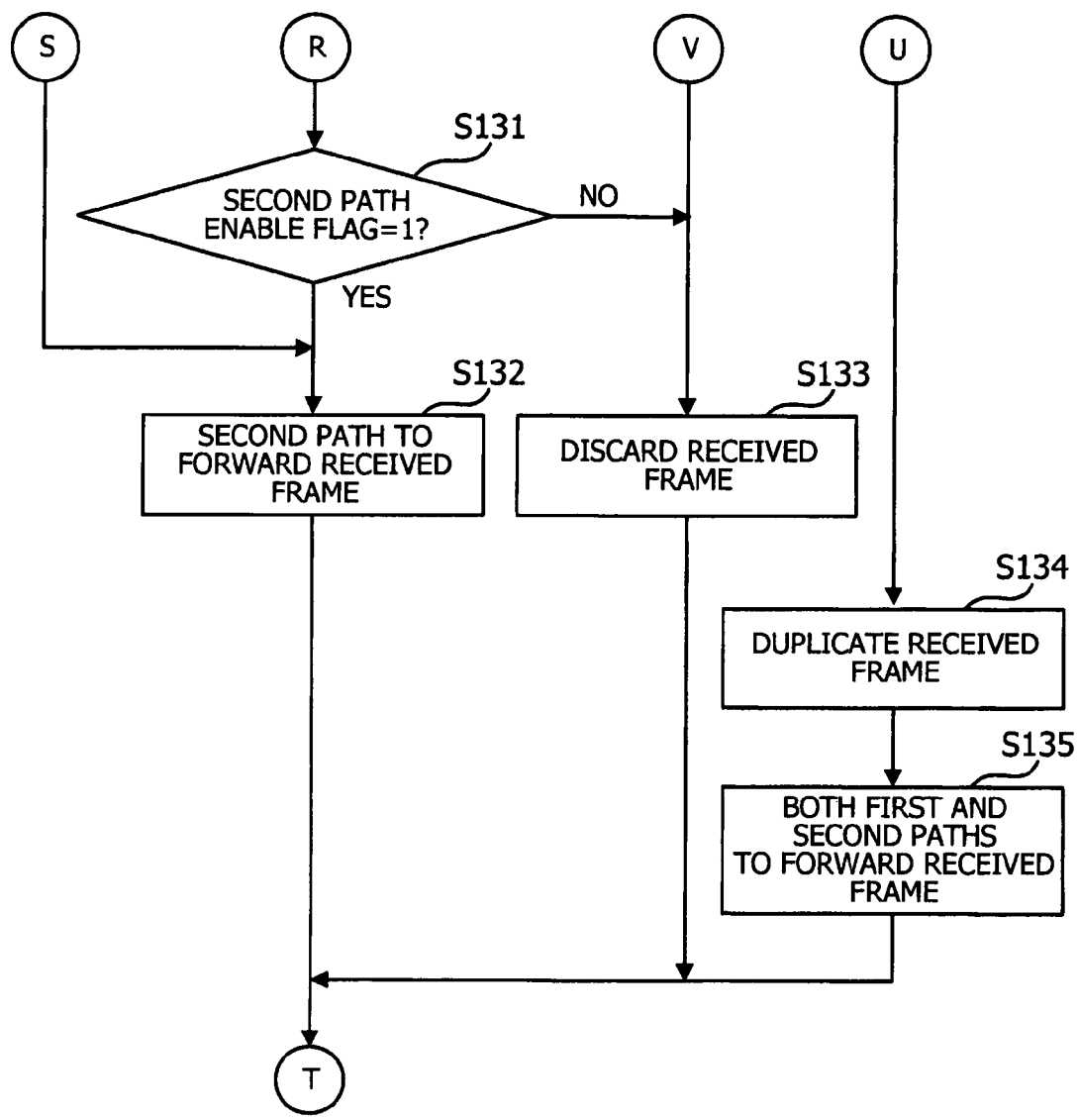

With the above-described structure, the eighth embodiment executes processing operations described below. FIGS. 45 to 47 are a method of a process of making forwarding decisions according to the eighth embodiment. This forwarding decision process determines which path to use to forward a given flow of user frames, based on path data and group data corresponding to VID of that flow. The process is initiated at each interface card 702a to 702d when a user frame arrives at a port of their receive frame processors (e.g., 721a). For example, the first interface card 702a operates as follows to make a forwarding decision.

According to the forwarding decision process of the eighth embodiment, the first interface card 702a determines PGID of each received user frame based on their VLAN ID and corresponding path data. This PGID permits retrieval of a group data record. Based on path selection data of the retrieved group data record, it is determined whether to forward the user frame to first path or second path, or to discard the user frame without forwarding it. The aforementioned path data contains a 1+1 enable flag, which indicates whether to use 1+1 protection or 1:1 protection for sending user frames. More specifically, the forwarding decision process executes the following operations:

(Operation S111) The receive frame processor 721a extracts VID from a received user frame.

(Operation S112) By consulting a path table 751a1 in the path data memory 751a, the receive frame processor 721a retrieves a path data record corresponding to the VID extracted at operation S111.

(Operation S113) By consulting a group table in the group data memory 752a, the receive frame processor 721a retrieves a group data record corresponding to the receiving PGID field of the path data record retrieved at operation S112, as well as a group data record corresponding to the sending PGID of the same.

(Operation S114) The forwarding processor 722a examines the VID validity flag in the path data record retrieved at operation S112. If the VID validity flag is one (i.e., VID is valid), the process advances to operation S115. If the VID validity flag is zero (i.e., VID is invalid), then the process branches to operation S133 (FIG. 47).

(Operation S115) The forwarding processor 722a compares the receiving PG path field of the path data record retrieved at operation S112 with the path selection data field of the group data record retrieved at operation S113.

(Operation S116) The forwarding processor 722a examines the comparison result of operation S115. That is, if the two field values match with each other, the process advances to operation S121 (FIG. 46). If the two field values are different, the process proceeds to operation S133.

(Operation S121) The forwarding processor 722a examines first path enable flag in the path data record retrieved at operation S112 (FIG. 45). If the first path enable flag is one, the process advances to operation S122. If the first path enable flag is zero, the process branches to operation S131 (FIG. 47).

(Operation S122) The forwarding processor 722a examines second path enable flag in the path data record retrieved at operation S112. If the second path enable flag is one, the process advances to operation S123. If the second path enable flag is zero, the process skips to operation S125.

(Operation S123) The forwarding processor 722a examines 1+1 enable flag in the path data record retrieved at operation S112. If the 1+1 enable flag is zero (i.e., 1+1 protection is not enabled), then the process advances to operation S124. If the 1+1 enable flag is one (i.e., 1+1 protection is enabled), the process branches to operation S134 (FIG. 47).

(Operation S124) The forwarding processor 722a determines whether the path selection data in the group data record retrieved at operation S113 specifies the first path. If so, the process advances to operation S125. If not, the process branches to S132 (FIG. 47).

(Operation S125) The forwarding processor 722a concludes that the first path is to forward the user frame, thus terminating the forwarding decision process.

(Operation S131) The forwarding processor 722a examines second path enable flag in the path data record retrieved at operation S112 (FIG. 45). If the second path enable flag is one, the process advances to operation S132. If the second path enable flag is zero, the process advances to operation S133.

(Operation S132) The forwarding processor 722a concludes that the second path is to forward the user frame, thus terminating the forwarding decision process.

(Operation S133) The forwarding processor 722a determines to discard the received user frame without forwarding it, thus terminating the forwarding decision process.

(Operation S134) The forwarding processor 722a copies the received user frame.

(Operation S135) The forwarding processor 722a determines that both the first and second paths are to forward the user frame, thus terminating the forwarding decision process.

As can be seen from the above description, the eighth embodiment makes it possible to control the use of 1+1 protection for transmitting user frames by modifying 1+1 enable flags, in addition to providing features of the fourth embodiment.

Conclusion

The above sections have described various embodiments of a communication apparatus and a communication control method which enable quick switching of redundant paths.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have(has) been described in detail, it should be understood that various changes, substitutions, and alterations could be made hereto without departing from the spirit and scope of the invention.

What is claimed is:

1. A communication apparatus for transporting data in a network section employing redundancy for logical path connection, the communication apparatus comprising: a group data memory to store group data records which associate protection group identifiers with path selection data, the protection group identifiers each identifying a protection group that provides at least two logical paths constituting a redundant logical path and is associated with a plurality of flows of data to be transported via a logical path selected from among the logical paths, the path selection data specifying which logical path to use to forward data in each protection group;
a receive data processor to receive data and retrieve a group data record corresponding to the received data out of the group data memory;
a forwarding processor to forward the received data according to the group data record retrieved by the receive data processor; and
a path data memory to store path data records which associate data identifiers and logical path data with forwarding group identifiers, the data identifiers identifying the plurality of flows of data, the logical path data indicating physical paths corresponding to the logical paths, the forwarding group identifiers each indicating which protection group is used to forward data, wherein the receive data processor further retrieves a path data record corresponding to the received data from the path data memory based on a data identifier contained in the received data, and retrieves a group data record corresponding to the received data from the group data memory based on the forwarding group identifier found in the retrieved path data record, and wherein the forwarding processor determines which logical path to use to output the received data based on the path selection data in the group data record retrieved by the receive data processor.

2. The communication apparatus according to claim 1, further comprising a controller to modify the path selection data in the stored group data records so as to make the path selection data specify another logical path in the corresponding protection group to output the received data.

3. The communication apparatus according to claim 2, wherein the controller performs said modifying of path selection data, upon detection of a failure in the logical path being selected to output the received data.

4. The communication apparatus according to claim 3, further comprising a failure detector to detect failure of the logical paths;
wherein the controller performs said modifying of path selection data, when the failure detector detects failure in the logical path being selected to output the received data.

5. The communication apparatus according to claim 4, wherein the failure detector detects failure of the logical paths by using Ethernet operations, administration and maintenance (OAM) functions and OAM frames therefor.

6. The communication apparatus according to claim 3, wherein the controller restores the original path selection data in the group data record upon removal of the failure in the logical path, so as to make the path selection data specify again the same logical path specified before the detection of the failure.

7. The communication apparatus according to claim 2, wherein:
 the protection group comprises a working entity for use as a logical path to transport data in normal situations and a protection entity for use as another logical path to transport data in failure situation of the working entity;
 the path selection data in each stored group data record specifies the working entity in normal situation; and
 the controller modifies the path selection data in one of the group data records so as to make the path selection data specify the protection entity.

8. The communication apparatus according to claim 7, wherein:
 data transported via a redundant logical path is classified into first-priority data and second-priority data, the first-priority data being prioritized over the second-priority data;
 the path data record for the first-priority data specifies both working and protection entities; and
 the path data record for the second-priority data specifies a working entity alone.

9. The communication apparatus according to claim 8, wherein:
 the working entity for the second-priority data also serves as the protection entity for the first-priority data; and
 the path data record for the second-priority data is configured to stop forwarding the second-priority data upon execution of path switching.

10. The communication apparatus according to claim 7, wherein the path data records each comprise the following associated information items: a data identifier identifying data, logical path data describing logical paths associated with a receiving logical path that receives the data, forwarding group identifier indicating which protection group to use to forward the data, a group path indicator indicating whether the receiving logical path in the logical path data is a working entity or a protection entity; and
 wherein the forwarding processor receives the retrieved path data record containing a group path indicator and the retrieved group data record containing path selection data from the receive data processor, determines to output the received data to the logical path specified therein when the received group path indicator matches with the received path selection data, and determines to discard the received data when the received group path indicator is different from the received path selection data.

11. The communication apparatus according to claim 1, wherein: the redundant logical path is configurable to provide 1+1 protection; the path data records each comprise the following associated information items: a data identifier identifying data, logical path data indicating physical paths corresponding to logical paths for forwarding the data, a 1+1 enable flag indicating whether 1+1 protection is enabled for forwarding the data, and a forwarding group identifier indicating which protection group is to forward the data; and the forwarding processor further examines the 1+1 enable flag in the retrieved path data record and determines to output the received data using the 1+1 protection when the 1+1 enable flag indicates that the 1+1 protection is enabled.

12. The communication apparatus according to claim 1, wherein: the physical path outputs the received data based on the logical path data corresponding to the received data, according to forwarding decisions made by the forwarding processor; and the path data records each comprise the following associated information items: a data identifier identifying data, logical path data indicating physical paths corresponding to logical paths, and a forwarding group identifier indicating which protection group is to forward the data.

13. The communication apparatus according to claim 12, wherein the physical path discards the received data according to the forwarding decisions made by the forwarding processor.

14. The communication apparatus according to claim 1, wherein the receive data processor receives data from a non-redundant path and retrieves a group data record corresponding to the received data out of the group data memory.

15. The communication apparatus according to claim 1, wherein:
 the receive data processor receives data from a redundant logical path and retrieves a group data record corresponding to the received data out of the group data memory; and
 the forwarding processor consults the group data record retrieved by the receive data processor to determine which one of the logical paths constituting the redundant logical path is to forward the received data.

16. The communication apparatus according to claim 1, wherein:
 the group data records each comprise the following associated information items: a data identifier identifying data, a protection group identifier indicating which protection group is used to forward the data, a group enable flag indicating whether forwarding operation of the data using the protection group is enabled or disabled, and path selection data indicating which logical path in the protection group is to forward the data; and
 the forwarding processor examines the group enable flag in the group data record retrieved by the receive data processor and discards the received data when the group enable flag indicates that the forwarding operation is disabled.

17. A method for transporting data in a network section employing redundancy for logical path connection, the method comprising: storing, in a storage device, group data records which associate protection group identifiers with path selection data, the protection group identifiers each identifying a protection group that provides at least two logical paths constituting a redundant logical path and is associated with a plurality of flows of data to be transported via a logical path selected from among the logical paths, the path selection data specifying which logical path to use to forward data in each protection group; receiving data; retrieving a group data record corresponding to the received data out of the storage device storing the group data records; forwarding the received data according to the retrieved group data record;
 storing, in a path data memory, path data records which associate data identifiers and logical data path with forwarding group identifiers, the data identifiers identifying the plurality of flows of data, the logical path data indicating physical paths corresponding to the logical paths, the forwarding group identifiers each indicating which protection group is used to forward data;
 retrieving a path data record corresponding to the received data from the path data memory based on a data identifier contained in the received data, and a group data record corresponding to the received data from the storage device based on the forwarding group identifier found in the retrieved path data record; and determining which logical path to use to output the received data based on the path selection data in the retrieved group data record.

* * * * *